(12) United States Patent
Matsui et al.

(10) Patent No.: US 6,539,054 B1
(45) Date of Patent: Mar. 25, 2003

(54) IMAGE OUTPUT APPARATUS, IMAGE REPRODUCTION METHOD, OBJECT COMPOSITION APPARATUS, OBJECT COMPOSITION METHOD, AND DATA STORAGE MEDIUM

(75) Inventors: Yoshinori Matsui, Katano (JP); Makoto Hagai, Osaka (JP); Takanori Ishida, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/397,924

(22) Filed: Sep. 17, 1999

(30) Foreign Application Priority Data

Sep. 18, 1998 (JP) ............................................. 10-264725
May 12, 1999 (JP) ............................................. 11-131240

(51) Int. Cl.[7] .............................. H04B 1/66; H04N 9/64
(52) U.S. Cl. .................. 375/240.08; 348/575; 382/232; 386/68
(58) Field of Search ...................... 375/240.01, 240.02, 375/240.03, 240.05, 240.08, 240.11, 240.15, 240.28; 348/575, 584; 382/232; 386/68, 70, 83; 725/135, 136; H04B 1/66; H04N 9/64

(56) References Cited

U.S. PATENT DOCUMENTS 5,638,433 A * 6/1997 Bubien, Jr. ................. 379/130
5,902,115 A * 5/1999 Katayama .................... 434/307
5,907,657 A * 5/1999 Shima ........................ 386/94
5,956,459 A * 9/1999 Kato et al. .................. 386/95
6,115,077 A * 9/2000 Tsukagoshi ................ 348/607

* cited by examiner

Primary Examiner—Chris Kelley
Assistant Examiner—Tung Vo Tu
(74) Attorney, Agent, or Firm—Wenderoth, Lind & Ponack, L.L.P.

(57) ABSTRACT

The image output apparatus comprises first and second decoders 11a and 11b for decoding encoded object data E1 and W2 corresponding to the first and second objects, video data composition means 12 for compositing output data of these decoders frame by frame according to a predetermined composition period, a buffer 13 for storing composite data of a predetermined number of frames from the buffer 13 and image output apparatus 14 for reading the composite data from the buffer 13 and outputting the composite data, wherein according to a result of comparison between scheduled display time T determined by processing ability of the apparatus and set display time Tout when the composite data stored in the buffer is to be displayed, video data composition period of the video data composition means 12 is determined.

35 Claims, 27 Drawing Sheets

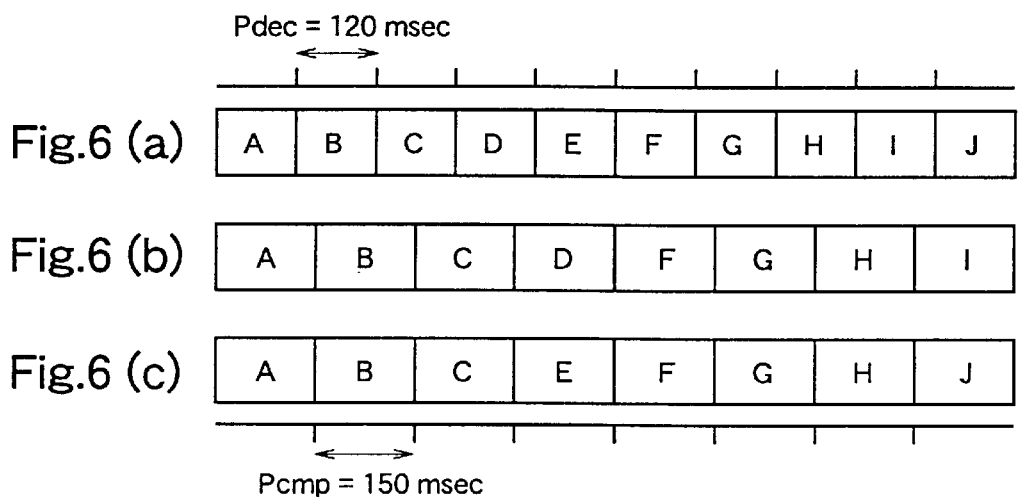
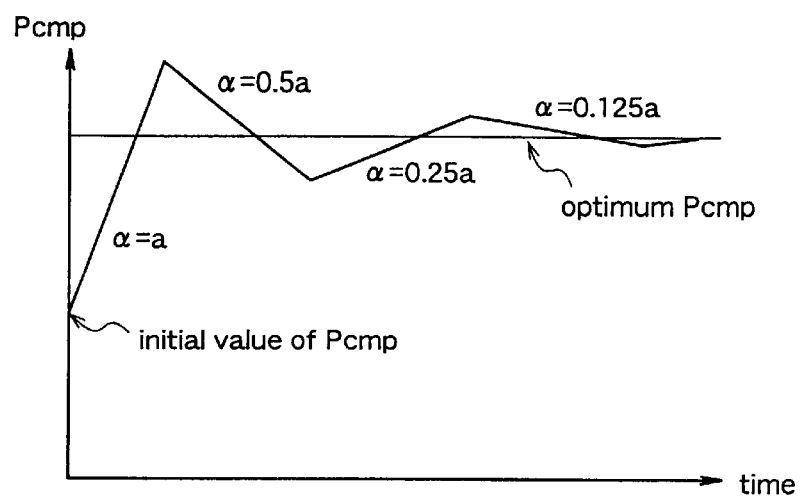

Fig.21

|  | initial value | processing result |
|---|---|---|
| T_cmp | 150 msec ||
| T_obj | 100 msec | 150 msec |

Fig.22

|  | initial value | processing result |
|---|---|---|
| T_cmp | 75 msec ||
| T_obj | 100 msec | 150 msec |

|  | initial value | processing result |
|---|---|---|
| T_cmp | 75 msec | |
| T_obj | 100 msec | 75 msec | period information updating process

Fig.27 (a)
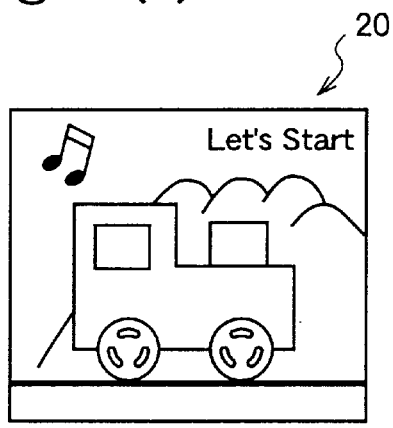
Fig.27 (b)
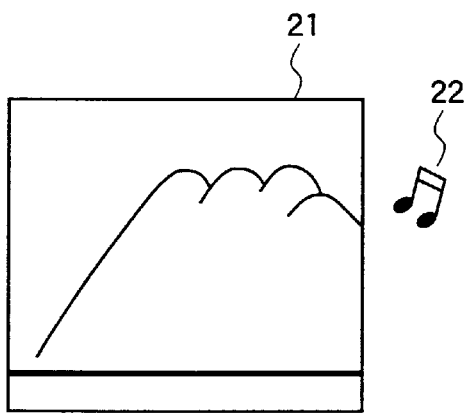
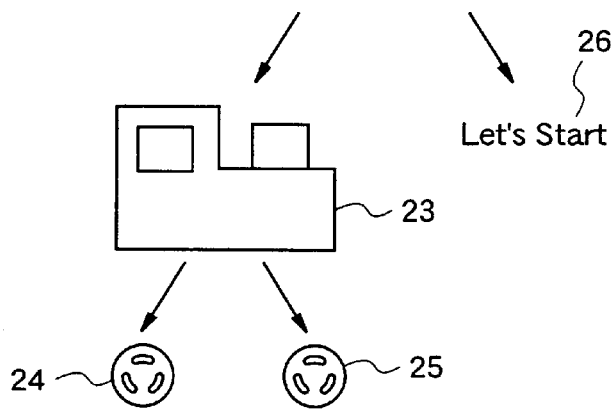
Fig.27 (c)
```
     ⤻ 2D object {
A1 ⤻ video object {detailed information CI1}
21 ⤻ audio object {detailed information CI2}
22 ⤻ 2D object {
  A2 ⤻ text object {"Let's Start"}
  26 ⤻ video object {detailed information CI3}
  23 ⤻ 2D object {
     A3 ⤻ video object {detailed information CI4}
     24 ⤻ video object {detailed information CI5}
     25 ⤻ }
     }
     }
```
SD

Fig.28

```
...
VideoObject2D {
    ...
    OD_ID = 10
    LOOP = TRUE
    ...
}
VideoObject2D {
    ...
    OD_ID = 20
    LOOP = FALSE
    ...
}
...
```

Fig.29 (a)

```
ObjectDescriptor {
    OD_ID = 10
    ...
    CompositionUnitDuration = 100
    ...
}
```
~ OD24

Fig.29 (b)

```
ObjectDescriptor {
    OD_ID = 20
    ...
    CompositionUnitDuration = 80
    ...
}
```
~ OD21

IMAGE OUTPUT APPARATUS, IMAGE REPRODUCTION METHOD, OBJECT COMPOSITION APPARATUS, OBJECT COMPOSITION METHOD, AND DATA STORAGE MEDIUM

FIELD OF THE INVENTION

The present invention relates to an image output apparatus and an image reproduction method. More particularly, the present invention relates to a reproduction process for decoding and compositing encoded video object data corresponding to a plurality of objects composing a predetermined image (scene), to reproduce video data corresponding to the predetermined scene.

The present invention also relates to an object composition apparatus and an object composition method and, more particularly to an object composition process for compositing object data corresponding to video data of respective objects according to auxiliary information relating to a composite image and the respective objects.

Moreover, the present invention relates to a data storage medium which contains a program for implementing the reproduction process by software and a program for implementing the object composition process by software.

BACKGROUND OF THE INVENTION

In recent years, we have greeted the age of "multimedia" which handles audio, video, and other data integrally. Conventional information media such as newspapers, magazines, televisions, telephones, radios, and telephones, have been adopted as the subjects of the multimedia. In general, the multimedia represents graphics, speeches, and especially images, as well as characters in relation with each other. In order to handle the conventional information media as the subject of the multimedia, it is essential that information of the conventional information media be represented in a digital format.

Let's give information of each information medium in terms of the quantity of digital information. For example, characters require information of 1–2 bytes per character, while audio requires information of 64 kbits per second (quality for telecommunication), and a moving image requires information of 100 Mbits or more per second (quality for current television broadcasting). Hence, it is not practical to handle such enormous amount of data as it is in a digital format. For example, although visual telephones have already been put to practical use by means of an ISDN (Integrated Services Digital Network) which accommodates a transmission rate ranging from 64 kbps to 1.5 Mbps, video data of a television camera cannot be directly sent over the ISDN.

Accordingly, there is a demand for an information compression technique. In case of the visual telephones, a moving image compression technique according to H.261 or H.263 standard which is internationally standardized by an ITU-T (International Telecommunication Union Telecommunication Standardization Sector) is employed. Also, according to an information compression technique conforming to MPEG (Moving image Experts Group) 1 standard, audio and video information can be recorded in a normal CD (compact disc) for music.

MPEG is an international standard for compression of moving image data (image signal corresponding to the moving image). According to the e MPEG1 standard, moving image data is compressed into 1.5 Mbps, that is, a TV signal is compressed into about 1/100. While a transmission rate according to the MPEG1 standard is restricted to about 1.5 Mbps, according to MPEG2 standardized to meet demands of higher image quality, the moving image data is compressed into 2–15 Mbps.

Under the existing circumstances, MPEG4 is being standardized by a group (ISO/IEC JTC1/SC29/WG11) which has also standardized MPEG1 and MPEG2. The compression technique (object coding scheme) according to MPEG4 enables encoding and signal operation for each of objects composing a scene (one frame image), and new functions required for multimedia. As references for MPEG4, there is "ISO/IEC14496-1 MPEG-4 Systems, Final Committee Draft, May 15, 1998".

Commonly, in a coding scheme for moving pictures, a moving picture is handled as a series of still pictures (frames), and video data is compressively encoded frame by frame. On the other hand, in the object coding scheme according to MPEG4, an image having a specific shape (foreground), a background and the like included in a frame are respectively assumed to be one object and video data corresponding to the frame (one frame image)) is handled for each video object corresponding to the object. This object coding scheme enables appropriate compressive-coding process object by object, and thereby improves a data compression rate of video data in one frame. In addition, in this object coding scheme, information indicating placement of respective objects on one frame and the like, is handled independently of the object data, thereby improving convenience with which the object data is processed and edited.

In the object coding scheme according to MPEG4 as international standard, encoded video data corresponding to a plurality of objects is decoded and composited to provide reproduced data corresponding to a composite image (reproduced scene), which is to be displayed.

Encoded video data corresponding to the respective objects is packetized and transmitted. Specifically, the encoded video object data is divided into code sequences of appropriate lengths, to which additional information such as headers are added, resulting in packets to be transmitted.

According to MPEG4, encoded video object data corresponding to a plurality of objects composing a scene is packetized and multiplexed, and transmitted as a bit stream.

FIG. 16(a) shows a data structure of this multiplexed bit stream. A multiplexed bit stream Bs includes, for example, packets P(n), P(n+1), and P(n+2). The packet P(n) comprises a header H(n) and a data part D(n). The packet P(n+1) comprises a header H(n+1) and a data part D(n+1). The packet P(n+2) comprises a header H(n+2) and a data part D(n+2).

A data part of each of the packets contains a code sequence constituting corresponding encoded video object data, and a header thereof contains identification information for identifying a content of data stored in a corresponding data part, or time management information used for decoding and reproducing the data.

The time management information is added to each access unit as a unit to-be-decoded. The time management information is called a "time stamp", which includes a DTS (Decoding Time Stamp) as time management information for decoding, and a CTS (Composition Time Stamp) as time management information for composition. One time stamp (CTS) for one processing will do, because time for another processing is found by calculation. It should be noted that the DTS needs to be added as a time stamp for each frame when the order of a reproduction process for each frame including composition and display is different from that of a decoding process for each frame. The access unit is equivalent to one frame in terms of video data and is equivalent to one audio frame in terms of audio data.

Whenever a data part of a packet contains head data of an access unit, a corresponding packet header contains a time stamp for the access unit.

FIG. 16(b) shows a portion (frame data) Fd1 corresponding to one frame as the access unit of the encoded video object data corresponding to the first object, and FIG. 16(c) shows a portion (frame data) Fd2 corresponding to one frame as the access unit of the encoded video object data corresponding to the second object. These frame data Fd1 and Fd2 is called VOP (Video Object Plane) and to respective headers thereof, time stamps Ts1 and Ts2 are added, respectively.

Conventionally, as an image composition method for compositing plural object data to display one scene, there is a technique termed "CGD" (Computational Graceful Degradation) (hereinafter referred to as a CGD method).

An example of this CGD method is to estimate decoding ability of a decoder for decoding encoded object data and outputting decoded data and reduce the number of steps in the decoding process so that the decoding process is completed by the time when decoded data should be output. Another example is to add priority information to respective frames and thereby to adaptively reduce the number of steps (operation amount) in the decoding process frame by frame or packet by packet, according to the priority information and the processing ability of the image composition apparatus.

In these methods, according to the processing ability of the decoder, the decoding process for the encoded video object data is completed by the time when the decoded data should be output, and decoded data corresponding to respective objects is composited and the resulting reproduced data corresponding to one scene is output. Therefore, these methods are effective in performing control so that the load on the image output apparatus will not exceed its processing ability.

FIG. 17 is a block diagram showing a structure of an image output apparatus which performs such load control. Turning to FIG. 17, there is shown an image output apparatus 1150, which is adapted to receive a bit stream Bs(encoded data) supplied through transmission line of a predetermined network N, extract data corresponding to a desired object (encoded video object data) from the bit stream, perform decoding and composition of the data, and output reproduced data corresponding to a desired scene (composite image). The image output apparatus 1150 is adapted to control the decoding of the data according to a traffic of the transmission line.

The image output apparatus 1150 includes first data receiving means 1151a for selecting packets of the first object from a multiplexed bit stream Bs received through the transmission line on the network N and outputting encoded object data E1 and the time stamp Ts1 for this object in each access unit (frame), and outputting a data transmission rate Ds1 to the transmission line, and second data receiving means 1151b for selecting packets of the second object from the multiplexed bit stream Bs received through the transmission line on the network N and outputting encoded video object data E2 and the time stamp Ts2 for this object in each access unit (frame), and outputting a data transmission rate Ds2 to the transmission line. Each of the data receiving means 1151a and 1151b includes a separator 1151 for separating data from the multiplexed bit stream Bs. The multiplexed bit stream including packets of the first object may be different from the multiplexed bit stream including packets of the second object.

The image output apparatus 1150 further includes a first decoder 1152a for decoding the encoded video object data E1 according to the time stamp Ts1 and the data transmission rate Ds1 and outputting decoded data D1 corresponding to the first object, a second decoder 1152b for decoding the encoded video object data E2 according to the time stamp Ts2 and the data transmission Ds2 and outputting decoded data D2 corresponding to the second object, and video data composition means 1153 for compositing these decoded data and outputting composite data Cd corresponding to a desired scene. Each of the decoders 1152a and 1152b is adapted to decode respective frames normally when a data transmission rate on the transmission line is low and a rate at which the encoded video object data is input is low, and is adapted to decode the respective frames with reduced operation amount when a data transmission rate on the transmission line is high and a rate at which the encoded video object data is input is high.

The image output apparatus 1150 still further includes a buffer 1154 for storing the composite data Cd output from the video data composition means 1153 at predetermined timing, image display means 1155 which reads data Bd from the buffer 1154 according to information DTr indicating predetermined display timing (scheduled display time) and outputs read data as reproduced data Td to a display 1150a, and control means 1156 which determines an image display period according to processing ability of the image output apparatus 1150 and outputs the information DTr indicating the scheduled display time according to the image display period.

In the image output apparatus 1150 so constructed, when the bit stream Bs including packets storing the encoded video object data corresponding to the first and second objects is input, the first and second data receiving means 1151a and 1151b select packets of the corresponding objects, and output the encoded video object data E1 and the time stamp Ts1,and the encoded video object data E2 and the time stamp Ts2 to the first and second decoders 1152a and 1152b, respectively, frame by frame. In this case, the first and second data receiving means 1151a and 1151b detect the data transmission rates Ds1 and Ds2 of the bit stream including the packets corresponding to the respective objects on the transmission line and output the information Ds1 and Ds2 to the first and second decoders 1152a and 1152b, respectively.

The decoders 1152a and 1152b decode the encoded video object data E1 and E2 frame by frame, at decoding processing times determined by the time stamps Ts1 and Ts2, and output decoded data D1 and D2, respectively. These decoding processes are controlled according to the data transmission rates Ds1 and Ds2, respectively. Specifically, the decoders 1152a and 1152b decode respective frames normally when a data transmission rate on the transmission line is low and a rate at which the encoded video object data is input is low, and decode the respective frames with reduced operation amount when a data transmission rate on the transmission line is high and a rate at which the encoded video object data is input is high.

When the respective decoded data D1 and D2 are input to the video data composition means 1153, the composition means 1153 generates composite data Cd corresponding to the desired scene and outputs the composite data Cd to the buffer 1154. In this case, in the image display means 1155, the data Bd stored in the buffer 1154 is read therefrom according to the information DTr indicating the scheduled display time from the control means 1156, and reproduced data Rd corresponding the desired scene is output to the display 1150*a*. Thereby, the display unit 1150*a* displays the image corresponding to the scene based on the reproduced data Rd.

FIG. 18 is a block diagram for explaining another structure of the image output apparatus using the CGD method. Turning to FIG. 18, there is shown an image output apparatus 1160 which is adapted to control the decoding process according to operation load and processing time of the decoders.

The image output apparatus 1160, like the image output apparatus 1150, includes a separator 1161 for selecting packets of the first and second objects from a multiplexed bit stream Bs which has been received through a transmission line of a network N, and extracting encoded video object data E1 and E2 and corresponding time stamps Ts1 and ts2 of the respective objects.

The image output apparatus 1160 further includes a first decoder 1161*a* for decoding the encoded video object data E1 according to the time stamp Ts1 and a decoding control signal Cn1 and outputting decoded data D1 corresponding to the first object, a second decoder 1161*b* for decoding the encoded video object data E2 according to the time stamp Ts2 and a decoding control signal Cn2 and outputting decoded data D2 corresponding to the second object, video data composition means 1163 for compositing these decoded data and outputting composite data Cd corresponding to the desired scene, and decoding amount estimation means 1162*a* and 1162*b* for obtaining operation load and data processing time of the respective decoders 1161*a* and 1161*b* from monitor signals Dm1 and Dm2 and controlling the respective decoders 1161*a* and 1161*b* by using the decoding control signals Cn1 and Cn2, respectively. The estimation units 1162*a* and 162*b* are adapted to control the respective decoders 1161*a* and 1161*b* in such a way that the operation amount per unit time in the decoding processes of the respective decoders 1161*a* and 1161*b* is small when operation loads placed on them are high or time required for processing a predetermined amount of data is long and the operation amount is large when the operation loads placed on them are low or the time is short.

The image output apparatus 1160, like the image output apparatus 1150, further includes a buffer 1164 for storing the composite data Cd output from the video data composition means 1163, image display means 1165 which reads data Bd from the buffer 1164 according to information DTr indicating predetermined display timing (scheduled display time) and outputs read data as reproduced data Rd to a display unit 1160*a*, and control means 1166 which determines an image display period according to processing ability of the image output apparatus 1160 and outputs the information DTr indicating the scheduled display time according to the image display period.

In the image output apparatus 1160 so constructed, when the bit stream Bs including packets storing the encoded video object data corresponding to the first and second objects is input through the transmission line on the network N, the separator 1161 selects packets of the corresponding objects and outputs the encoded video object data E1 and the time stamp Ts1, and the encoded video object data E2 and the time stamp Ts2 to the first and second decoders 1161*a* and 1161*b*, respectively, frame by frame.

The decoders 1161*a* and 1161*b* decode the encoded video object data E1 and E2 frame by frame, at decoding times determined by the time stamps Ts1 and Ts2, and output decoded data D1 and D2, respectively. At this time, the first and second estimation means 1162*a* and 1162*b* measure the operation loads and the processing times according to the monitor signals Dm1 and Dm2 and output the control signals Cn1 and Cn2 according to the measured operation loads and processing times, to the decoders 1161*a* and 1161*b*, respectively. Thereby, the respective decoders 1161*a* and 1161*b* are controlled in such a way that the operation amount per unit time in the decoding processes of the respective decoders 1161*a* and 1161*b* is small when operation loads placed on them are high or time required for processing a predetermined amount of data is long and the operation amount is large when the operation loads placed on them are low or the time is short.

When the respective decoded data D1 and D2 are input to the video data composition means 1163, the composition means 1163 generates composite data Cd corresponding to the desired scene and outputs the composite data Cd to the buffer 1164. In this case, in the image display means 1165, the data Bd stored in the buffer 1164 is read therefrom according to the information DTr indicating the scheduled display time from the control means 1166, and reproduced data Rd corresponding the desired scene is output to the display 1160*a*. Thereby, the display 1160*a* displays the image corresponding to the scene based on the reproduced data Rd.

Subsequently, a description will be made to explain a case where a plurality of objects composing the scene includes an object corresponding to object data which is repeatedly reproduced.

In the above-described object coding scheme, auxiliary information (program information) including composition information with which the scene (frame) is recomposed of the plurality of objects and side information relating to display of the respective objects are used when the object data is composited and a composite image is reproduced and displayed. Also, when processing or editing the object data, the program information as well as the respective objects is used.

The composition information-is information including the above placement information of the respective objects. According to MPEG4, as the composition information, scene description languages similar to VRML (reference: ISO/IEC 14772-1, Virtual Reality Modeling Language, 1997) is being standardized. According to MPEG4, as the side information of respective objects, object descriptors OD are being standardized.

Hereinafter, a description will be made to explain one scene (one frame image) composed of the plurality of objects and the composition information (scene description data) represented by the scene description language.

FIG. 27(*a*) shows a scene of a series of images (moving picture) obtained from video data accompanied by audio data, FIG. 27(*b*) shows a hierarchical structure of objects which compose the scene, and FIG. 27(*c*) shows scene description corresponding to the scene.

As shown in FIG. 27(*a*), a scene 20 as one frame image of a moving picture is composed of a plurality of objects (small images) of a hierarchical structure. The scene 20 is composed of a background object 21 corresponding to a background image, an audio object 22 corresponding to background music, a moving object 23 corresponding to a moving object moving in the background, a character object 26 corresponding to logo (Let's start) displayed on the background image, and first and second wheel objects 24 and 25 corresponding to forward and backward wheels of the moving object.

The scene 20 is one node, to which the background object 21 and the audio object 22 belong. The background object 21 is also one node, to which the moving object 23 and the character object 26 belong. Further, the moving object 23 is one node, to which the first and second wheel objects 24 and 25 belong.

The scene description (composition information) according to MPEG4 describes how the scene is composed of the respective objects. The hierarchical structure of the scene 20 is represented by scene description SD shown in FIG. 27(c).

"2D object" A1 shows that the video object 21 and the audio object 22 are included in a first layer and a second layer indicated by "2D object" A2 exists. The "2D object" A2 shows that the text object 26 and the video object 23 are included in a second layer, and a third layer indicated by "2D object" A3 exists. The "2D object" A3 shows that the video object 24 and the video object 25 are included in the third layer. The "2D object" A1–A3 respectively show that the objects included in the first to third layers are two-dimensional objects.

In the scene description SD, object descriptor identifiers (OD ID=10) for identifying the objects which belong to respective layers, and detailed information CI1–CI5 (Loop= TRUE) such as flags each indicating whether or not the corresponding object is repeatedly reproduced.

FIG. 28 illustrates detailed information of a part of the scene description (see FIG. 27(C)). This description shows the scene 20 includes a two-dimensional video object whose object descriptor (OD_ID) is OD_ID=10, and a two-dimensional video object whose object descriptor (OD_ID) is OD_ID=20. Since "LOOP=TRUE" as a LOOP flag is set to a node corresponding to the two-dimensional object (OD_ID=10), it is shown that this object is repeatedly reproduced. Since "LOOP=FALSE" as a LOOP flag is set to a node corresponding to the two-dimensional object (OD_ID=20), it is shown that this object is normally reproduced rather than repeatedly reproduced. In the repeated reproduction, after data of a last frame of an object is reproduced, data of a first frame of the object is reproduced.

In the scene description, locations of objects are identified by the object descriptor IDs (OD_ID) in the corresponding node, they may be specified by URL (uniform resource locators). Also in this case, each of the LOOP flags indicates whether or not the corresponding object is repeatedly reproduced.

FIGS. 29(a) and 29(b) are diagrams showing object descriptors standardized as the side information. Herein, an object descriptor DO24 corresponds to the video object 24 identified by the object descriptor (OD_D=10) (see FIG. 29(a)), and an object descriptor DO21 corresponds to the video object 21 identified by the object descriptor (OD_ID=20) (see. FIG. 29(b)).

In each of the object descriptors, CU(composition unit) duration time is used as information indicating a frame updating period of a corresponding object. This CU duration time means that one frame image of the corresponding object should be updated in each CU duration time.

For instance, the CU duration time of the video object 24 (composition Unit Duration=100) (see FIG. 29(a)) indicates that a frame updating period is 100 millisecond (msec), and the CU duration time of the video object 21 (composition Unit Duration=80) (see FIG. 29(b)) indicates that a frame updating period is 80 msec.

In the conventional object composition apparatus, video object data, and corresponding composition information and side information are input to a section comprising the video data composition means 1153, the buffer 1154, the image display means 1155, and the control means 1156 which are included in the image reproduction apparatus shown in FIG. 17, and locations of respective objects to be displayed on a frame or information about whether or not data of the respective objects is repeatedly reproduced, is obtained from the composition information, and the frame updating period information and the like is obtained from the side information.

Then, according to the frame updating periods for the individual objects composing the scene, the object data is composited (frame updating of a composite image).

However, using the conventional object composition apparatus, the following problems arise.

In the conventional CGD method which has been proposed conventionally, loads placed on the video data composition means and the image display means in subsequent stages of the decoders or time required for processing by them are not taken into account, like the method for controlling the decoding process according to the traffic on the transmission line which is performed by the image output apparatus 1150 shown in FIG. 17, or the method for controlling the decoding process according to the loads or processing timed of the decoders which is performed by the image output apparatus 1160 shown in FIG. 18.

For this reason, an image output apparatus of high processing ability is capable of performing normal decoding, composition, and display of all the frames if the frame rate of the input video object data is high, whereas an image output apparatus of low processing ability is sometimes incapable of all processing for display of encoded video object data by the time when the image corresponding to the respective frames is to be displayed, which is determined by the processing ability of the image output apparatus, if the frame rate is high.

Therefore, the image output apparatus of high processing ability is capable of outputting video data at appropriate time, whereas the image output apparatus of low processing ability is incapable of outputting video data at appropriate time (scheduled display time). This lacks synchronization between video data output behind the scheduled display time and audio data output at the scheduled display time, which is less desirable to viewers.

In addition, in the conventional object composition apparatus, when the plurality of object composing the scene includes an object of a different frame updating period, a composite image cannot be displayed preferably.

As mentioned previously, in the object coding scheme according to MPEG4, the frame updating period is set for each of the objects composing the scene, the object composition apparatus is capable of updating the frame of the composite image at timings based on the frame updating periods of all the objects. However, such frame updating process for updating the period of the composite image such that the frame updating periods of all the objects are thus satisfied, causes enormous amount of data processed by the composition apparatus.

FIG. 30 shows timings when frames of 3 objects Ob1–Ob3 are updated and timings when a frame of a composite image Cs composed of these objects according to the frame updating periods of respective objects, by using 0 msec as a reference. The frame updating period of the object Ob1 is 100 msec, the frame updating period of the object Ob2 is 900 msec, and the frame updating period of the object Ob3 is 95 msec.

In this case, the frame of the composite image Cs is updated three times at intervals of 5 msec from 90 msec, three times at intervals of 10 msec from 180 msec, three times at intervals of 15 msec from 270 msec, and three times at intervals of 20 msec from 360 msec.

The frame updating process performed according to the frame updating periods of all the objects causes enormous amount of data processed by the data composition apparatus, because the frame is updated many times within shorter time.

Accordingly, in the conventional object composition apparatus, the frame updating period of the composite image is determined according to processing ability of the composition apparatus, and the frame of the composite image is updated according to the determined frame updating period.

In this composition process, the frame updating period of the composite image does not always match the frame updating period obtained from the side information corresponding to each of the objects composing the scene. For this reason, the composite image (reproduced scene) including the plurality of objects is not displayed correctly.

This problem will be discussed below.

The object (OD_ID=10) 24 is composed of 4 frames (frames A–D) and the frame updating period of this object is, as shown in FIG. 31(a), 100 msec. The frame updating period (100 msec) is described in an object descriptor OD24 shown in FIG. 29(a) as "Composition Unit Duration=100".

When the object data of the object 24 is displayed through the following object composition processes [1]–[4] of different frame updating periods (display of the composite image of different frame updating periods), corresponding display states are shown in FIGS. 31(b)–31(e). Suppose that the frame updating periods of the composite image in the object composition processes [1], [2], [3], and [4] are 100 msec, 200 msec, 300 msec, and 400 msec, respectively.

As shown in FIG. 31(b), when the frame updating period is 100 msec, this matches the frame updating period of the object 24, and therefore an image of the object 24 is preferably displayed.

On the other hand, as shown in FIGS. 31(c)–31(e), the frame updating periods of the composite image are longer than 100 msec, some of frames of the object 24 are skipped.

When the frame updating period of the composite image is 200 msec, 2 of the 4 frames, i.e., B and D of the object 24 are skipped. When the frame updating period of the composite image is 400 msec, 3 of 4 frames, i.e., B–D of the object 24 are skipped. When the frame updating period of the composite image is 300 msec, the 4 frames of the object 24 cannot be reproduced in a correct order.

Such frame skipping.occurs in the object normally reproduced. The object normally reproduced is preferably displayed according to the frame updating period of the object with some of the frames of the object skipped, which makes viewers less displeased with the composite image. This is because the object normally reproduced needs to be synchronized with another audio object or video object.

However, as for the object repeatedly reproduced, disorder of the display period of the object itself adversely affects the image, and consequently, skipping becomes problematic.

SUMMARY OF THE INVENTION

The present invention is directed to solving the above problem, and it is an object of the present invention to provide an image output apparatus and an image reproduction method which are capable of reproducing encoded video object data appropriately depending on its data processing ability, and outputting reproduced data for image display at scheduled display time determined by the data processing ability, and a data storage medium which contains a program for making a computer perform processing according to the image reproduction method.

It is another object of the present invention to provide an object composition apparatus and an object composition method which are capable of displaying a composite image composed of a plurality of objects, i.e., a reproduced scene, preferably without significantly increasing operation load in reproduction when the plurality of objects composing the scene includes an object corresponding to object data which is repeatedly reproduced, and a data storage medium for storing a program making a computer perform processing according to the object composition method.

Other objects and advantages of the invention will become apparent from the detailed description that follows. The detailed description and specific embodiments described are provided only for illustration since various additions and modifications within the spirit and scope of the invention will be apparent to those skill in the art from the detailed description.

According to a 1st aspect of the present invention, there is provided an image output apparatus which receives encoded video object data with display time set in each frame as a display process unit, which is obtained by encoding video object data respectively corresponding to individual objects composing a predetermined image, and decodes and composites the encoded video object data, to output reproduced data used for displaying the predetermined image, and the apparatus comprises: decoders for decoding the encoded video object data corresponding to respective objects and outputting a plurality of decoded data; video data composition means for compositing the plurality of decoded data to generate composite data corresponding to a frame, frame by frame; a buffer for storing the composite data of a predetermined number of frames; image display means for selecting composite data corresponding to a specified frame according to a result of comparison between set display time of respective composite data stored in the buffer and scheduled display time determined by display process ability, and outputting the selected composite data as the reproduced data; and means for determining a video data composition period, which determines a composition period of a composition process according to the result of comparison between the set display time and the scheduled display time and outputs composition period information, wherein the video data composition means perform the composition process according to the composition period indicated by the composition period information. Thereby, reproduction is performed while maintaining synchronization between audio data and video data, irrespective of processing ability of the image output apparatus.

According to a 2nd aspect of the present invention, there is provided an image output apparatus which receives encoded video object data with display time set in each frame as a display process unit, which is obtained by encoding video object data respectively corresponding to individual objects composing a predetermined image, and decodes and composites the encoded video object data, to output reproduced data used for displaying the predetermined image, and the apparatus comprises: decoders for decoding the encoded video object data corresponding to respective objects and outputting a plurality of decoded data;

video data composition means for compositing the plurality of decoded data to generate composite data corresponding to a frame, frame by frame; a buffer for storing the composite data of a predetermined number of frames; image display means which selects composite data corresponding to a specified frame according to a result of comparison between set display time of respective composite data stored in the buffer and scheduled display time determined by display process ability, and outputs the selected composite data as the reproduced data; and means for determining a number of frames to-be-decoded, which determines the number of frames of the respective objects which are to be decoded by the decoders per unit time, according to the result of comparison between the set display time and the scheduled display time, and outputs information indicating the number-of frames to-be-decoded of the respective objects, wherein the decoders respectively perform decoding such that decoding amount of the respective objects per unit time corresponds to the number of frames per unit time according to the information indicating the number of frames to-be-decoded. Thereby, decoded data is generated according to processing ability of a circuit which composites the decoded data or outputs composite data to the display, whereby an image is reproduced appropriately according to processing ability of the image output apparatus.

According to a 3rd aspect of the present invention, in the image output apparatus of the 2nd aspect, the decoders, when changing the number of frames to-be-decoded per unit time according to the information indicating the number of frames to-be-decoded of the respective objects, determine frames to be decoded and frames to be dropped which are not decoded, according to types of encoding processes performed for the encoded video object data. Therefore, when reducing the number of frames to-be-decoded, frames which are not to be decoded are sequentially selected starting from the frame which affects an image quality least, and thereby an image is reproduced appropriately according to processing ability while suppressing degradation of the image quality.

According to a 4th aspect of the present invention, there is provided an image output apparatus which receives encoded video object data with display time set in each frame as a display process unit, which is obtained by encoding video data respectively corresponding to individual objects composing a predetermined image, and decodes and composites the encoded video object data, to output reproduced data used for displaying the -predetermined image, and the apparatus comprises: decoders for decoding the encoded video object data corresponding to respective objects and outputting a plurality of decoded data; video data composition means for compositing the plurality of decoded data to generate composite data corresponding to a frame, frame by frame; a buffer for storing the composite data of a predetermined number of frames; image display means which selects composite data corresponding to a specified frame according to a result of comparison between set display time of respective composite data stored in the buffer and scheduled display time determined by display process ability, and outputs the selected composite data as the reproduced data; and means for determining a number of frames to-be-decoded, which determines the number of frames of respective objects which are to be decoded by the decoders per unit time according to waiting time before the video data composition means writes the composite data to the buffer, and outputs information indicating the number of frames to-be-decoded of the respective objects, wherein the decoder s respectively perform decoding such that decoding amount of the respective objects per unit time corresponds to the number of frames per unit time according to the information indicating the number of frames to-be-decoded. Thereby, decoded data is generated according to processing ability of a circuit which composites the decoded data or outputs composite data to the display, whereby an image is reproduced appropriately according to processing ability of the image output apparatus.

According to a 5th aspect of the present invention, in the image output apparatus of the 4th aspect, wherein the decoders, when changing the number of frames to-be-decoded per unit time according to the information indicating the number of frames to-be-decoded of the respective objects, determine frames to be decoded and frames to be dropped which are not decoded, according to types of encoding processes performed for the encoded video object data. Therefore, the effects of the 3rd aspect are achieved.

According to a 6th aspect of the present invention, there is provided an image output apparatus which receives encoded video object data with display time set in each frame as a display process unit, which is obtained by encoding video object data respectively corresponding to individual objects composing a predetermined image, and decodes and composites the encoded video object data, to output reproduced data used for displaying the predetermined image, and the apparatus comprises: decoders for decoding the encoded video object data corresponding to respective objects and outputting a plurality of decoded data; video data composition means for compositing the plurality of decoded data to generate composite data corresponding to a frame, frame by frame; a buffer for storing the composite data of a predetermined number of frames; image display means which selects composite data corresponding to a specified frame according to a result of comparison between set display time of respective composite data stored in the buffer and scheduled display time determined by display process ability, and outputs the selected composite data as the reproduced data; and means for determining a number of frames to-be-decoded, which determines the number of frames of respective objects which are to be decoded by the decoders per unit time according to the result of comparison between the set display time and the scheduled display time, and waiting time before the video data composition means writes the composite data to the buffer, and outputs information indicating the number of frames to-be-decoded of the respective objects, wherein the decoders respectively perform decoding such that decoding amount of the respective objects per unit time corresponds to the number of frames per unit time according to the information indicating the number of frames to-be-decoded. Thereby, decoded data is generated according to processing ability of a circuit which composites the decoded data or outputs composite data to the display, whereby an image is reproduced appropriately according to processing ability of the image output apparatus.

According to a 7th aspect of the present invention, in the image output apparatus of the 6th aspect, the decoders, when changing the number of frames to-be-decoded per unit time according to the information indicating the number of frames to-be-decoded of the respective objects, determine frames to be decoded and frames to be dropped which are not decoded, according to types of encoding processes performed for the encoded video object data. Therefore, the effects of the 3rd aspect are achieved.

According to an 8th aspect of the present invention, there is provided an image reproduction method which decodes and composites encoded video object data with display time set in each frame as a display process unit, which is obtained by encoding video object data respectively corresponding to individual objects composing a predetermined image, to output reproduced data used for displaying the predetermined image, and the method comprises: a video data composition step for compositing decoded data obtained by decoding the encoded video object data corresponding to respective objects to generate composite data corresponding to a frame, frame by frame; a buffering step for storing the composite data of a predetermined number of frames in a buffer; a reproduced data output step for selecting composite data corresponding to a specified frame according to a result of comparison between set display time of respective composite data stored in the buffer and scheduled display time determined by display process ability, and outputting the selected composite data as the reproduced data; and a video data composition period determination step, for determining a composition period of a composition process according to the result of comparison between the set display time and the scheduled display time and outputting composition period information, and in the video data composition step, the composition process is performed according to the composition period indicated by the composition period information. Therefore, the effect of the 1st aspect are achieved.

According to a 9th aspect of the present invention, there is provided an image reproduction method which decodes and composites encoded video object data with display time set in each frame as a display process unit, which is obtained by encoding video object data respectively corresponding to individual objects composing a predetermined image, to output reproduced data used for displaying the predetermined image, and the method comprises: a decoding step for decoding the encoded video object data corresponding to respective objects and outputting decoded data corresponding to the respective objects; a composition step for compositing the decoded data corresponding to the respective objects to generate composite data and storing the composite data of a predetermined number of frames in a buffer; a reproduced data output step for selecting composite data corresponding to a specified frame according to a result of comparison between set display time of the composite data of respective frames stored in the buffer and scheduled display time determined by display process ability, and outputting the selected composite data as the reproduced data; and a determination step for determining a number of frames to-be-decoded, which determines the number of frames of the respective objects which are to be decoded by the decoders per unit time, according to the result of comparison between the set display time and the scheduled display time, and outputs information indicating the number of frames to-be-decoded of the respective objects, and in the decoding step, the encoded video object data is decoded such that decoding amount of the respective objects per unit time corresponds to the number of frames per unit time according to the information indicating the number of frames to-be-decoded. Therefore, the effects of the 2nd aspect are achieved.

According to a 10th aspect of the present invention, there is provided an image reproduction method which decodes and composites encoded video object data with display time set in each frame as a display process unit, which is obtained by encoding video object data respectively corresponding to individual objects composing a predetermined image, to output reproduced data used for displaying the predetermined image, and the method comprises: a decoding step for decoding the encoded video object data corresponding to respective objects and outputting decoded data corresponding to the respective objects; a composition step for compositing the decoded data corresponding to the respective objects to generate composite data and storing the composite data of a predetermined number of frames in a buffer; a reproduced data output step for selecting composite data corresponding to a specified frame according to a result of comparison between set display time of the composite data of respective frames stored in the buffer and scheduled display time determined by display process ability, and outputting the selected composite data as reproduced data; and a determination step for determining a number of frames to-be-decoded, which determines the number of frames of respective objects which are to be decoded by the decoders per unit time, according to waiting time before the composite data is written to the buffer, and outputs information indicating the number of frames to-be-decoded of the respective objects, and in the decoding step, the encoded video object data is decoded such that decoding amount of the respective objects per unit time corresponds to the number of frames per unit time according to the information indicating the number of frames to-be-decoded. Therefore, the effects of the 4th aspect are achieved.

According to an 11th aspect of the present invention, there is provided an image reproduction method which decodes and composites encoded video object data with display time set in each frame as a display process unit, which is obtained by encoding video object data corresponding to individual objects composing a predetermined image, to output reproduced data used for displaying the predetermined image, and the method comprises: a decoding step for decoding the encoded video object data corresponding to respective objects and outputting a plurality of decoded data corresponding to the respective objects; a composition step for compositing the plurality of decoded data to generate composite data and storing the composite data of a predetermined number of frames in a buffer; a reproduced data output step for selecting composite data corresponding to a specified frame according to a result of comparison between set display time of the composite data of respective frames stored in the buffer and scheduled display time determined by display process ability, and outputting the selected composite data as the reproduced data; and a determination step for determining a number of frames to-be-decoded, which determines the number of frames of respective objects which are to be decoded by the decoders per unit time, according to the result of comparison between the set display time and the scheduled display time, and waiting time before the composite data is written to the buffer, and outputs information indicating the number of frames to-be-decoded of the respective objects, and in the decoding step, the encoded video object data is decoded such that decoding amount of the respective objects per unit time corresponds to the number of frames per unit time according to the information indicating the number of frames to-be-decoded. Therefore, the effects of the 6th aspect are achieved.

According to 12th aspect of the present invention, there is provided a data storage medium for storing a program which makes a computer perform processing of video data, the program being an image reproduction program for making the computer reproduce data according to an image reproduction method of the 8th aspect. The video data is output according to the reproduction method of the 8th aspect is implemented by using the computer.

According to a 13th aspect of the present invention, there is provided a data storage medium for storing a program which makes a computer perform processing of video data, the program being an image reproduction program for making the computer reproduce data according to an image reproduction method of the 9th aspect. Therefore, the effects of the 12th aspect are achieved.

According to a 14th aspect of the present invention, there is provided a data storage medium for storing a program which makes a computer perform processing of video data, the program being an image reproduction program for making the computer reproduce data according to an image reproduction method of the 10th aspect. Therefore, the effects of the 12th aspect are achieved.

According to a 15th aspect of the present invention, there is provided a data storage medium for storing a program which makes a computer perform processing of video data, the program being an image reproduction program for making the computer reproduce data according to an image reproduction method of the 11th aspect. Therefore, the effects of the 12th aspect are achieved.

According to a 16th aspect of the present invention, there is provided an image output apparatus which receives a plurality of video object data respectively corresponding to a plurality of objects composing a predetermined image, composites the plurality of video object data and outputs reproduced data used for displaying the predetermined image, and the apparatus comprises: object composition means for compositing the plurality of video object data with reference to object period information indicating periods according to which frames of respective objects are updated and composite image period information indicating a period according to which a frame of a composite image is updated; and period information changing means for changing one of the object period information and the composite image period information so that a corresponding frame updating period has a value according to a control signal, wherein the composition means composites the plurality of video object data with reference to changed period information which has replaced corresponding period information before change. Therefore, for the composite image composed of the plurality of objects, the frame updating period is set according to processing ability of the object composition apparatus, while for individual objects composing the scene, the frame updating period is set according to the display method of the video object data.

According to a 17th aspect of the present invention, there is provided an image reproduction method which receives a plurality of video object data respectively corresponding to a plurality of objects composing a predetermined image, composites the plurality of video object data and outputs reproduced data used for displaying the predetermined image, and the method comprises: a composition period determination step for determining a period according to which the plurality of video object data is composited, with reference to object period information indicating periods according to which frames of respective objects are updated and composite image period information indicating a period according to which a frame of a composite image is updated; and a period information changing step for changing one of the object period information and the composite image period information so that a corresponding frame updating period has a value according to a control signal, wherein in the composition period determination step, changed period information which has replaced corresponding period information before change, is referred to. Therefore, the effects of the 16th aspect are achieved.

According to an 18th aspect of the present invention, there is provided a data storage medium for storing a program which makes a computer perform processing of video data, the program being an image reproduction program for making the computer reproduce data according to an image reproduction method of the 17th aspect. Therefore, this processing is implemented by using a general computer.

According to a 19th aspect of the present invention, there is provided an object composition apparatus for compositing video object data respectively corresponding to individual objects composing a predetermined image according to auxiliary information associated with the predetermined image; and the apparatus comprises program information storage means for storing program information as the auxiliary information, including object period information of respective objects indicating periods according to which frames of the respective objects are updated and display method information indicating methods for displaying the video object data; decision means for deciding a method of displaying the video object data object by object, according to the program information stored in the program information storage means and outputting a decision signal indicating a decision result; period information updating means which receives the decision signal and performs an information updating process in which object period information of a target object included in the program information on which decision has been made is changed, according to the decision result; and composition means for compositing the video object data corresponding to the respective objects periodically by using the program information which has been subjected to the information updating process. Therefore, for the individual objects, the frame updating periods are set according to the display method of the video object data, and the composite image including the object corresponding to the video object data which is repeatedly reproduced, is preferably displayed.

According to a 20th aspect of the present invention, in the object composition apparatus of the 19th aspect, the program information includes composition information used for compositing the video object data corresponding to the individual objects to reproduce the predetermined image, the display method information being included in the composition information, the program information storage means includes a composition information memory for storing the composition information included in the program information, and the decision means receives the composition information stored in the composition information memory and decides the method for displaying the video object data object by object, according to the display method information included in the composition information. Therefore, for the individual objects, the frame updating periods are set according to the display method of the video object data by using the program information.

According to a 21st aspect of the present invention, in the object composition apparatus of the 19th aspect, the program information includes side information associated with the individual objects, the display method information being included in the side information, the program information storage means includes a side information memory for storing the side information of the respective objects included in the program information, and the decision means receives the side information stored in the side information memory and decides the method for displaying the video object data object by object, according to the display method information included in the side information. Therefore, for the individual objects, the frame updating periods are set according to the display method of the video object data by using the side information.

According to a 22nd aspect of the present invention, in the object composition apparatus of the 19th aspect, the display method information of each object which is included in the program information is a flag indicating whether or not video object data corresponding to a frame of a corresponding object needs to be repeatedly reproduced. Therefore, depending upon whether or not video object data corresponding to each object needs to be repeatedly reproduced, the frame updating period is set, and the composite image including the object corresponding to video object data which is repeatedly reproduced, is preferably displayed.

According to a 23rd aspect of the present invention, in the object composition apparatus of the 19th aspect, the display method information of each object which is included in the program information is a flag indicating whether or not object period information of a corresponding object can be changed. Therefore, for the object of the object composition period which is changeable, an appropriate frame updating period is set, and the composite image including the object corresponding to the object data repeatedly reproduced, is preferably displayed.

According to a 24th aspect of the present invention, in the object composition apparatus of the 19th aspect, the period information updating means updates the object period information of the target object such that a value of the frame updating period of the target object becomes an integer multiple of a composition period of the composition means for compositing the video object data. Therefore, the composite image is preferably displayed while suppressing skipping of frames.

According to a 25th aspect of the present invention, in the object composition apparatus of the 24th aspect, the period information updating means updates the object period information of the target object such that the value of the frame updating period of the target object becomes a value of (the composition period×1), when the value of the object period information is not larger than the value of the composition period. Therefore, the composite image is preferably displayed while suppressing skipping of frames.

According to a 26th aspect of the present invention, in the object composition apparatus of the 24th aspect, the period information updating means updates the object period information of the target object such that the value of the frame updating period of the target object becomes a smallest value of integer multiples of the value of the composition period, which is not smaller than the value of the object period information, when the value of the object period information is larger than the value of the composition period. Therefore, the composite image is preferably displayed while suppressing skipping of frames.

According to a 27th aspect of the present invention, in the object composition apparatus of the 24th aspect, the period information updating means, when the value of the object period information is larger than the value of the composition period, calculates a first candidate value as a largest value of integer multiples of the value of the composition period, which is not larger than the value of the object period information and a second candidate value as a smallest value of the integer multiples of the composition period, which is not smaller than the value of the object period information, and updates the object period information of the target object such that the frame updating period of the target object has one of the first and second candidate values which is closer to the value of the object period information. Therefore, the composite image is preferably displayed while suppressing skipping of frames, and simultaneously, variation before and after updating the frame updating period of the object corresponding to the object data to be repeatedly reproduced, is suppressed.

According to a 28th aspect of the present invention, there is provided an object composition method for compositing video object data respectively corresponding to individual objects composing a predetermined image according to auxiliary information associated with the predetermined image; and the method comprises: a decision step for deciding a method of displaying video object data object by object, according to program information as the auxiliary information, including object period information of respective objects indicating periods according to which frames of the respective objects are updated and display method information indicating methods for displaying the video object data; a period information updating step in which object period information of a target object included in the program information on which decision has been made is changed according to a decision result; and a composition step for compositing the video object data corresponding to the respective objects periodically by using the program information which has been changed in the period information updating step. Therefore, the effects of the 19th aspect are achieved.

According to a 29th aspect of the present invention, in the object composition method of the 28th aspect, the display method information of each object which is included in the program information is a flag indicating whether or not video object data corresponding to a frame of a corresponding object needs to be repeatedly reproduced. Therefore, the effects of the 22nd aspect are achieved.

According to a 30th aspect of the present invention, in the object composition method of the 28th aspect, the display method information of each object which is included in the program information is a flag indicating whether or not object period information of a corresponding object can be changed. Therefore, the effects of the 23rd aspect are achieved.

According to a 31st aspect of the present invention, in the object composition method of the 28th aspect, in the period information updating step, the object period information of the target object is updated such that a value of the frame updating period of the target object becomes an integer multiple of a composition period of composition means for compositing the video object data. Therefore, the effects of the 23rd aspect are achieved.

According to a 32nd aspect of the present invention, in the object composition method of the 31st aspect, in the period information updating step, the object period information of the target object is updated such that the value of the frame updating period of the target object becomes a value of (the composition period×1), when the value of the object period information is not larger than the value of the composition period. Therefore, the effects of the 23rd aspect are achieved.

According to a 33rd aspect of the present invention, in the object composition method of the 31st aspect, in the period information updating step, the object period information of the target object is updated such that the value of the frame updating period of the target object becomes a smallest value of integer multiples of the composition period, which is not smaller than the value of the object period information, when the value of the object period information is larger than the value of the composition period. Therefore, the effects of the 26th aspect are achieved.

According to a 34th aspect of the present invention, in the object composition method of the 31st aspect, in the period information updating step, when the value of the object period information is larger than the value of the composition period, a first candidate value as a largest value of integer multiples of the composition period which is not larger than the value of the object period information and a second candidate value as a smallest value of the integer multiples of the composition period, which is not smaller than the value of the object period information, are calculated and the object period information is updated such that the frame updating period of the target object has one of the first and second candidate values which is closer to the value of the object period information. Therefore, the effects of the 27th aspect are achieved.

According to a 35th aspect of the present invention, there is provided a data storage medium for storing a program which makes a computer perform an object composition process for compositing video object data respectively corresponding to individual objects composing a predetermined image, according to auxiliary information associated with the predetermined image, and the program comprises: a decision step for deciding a method of displaying video object data object by object, according to program information as the auxiliary information, including object period information of respective objects indicating periods according to which frames of the respective objects are updated and display method information indicating methods for displaying the video object data; a period information updating step in which object period information of a target object included in the program information on which decision has been made is changed according to a decision result; and a composition step for compositing the video object data corresponding to the respective objects periodically by using the program information which has been changed in the period information updating step.

Therefore, when performing the composition process by software, for the individual objects, the frame updating periods are set according to the display method of the video object data, and the composite image including the object corresponding to the video object data which is repeatedly reproduced, is preferably displayed.

BRIEF DESCRIPTION OF THE DRAWINGS

FIGS. 2(a)–2(c) are diagrams for explaining a buffer included in the image output apparatus of the first embodiment, wherein FIG. 2(a) shows data storage regions of the buffer and FIGS. 2(b) and 2(c) show data stored in the data storage regions at measured time T=1000 and T=1400, respectively.

FIGS. 6(a)–6(c) are diagrams for explaining operation of video data composition means included in the image output apparatus of the first embodiment, wherein FIG. 6(a) shows timing when decoded data corresponding to respective frames is output and FIGS. 6(b)–6(c) show timing when composite data corresponding to respective frames are generated.

FIG. 7 is a diagram for explaining a modification of a video data composition period determination process of the first embodiment and showing change of video data composition period Pcmp when an increase/decrease value used for updating the video data composition period is a variable.

FIGS. 16(a)–16(c) are diagrams for explaining encoded video data according to MPEG4, wherein FIG. 16(a) shows a data structure of a multiplexed bit stream output from a transmission end, FIG. 16(b) shows frame data corresponding to an access unit of a first object, and FIG. 16(c) shows frame data corresponding to an access unit of a second object.

FIG. 21 is a diagram showing an example of updating of period information performed by the apparatus of the fifth embodiment.

FIG. 22 is a diagram showing another example of updating of period information performed by the apparatus of the fifth embodiment.

FIGS. 27(a)–27(c) are diagrams for explaining conception of an object coding scheme according to MPEG4, wherein FIG. 27(a) shows a scene composed of a plurality of objects, FIG. 27(b) shows its hierarchical structure, and FIG. 27(c) shows scene description.

FIG. 28 is a diagram showing a part of composition information (scene description data) in the object coding scheme according to MPEG4.

FIGS. 29(a) and 29(b) are diagrams showing examples of object descriptors included in side information in the object coding scheme according to MPEG4, wherein FIG. 29(a) shows an object descriptor of an object (OD_ID=10), and FIG. 29(b) shows an object descriptor of an object (OD_ID=10).

DETAILED DESCRIPTION OF THE PREFERRED EMBODIMENTS

Embodiment 1

Figure 1:
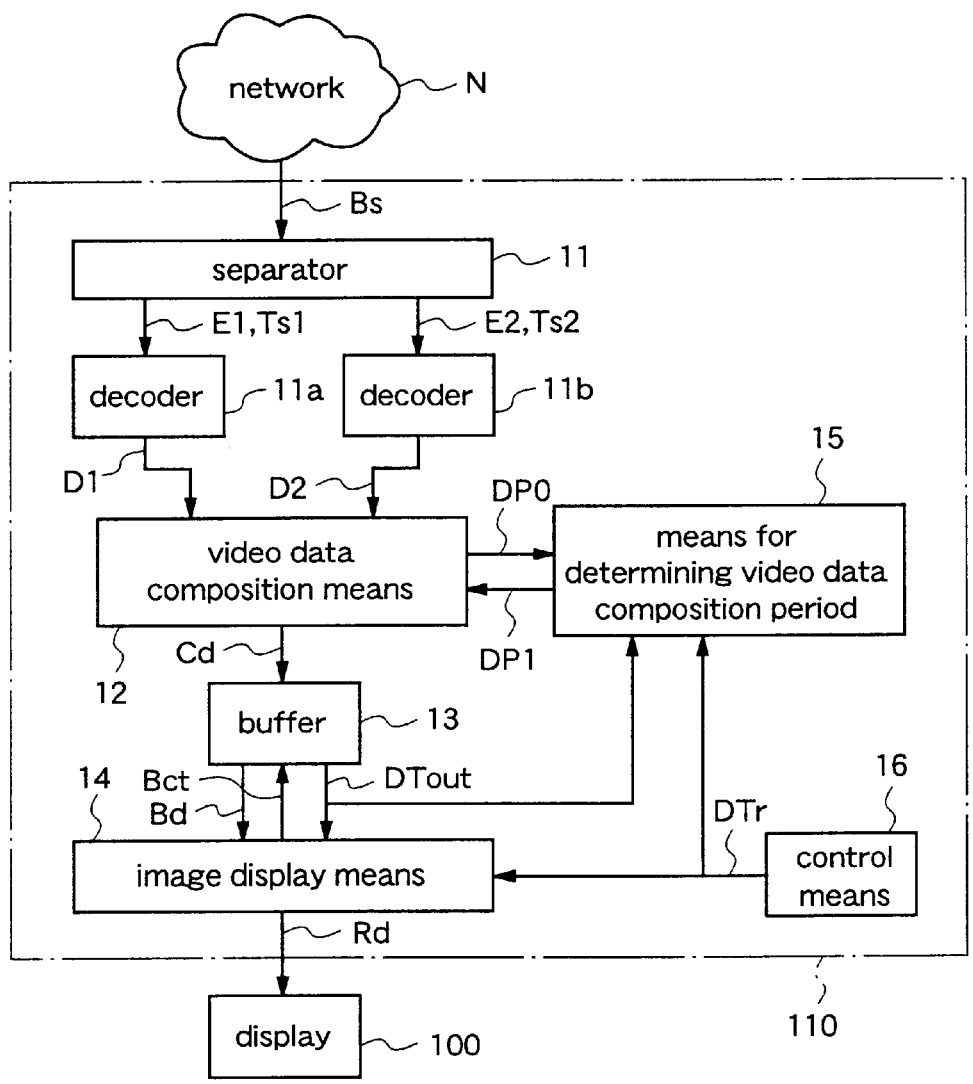
FIG. 1 is a block diagram showing a structure of an image output apparatus according to a first embodiment of the present invention.

FIG. 1 is a block diagram for explaining an image output apparatus according to a first embodiment of the present.

An image output apparatus 110 of the first embodiment is adapted to control a composition process for compositing decoded data corresponding to first and second objects (data obtained by decoding first and second encoded video object data) according to its processing ability.

Figure 16:
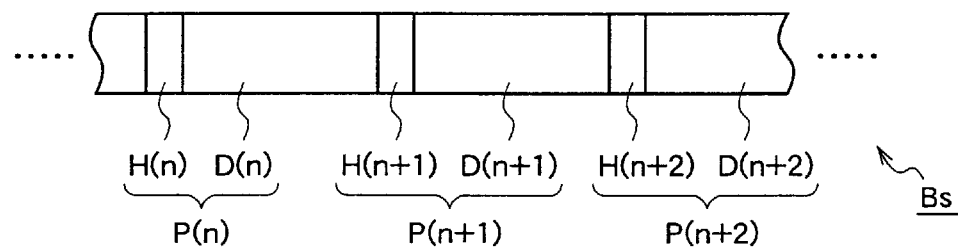
Figure 16:
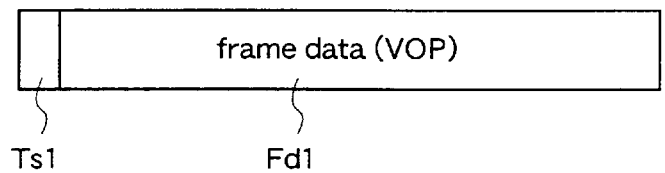
Figure 16:
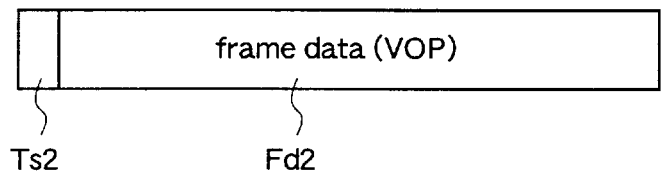
Figure 17:
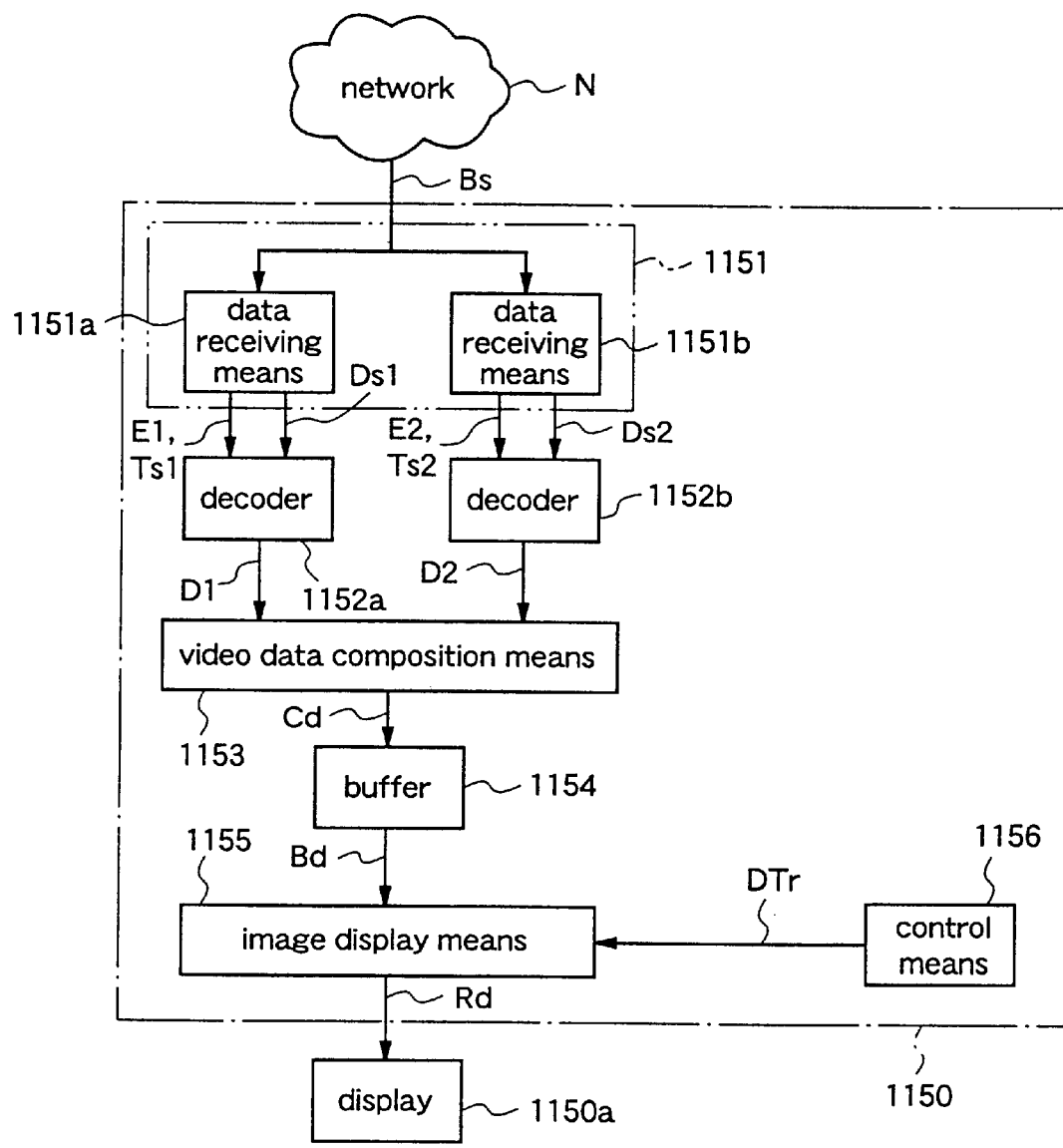
FIG. 17 is a block diagram showing a structure of a conventional image output apparatus which is adapted to control decoding process according to traffic condition on the transmission line.
Figure 18:
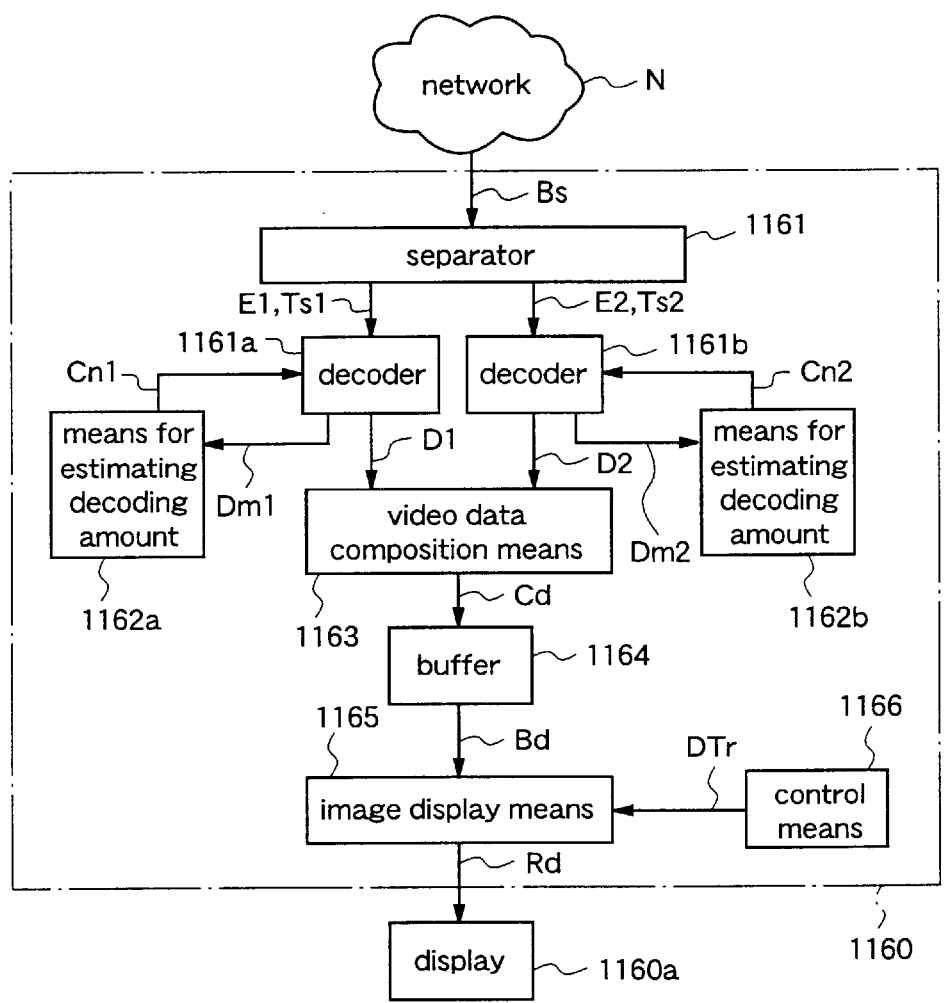
FIG. 18 is a block diagram showing a structure of a conventional image output apparatus which is adapted to control load placed on decoding according to processing ability of a decoder.

The image output apparatus 110 includes, like the conventional image output apparatus 1160 shown in FIG. 18, a separator 11 for selecting packets of the first and second objects from a multiplexed bit stream Bs having a data structure shown in FIG. 16(a) which has been received through a transmission line of a network N, and extracting time stamps Ts1 and Ts2 of encoded video object data E1 and E2 of the respective objects.

The image output apparatus 110 further includes a first decoder 11a for decoding the encoded video object data E1 according to the time stamp Ts1 and outputting decoded data D1 of the first object, a second decoder 11b for decoding the encoded video object data E2 according to the time stamp Ts2 and outputting decoded data D2 of the second object, and video data composition unit 12 for compositing these decoded data according to a predetermined composition period Pcmp and outputting composite data Cd corresponding to a desired scene. The video data composition means 12 is used to output composition period information DP0 indicating the composition period Pcmp and update the composition period Pcmp according to the updated composition period information DP1. The video data composition means 12 includes an output buffer (not shown) for storing composite data of several frames.

The image output apparatus 110 still further includes a buffer 13 for reading the composite data Cd stored in the output buffer of video data composition means 12 as many as a predetermined number of frames (4 frames) according to a buffer control signal Bct, and storing the composite data Cd, image display means 14 for reading the data (predetermined composite data) Bd stored in the buffer 13, and outputting read data as reproduced data Rd to the display unit 100, video data composition period determination means (determination means) 15 for updating the composition period Pcm and outputting information PD1 indicating the updated composition period to the video data composition means 12, and control means 16 for outputting the information DTr indicating the scheduled display time T when the image is to be displayed on the display 100, according to an image display period Tp determined by the processing ability of the display apparatus 100.

The determination means 15 is adapted to update the composition period according to information DTout indicating set display time Tout represented as the time stamps Ts1 and Ts2 from the buffer 13, the information DTr indicating the scheduled display time T from the control means 16, and information DP0 indicating the composition period Pcmp from the video data composition means 12, and output information DP1 indicating the updated composition period. The image display means 14 is adapted to read predetermined composite data from the buffer 13 according to the information DTr indicating the scheduled display time and the information DTout indicating the set display time and output the predetermined composite data. The image display means 14 includes a counter (not shown) for counting the number of times of processing for reading the composite data from the buffer 13. When an output value bc of the counter reaches a predetermined value (4), the buffer control signal Bct is output to the buffer 13.

FIGS. 2(a)–2(c) are diagrams for explaining a structure of the buffer 13 and a format of the composite data stored in the buffer, wherein FIG. 2(a) shows a data storage region of the buffer.

The buffer 13 has 4 data storage regions Rma-Rmd. The Rma has Bma, Tma, and Gma. The Rmb has Bmb, Tmb, and Gmb. The Rmc has Bmc, Tmc, and Gmc. The Rmd has Bmd, Tmd, and Gmd. Each of the Rma-Rmd is a counter value storage region in which a 2-bit value corresponding to an output value bc of the counter is stored as data ID Did for identifying a corresponding data storage region. Each of the Gma-Gmd is n-byte data storage unit for storing corresponding composite data. Each of the Tmad-Tmd is time information storage region for storing the information DTout indicating set display time Tout of corresponding composite data.

FIGS. 2(b) and 2(c) show data in the buffer at scheduled display time T (T=1000 msec), and scheduled display time T (T=1400 msec), with respect to display reference time T (T=0 msec) such as data processing start time, respectively. Here, it is assumed that the image display period Tp determined by the processing ability of the image output apparatus 110 is 400 msec.

Subsequently, operation will be described.

When the bit stream Bs including packets which contains encoded video object data corresponding to the first and second objects is input to the image output apparatus 110 through the transmission line on the network N, the separator 11 selects the packets of the first and second objects and outputs the encoded video object data E1 and the time stamp Ts1, and the encoded video object data E2 and the time stamp Ts2, to the first and second decoders 11a and 11b, respectively.

The decoders 11a and 11b decode the encoded object video data E1 and E2 frame by frame at decoding times determined by the time stamps ts1 and Ts2 and outputs decoded data D1 and D2, respectively.

The decoded data D1 and D2 are input to the data composition means 12, the composition means 12 generates the composite data corresponding to the desired scene according to the predetermined composition period Pcmp and outputs the composite data Cd to the buffer 13. The video data composition period determination means 15 updates the composition period Pcmp according to the information DTout from the buffer 13, the information DTr from the control means, and the information DP0 from the composition means 12, and outputs the resulting composition period DP1 to the composition means 12. The composition means 12 performs composition according to the updated composition period.

The image display means 14 reads the desired composite data Bd as the reproduced data Rd from the buffer 13 according to the scheduled display time information DTr and the set display time information DTout and outputs the desired composite data Bd to the display 100, which displays the desired scene based on the reproduced data Rd.

Operation of the buffer 13 and the image display means 14 will be described in detail.

Figure 3:
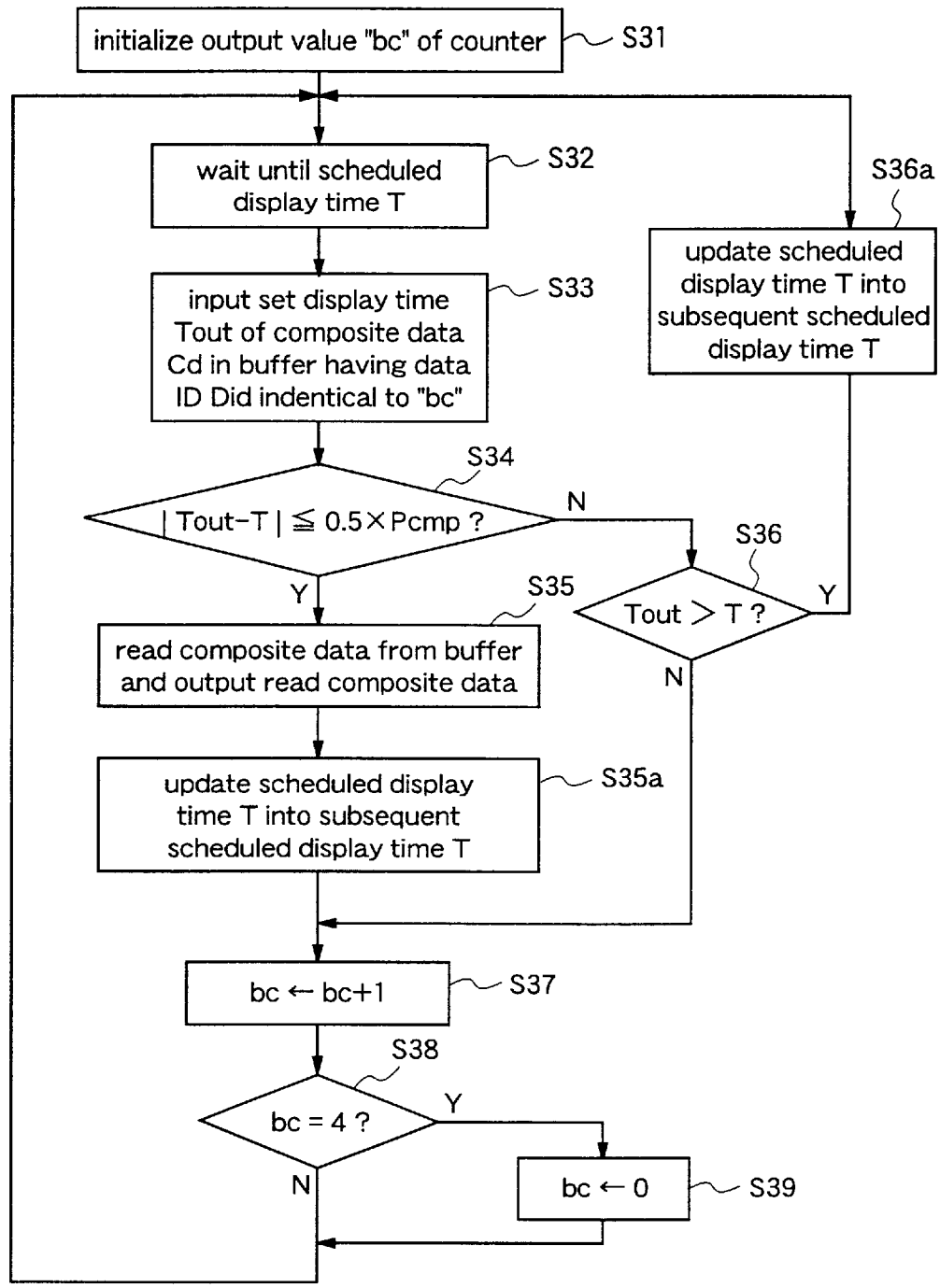
FIG. 3 is a diagram showing flow of display process by image display means of the first embodiment.

FIG. 3 is a flowchart for explaining reading operation for reading the data Bd from the buffer 13.

When the composition process starts, the output value bc of the counter of the image display means 14 is initialized to "0" (Step S31), and the composite data Cd of respective frames corresponding to the desired scene is generated according to the predetermined composition period Pcmp. Simultaneously, in the image display means 14, time measuring operation is started, and the reading operation of the stored data in the standby state until measured time Mt reaches first scheduled display time T (Step S32).

During this standby period, the composite data Cd of 4 frames and the information DTout indicating the corresponding set display times Tout are sequentially stored in the data storage regions Rma-Rmd corresponding to the values "0", "1", "2", and "3" of respective data identifiers Did. In this case, the composite data Cd of the respective frames is stored in the n-bit data storage regions Gma-Gmd, and the corresponding information DTout are stored in the time storage regions Tma-Tmad of the predetermined bit.

The composite data Cd so stored in the buffer is read therefrom by the image display means 14 according to the set display time information DTout and the scheduled display time information DTr (Step S32–S39).

When the measured time Mt of the image display means 14 reaches the scheduled display time T, the set display time DTout in the buffer 13 corresponding to the data ID Did identical to the output value bc of the counter, is input to the image display means 14, and the absolute value (|Tout–T|) of difference between the scheduled display time T and the set display time Tout is found as a comparison index value, which is compared to a threshold (the video data composition period Pcmp×0.5) (Step S34).

When decided that the index value is not larger than the threshold, the image display means 14 selects the composite data in the buffer of the data ID Did having the same value as the output value of the counter, and this composite data to the display 100 as the reproduced data Rd (Step S35). When the composite data is read from the buffer 13, the scheduled display time T as target time of standby in Step S32 is updated into subsequent scheduled display time (Step S35a).

Thereafter, the output value bc of the image display means 14 is incremented by one (Step S37), and it is decided whether or not the incremented output value bc is (bc=4) (Step 38). When decided that the output value bc is not (bc=4), processing in Step S32 is performed again, or otherwise, the output value bc of the counter is set to (bc=0) (Step S39).

In Step S39, the content of the composite data stored in the buffer 13 is updated, and composite data unavailable as the reproduced data is discarded. Then, processing of the image display means 14 returns to Step S32.

On the other hand, when decided that the index value is larger than the threshold in Step S34, the composite data having the data ID identical to the output value bc, is not selected as the composite data which is to be output at the scheduled display time T, and in Step S36, the set display time Tout of this composite data is compared to the scheduled display time T thereof.

When decided that the set display time Tout is larger than the scheduled display time T in Step S36, the measured time Mt identical to the scheduled display time of the image display means 14 has not reached the set display time of the composite data, (difference between the measured display time and the set display time is 75 msec or more), and therefore, the scheduled display time T as target time in the standby state in Step S32 is updated into a subsequent scheduled display time (Step S36a). Thereafter, the processing of the image display time 14 returns to Step S32, and is placed in the standby state until the measured time Mt reaches the updated scheduled display time T.

When decided that the set display time Tout is smaller than the scheduled display time T in Step S36, Steps S37–S39 are performed and the processing of the image display means 14 is placed in the standby state in Step S32.

Hereinafter, the standby state in Step S32, for example, the state in which data shown in FIG. 2(b) is stored in the buffer 13, will be explained.

In this case, in Step S32, suppose that the measured time Mt has not reached the scheduled display time (T=1000 msec), and the output value bc of the counter is "0". Also suppose that the data storage regions Gma-Gmd of the buffer 13 contain the composite data Cd5, Cd6, Cd7, and Cd8 corresponding to frames at 750 msec, 900 msec, 1050 msec, and 1200 msec (set display time Tout), respectively.

The composite data Cd5–Cd8 is data corresponding to 5th to 8th frames generated after the image output apparatus starts the composition process, and 1st to 4th composite data corresponding to frames at 150 msec, 300 msec, 450 msec, and 600 msec (set display time T) have been discarded from the buffer 13. The counter's value storage regions Bma, Bmb, Bmc, and Bmd of the buffer 13 contain values "0", "1", "2", and "3" of data ID Did corresponding to the respective composite data Cd5, Cd6, Cd7, and Cd8, respectively. The time information storage regions Tma, Tmb, Tmc, and Tmd contain 750 msec, 900 msec, 1050 msec, and 1200 msec as the corresponding set display time Tout, respectively.

Figure 4:
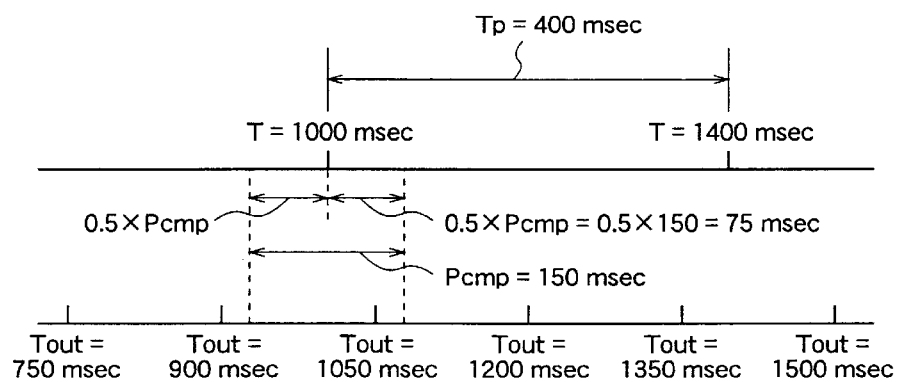
FIG. 4 is a diagram for explaining operation of the image output apparatus of the first embodiment, wherein the relationship among the scheduled display time, the set display time, and the composition period is illustrated.

FIG. 4 shows the largeness relationship among the scheduled display time T(1000 msec), the set display time Tout (750 msec, 900 msec, 1050 msec, 1200 msec) of the composite data Cd5–Cd8 stored in the buffer 13, and the period Pcmp of the composition process (150 msec).

In Step S33, the processing is placed in the standby state until the measured time Mt becomes the scheduled display time T (1000 msec), and then in Step S33, the set display time Tout (750 msec) of the composite data Cd5 having the data ID identical to the output value bc "0" is input to the image display means 14.

In Step S34, the image display means 14 decides whether or not the following expression (A) is satisfied.

$$|Tout-T| \leq 0.5 \times Pcmp \qquad (A)$$

Since Tout=750, T=1000, Pcm 32 150, |Tout−T|=250, 0.5×pcm=75, and therefore the expression (A) is not satisfied.

In Step S35, the image display means 14 decides whether or not the following expression (B) is satisfied.

$$Tout > T \qquad (B)$$

Since Tout=750, and T=1000, the expression (B) is not satisfied.

As a result, in the image display means 14, the output value bc of the counter is incremented by one (Step S37), and it is decided whether or not the output value bc is "4", that is, it is decided whether or not the following expression (C) is satisfied (Step S38).

$$bc=4 \qquad (C)$$

Since the output value bc is "1", and therefore the expression (C) is not satisfied, the processing of the image display means 14 returns to the standby state in Step S32.

At this time, the measured time Mt has reached the scheduled display time T (1000 msec). Hence, immediately processing in Step S33 is performed, and the set display time Tout (900 msec) of the composite data Cd6 having the data ID Did identical to the output value bc "1" is input to the image display means 14.

When the set display time is 900 msec, like the set display time (750 msec), the above expressions (A), (B), and (C) are not satisfied. Therefore, the image display means 14 performs processing in Steps S34, S36, S37, and S38, and thereby the output value bc of the counter becomes "2".

After the processing in Step S32, in the image display means 14, processing in Step S33 is performed. The set display time Tout (1050 msec) of the composite data Cd7 having the data ID identical to the output value bc "2" is input.

When the set display time is 1050 msec, the expression (A) is satisfied. Therefore, in the image display means 14, after the decision process in Step S34, the composite data Cd7 is read from the buffer 13 and the read composite data Cd 7 is output to the display 100 as the reproduced data Rd (Step S35). Following this, the scheduled display time T (=1000 msec) as target time in the standby state in Step S32 is changed into a subsequent scheduled display time T(=1400 msec) (Step S35a).

Thereafter, as described above, Steps S37 and S38 are performed, and the processing of the image display means 14 returns to processing in Step S32. At this time, the output value bc of the counter is "3". Since the composite data is read from the buffer 13 in Step S35, the scheduled display time T as target time in Step S32 is updated into subsequent planned displayed time (1400 msec) in Step S35a, and therefore, until the measured time Mt becomes the scheduled display time (1400 msec), the processing is placed in the standby state.

After the processing in Step S32, in the image display means 14, processing in Step S33 is performed. The set display time Tout (1200 msec) of the composite data Cd8 having the data ID Did identical to the output value bc "3" is input.

When the set display time is 1200 msec, the expressions (A) and (B) are not satisfied, and therefore, in the image display means 13, Steps S34, S36, S37, and S37 are performed as described above.

Specifically, the output value bc of the counter is incremented by one (Step S37), and then it is decided whether or not the output value bc is "4", that is, the following expression (C) is satisfied (Step S38).

$$bc=4 \qquad (C)$$

Since the output value bc of the counter is "4", and therefore, the expression (C) is satisfied, the output value bc is reset to "0" (Step S39), and the processing of the image display means 14 returns to the standby state in Step S32.

When the output value bc is reset to "0", in the buffer 13, the composite data is updated according to a buffer control signal Bct from the image display means 14.

FIG. 2(C) illustrates data storage regions in the buffer which contain updated composite data, and the data storage regions Gma, Gmb, Gmc, and Gmd contain composite data Cd9, Cd10, Cd11, and Cd112 corresponding to frames at 1350 msec, 1500 msec, 1650 msec, and 1800 msec (set display time Tout). The counter's value storage regions Bma, Bmb, Bmc, and Bmd of the buffer 13 contain values "0", "1", "2", and "3" of data ID Did corresponding to the respective composite data respectively. The time information storage regions Tma, Tmb, Tmc, and Tmd contain the 1350 msec, the 1500 msec, the 1650 msec, and the 1800 msec, respectively.

When the measured time reaches the scheduled display time (1400 msec) in Step S32 in the image display means 14, the processing in Step S33 is performed, and the set display time Tout (1350 msec) of the composite data Cd9 indicated by the output value bc of the counter is input.

When the set display time is 1350 msec, the expression (A) is satisfied. Therefore, in the image display means 14, after the decision process in Step S34, the composite data Cd9 is read from the buffer 13 and is output to the display 100 as the reproduced data Rd (Step S35). Following this, the scheduled display time T (=1400 msec) as target time in the standby state in Step S32 is changed into a subsequent scheduled display time T(=1800 msec) (Step S35a).

Thereafter, the output value bc of the counter is incremented by one (Step S37), and then it is decided whether or not the output value bc is "4", that is, the following expression (C) is satisfied (Step S38).

$$bc=4 \qquad (C)$$

Since the output value bc of the counter is "1" and therefore the expression (C) is not satisfied, the processing of the image display means 14 returns to the standby state in Step S32.

The above processing is repeated in the image display means 14.

Operation of the video data composition period determination means 15 will be discussed in detail.

Figure 5:
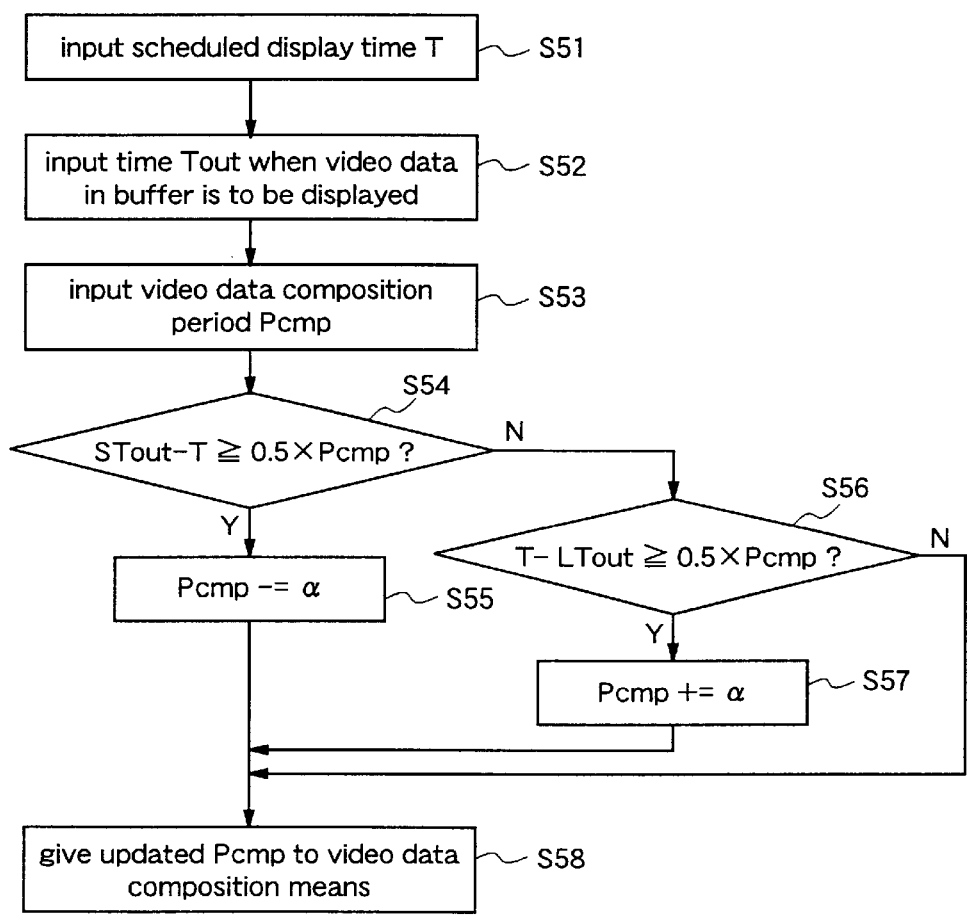
FIG. 5 is a diagram showing flow of a period decision process performed by the video data composition period determination means included in the image output apparatus of the first embodiment.

The video data composition period determination means 15 operates following flowchart shown in FIG. 5.

Initially, the control means 16 outputs the information DTr indicating the scheduled display time T to the video data composition period determination means 15 (Step S51). The buffer 13 outputs the information DTout indicating set display time Tout (time when the composite data Cd is to be displayed) thereto (Step S52). In addition, the video data composition means 12 outputs the information DP0 indicating the video data composition period Pcmp thereto (Step S53).

Then, the difference between the smallest (STout) of the set display time Tout supplied by the buffer 13 and the scheduled display time T, i.e., the index value, is compared to the value obtained by multiplying the video data composition period Pcmp by 0.5 (Step S54).

That is, it is decided whether or not the following expression (D) is satisfied.

$$STout - T \geq 0.5 \times Pcmp \quad (D)$$

When the expression (D) is satisfied, the video data composition period determination means 15 reduces the composition period Pcmp by a constant α (Step S55).

On the other hand, when the expression (D) is not satisfied, the value obtained by subtracting the largest (LTout) of the set display time Tout supplied by the buffer 13 from the scheduled display time T. i.e., the index value, is compared to "0.5×Pcmp" (Step S56).

Specifically, it is decided whether or not the following expression (E) is satisfied.

$$T - LTout \geq 0.5 \times Pcmp \quad (E)$$

When the expression (E) is satisfied, the video data composition determination means 15 increases the composition period Pcmp by α (Step S57).

On the other hand, when the expression (E) is not satisfied, the information indicating the composition period Pcmp output from the video data composition means 12 is not changed.

Period information indicating the video data composition period Pcmp obtained through Steps S54–S57 is output to the video data composition means 12 as the updated period information DP1 (Step S58).

The video data composition means 12 composites the video object data according to the most least composition period Pcmp so updated.

This will be explained below.

Figure 2:
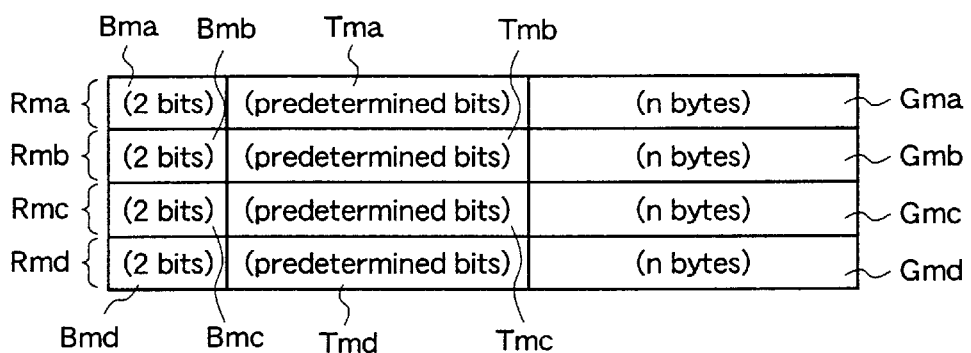
Figure 2:
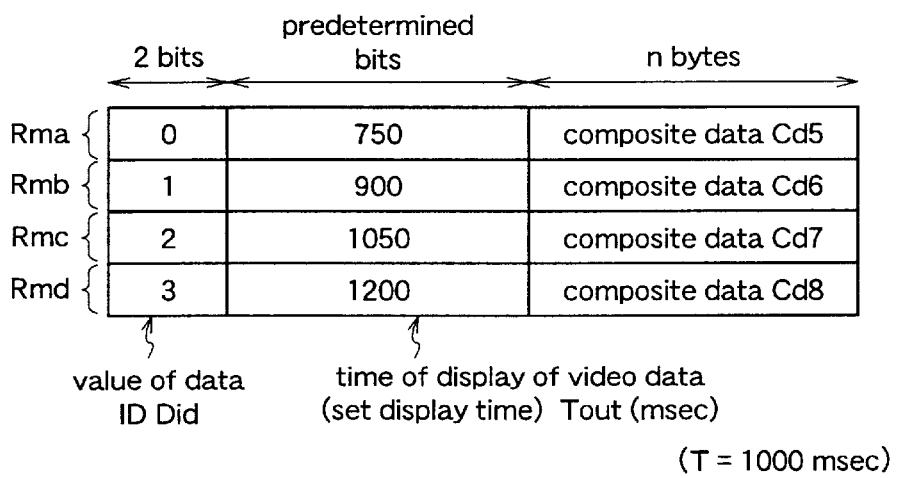
Figure 2:
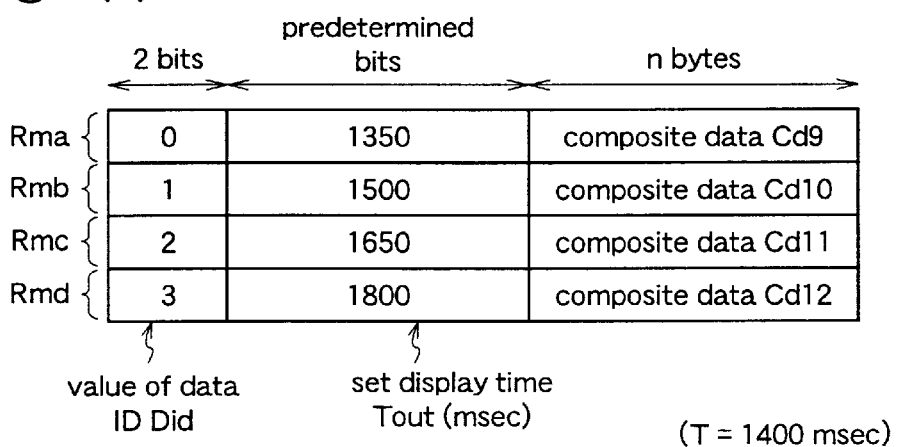

Turning to FIG. 2(*b*) again, the buffer 13 contains the composite data Cd5, Cd6, Cd7, and Cd8 at 750 msec, 900 msec, 1050 msec, and 1200 msec (set display time Tout). A description will be made to explain a case where the scheduled display time T is 1000 msec and the composition period Pcmp is 150 msec.

Since the difference between the smallest set display time STout and the scheduled display time T is "−250 msec", the expression (D) is not satisfied, and therefore, according to the decision in Step S54, the processing of the period determination means 15 moves to the decision process in Step S56.

Since the difference between the scheduled display time T and the largest set display time LTout is "−200 msec", which is smaller than 75 msec (composition period 0.5), according to the decision in Step S56, the composition period Pcmp, 150 msec, without being updated, is output to the video data composition means 12 as updated information DP1.

When the buffer contains the composite data Cd3, Cd4, Cd5, and Cd6 at 450 msec, 600 msec, 750 msec, and 900 msec (set display time Tout) and the scheduled display time T and the composition period Pcmp are 1000 msec and 150 msec, respectively, the video data composition means 12 updates the composition period such that it is increased described below.

In Step S54, the difference between the smallest set display time STout and the scheduled display time T is "−550 msec", the processing of the video data composition means 12 moves to processing in Step S56. When the difference between the scheduled display time T and the largest set display time LTout is "100 msec", and is larger than 75 msec (composition period Pcmp×0.5), and therefore the processing of the video data composition means 12 moves to the processing in Step S57. In Step S57, the composition period is increased by the predetermined value α. Assuming that a is 10 msec, the composition period Pcmp is updated from 150 msec to 160 msec. Then, in Step S58, the information indicating the updated composition period is output to the video data composition means 12 as the updated composition period DP1.

When the composition period Pcmp is changed, the video data composition means 12 performs the composition process by using decoded data (set composition time determined by the time stamp=planned composition time when the composition process is actually performed) or decoded data (the set composition time closest to and before the planned composition time).

For instance, assuming that a period Pdec in which each frame is decoded by the decoder is 120 msec, the decoder outputs decoded data obtained by decoding the encoded video object data corresponding to frames A–J to the video data composition means 12 every 120 msec as shown in FIG. 6(*a*). The first and second decoders 11*a* and 11*b* shown in FIG. 1 output the decoded data D1 and D2 of the first and second objects corresponding to the frames A–J every 120 msec.

In actuality, however, since the period Pcmp of the image composition process in the composition means 12 is 150 msec, the composition means 12 outputs composite data corresponding to the frames A–D and F–I as shown in FIG. 6(*b*), and skips the composition process of decoded data corresponding to the frames E and J. In this case, the decoders output the decoded data of the frames A–J every 120 msec. The video data composition means 12, when starting the composition process frame by frame, performs the composition process by using the decoded data output from the decoders at the start of this composition process.

Thus, the image output apparatus 110 of the first embodiment, includes the first and second decoders 11*a* and 11*b* for decoding the encoded video object data E1 and E2 corresponding to the first and second objects and outputting the decoded data D1 and D2, respectively, the video data composition means 12 for compositing the decoded data corresponding to the respective objects frame by frame according to the predetermined composition period and outputting the composite data Cd, the buffer 13 for storing the composite data Cd of the predetermined number of frames, and the image display means 14 for reading the composite data stored in the buffer 13 and outputting the composite data to the display, for determining the video data composition period Pcmp for the video data composition means according to a result of comparison between the scheduled display time T indicating the display period determined by the display capability and the set display time Tout when the composite data stored in the buffer is to be displayed. Therefore, operation load placed on the image display means is controlled according to intervals at which the composite data is output to the buffer frame by frame. Thereby, regardless of the processing ability of the image output apparatus, the audio data and video data are reproduced while maintaining synchronization between them, whereby lack of synchronization between the reproduced image and the reproduced audio is avoided.

While in the first embodiment, in step S54 or S56 performed by the video data composition period determination means 15, the difference between the smallest set display time and the scheduled display time or the difference between the scheduled display time and the largest set display time is compared to the threshold (composition period Pcmp×0.5), the threshold is not limited to this, and may be an arbitrary constant.

As described above, the threshold is set to (composition period Pcmp×0.5). This is because a larger threshold causes great difference between the reproduced time of audio data and the reproduced time of the video data although synchronization between the video data to-be-displayed and the other audio data is necessary, which makes viewers displeased with the reproduced image.

While in the first embodiment, the video data composition means 12 performs composition of respective frames by using the decoded data output from the decoders when compositing the respective frames, as shown in FIG. 6(b), the composition process by the composition means 12 is not limited to this.

For instance, the video data composition means 12 may use the decoded data output from the decoders at timing closest to timing when the respective frames are to be composited. For this case, it should be noted that a composition buffer for storing one frame of the decoded data output from the respective decoders is provided in a previous stage of the video data composition means 12, and the video data composition means 12 performs composition of the respective frames by using the decoded data output from the composition buffer.

In this case, the composition means 12 outputs the composite data corresponding to the frames A–C and E–H, and J as shown in FIG. 6(c), and therefore the composition process for the decoded data of the frames D and I is skipped.

While in the first embodiment the video data composition period is increased/decreased by using 10 msec as an increase/decrease amount α as a unit, this is not restrictive, and another value may be used.

When the α is smaller, it takes longer time to converge into a constant composition period CPcmp but this constant composition period CPcmp is closer to an optimum composition period MPcmp. Conversely, when the α is larger, it takes shorter time to converge into the constant composition period CPcmp but this constant composition period CPcmp is far from the optimum composition period MPcpm.

While in the first embodiment, the α is a fixed value, this may be a variable value. For instance, as shown in FIG. 7, an initial value of the α is "a", and when the updating process of the composition period Pcmp changes from "increase" to "decrease", (the initial value "a"×0.5) becomes a new α (0.5 a). Further, when the updating process of the composition period Pcmp changes from "decrease" to "increase", (0.5a×0.5=0.25a) becomes a new α. In this manner, the α may vary in such a way that it is gradually made smaller when increasing/decreasing the composition period.

In this method, the composition period Pcmp ultimately converges into the optimum composition period MPcmp reliably, and the time required from converging into the optimum composition period MPcmp is made shorter.

While in the first embodiment, the image output apparatus 110 includes the decoders corresponding to the first and second objects and the video data composition means composite the decoded data of these two objects, the image output apparatus is not limited to this. For example, the image output apparatus 110 may include decoders provided for three or more objects, and output composite data resulting from composition of these decoded data as reproduced data.

While in the first embodiment the buffer 12 is used for storing the composite data of 4 frames, the buffer 12 is not limited to this, and may store composite data of more frames.

While in the first embodiment the image output apparatus is constituted by hardware, the apparatus may be constituted by software rather than hardware.

For instance, functions of the decoders 11a and 11b, the video data composition means 12, the image display means 14, the video data composition period determination means 15, and the control means 16, may be implemented in a computer system by using a software program for making a CPU execute these functions.

In this case, the same effects of the first embodiment is achieved. The software pro-gram can be stored in a storage medium such as a floppy disc or an optical disc, IC card, an ROM cassette.

Embodiment 2

Figure 8:
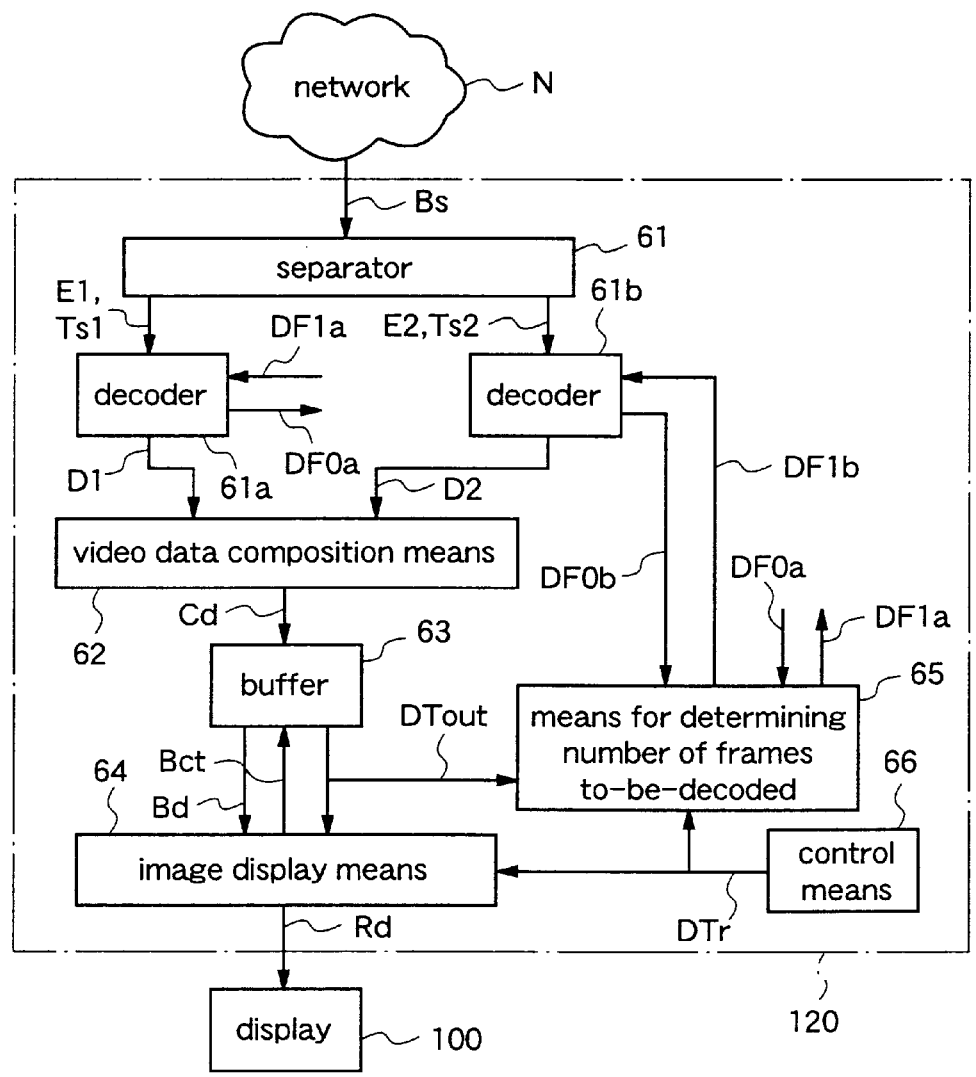
FIG. 8 is a block diagram showing a structure of an image output apparatus according to a second embodiment of the present invention.

FIG. 8 is a block diagram for explaining an image output apparatus according to a second embodiment of the present invention.

In the image output apparatus 120 of the second embodiment, the decoding process for decoding the encoded video object data corresponding to the first and second objects is controlled according to processing ability of the apparatus.

The image output apparatus 120, like the conventional image output apparatus 1160 shown in FIG. 18, includes a separator 61 for selecting packets of the first and second objects from a multiplexed bit stream Bs having a data structure shown in FIG. 16(a) which has been received through a transmission line of a network N, and extracting encoded video object data E1 an a time stamp Ts1 and encoded video object data E2 and a time stamp Ts2 of the respective objects.

The image output apparatus 120 further includes a first decoder 61a for decoding the encoded video object data E1 according to the time stamp Ts1 and outputting decoded data D1 corresponding to the first object, a second decoder 61b for decoding the encoded video object data E2 according to the time stamp Ts2 and outputting decoded data D2 corresponding to the second object, and video data composition means 62 for compositing these decoded data according to a predetermined composition period Pcmp and outputting composite data Cd corresponding to the desired scene.

Each of the first and second decoders 61a and 61b is adapted to output information DF0a and DF0b indicating the number of frames to be decoded per unit time (hereinafter referred to as the number of image frames to-be-decoded), and update the number of the image frames to-be-decoded per unit time according to updated information DF1a and DF1b. Each of the decoders 61a and 61b is adapted to determine a frame to-be-decoded according to a type of encoding of the encoded video object data, when changing the number off frames to-be-decoded per unit time according to the information indicating the number of frames to-be-decoded. A encoding process for each frame includes an intra-frame encoding process using intra-frame correlation of pixel values, and an inter-frame predictive encoding process using inter-frame correlation of pixel values. The inter-frame predictive encoding process includes forward predictive encoding process and bidirectionally predictive encoding process. The intra-frame encoded frame is called an I frame, the frame which has been subjected to the forward predictive encoding process is called a P frame, and the frame which has been subjected to the bidirectionally predictive encoding process is called a B frame.

The image output apparatus 120 still further includes a buffer 63 for storing composite data Cd output at predetermined timing from the video data composition means 62, image display means 64 for reading data Bd stored in the buffer 63, and outputting read data to the display 100 as reproduced data Rd, means (determination means) 65 for determining the number of frames to-be-decoded per unit time and outputting updating information DF1a and DF1b indicating the number of frames to-be-decoded to the respective decoders 61a and 61b, respectively, and control means 66 for outputting information DTr indicating scheduled display time T according to the image display period determined according to the processing ability of the image output apparatus 120.

The construction of the buffer 63 is identical to that of the buffer 12 of the first embodiment. The determination means 65 is adapted to receive information DTout indicating the set display time Tout according to the time stamp output from the buffer 63, the information DTr indicating the scheduled display time T, and the information of the number of frames DF0a and DF0b at this point of time, and update the number of frames to-be-decoded per unit time according to a result of comparison between the set display time Tout and the scheduled display time T, and output information DF1a and DF1b indicating the updated number of frames to be decoded.

The constructions of the image display means 64 and the control means 66 are identical to those of the image display means 14 and the control means 16 of the first embodiment.

Subsequently, operation will be described.

When the bit stream Bs including packets storing the encoded video object data corresponding to the first and second objects is input to the image output apparatus 120 through the transmission line on the network N, the separator 61 selects packets of the corresponding objects, and output the encoded video object data E1 and the time stamp Ts1, and the encoded video object data E2 and the time stamp Ts2 to the first and second decoders 61a and 62b, respectively, frame by frame.

The decoders 61a and 61b decode the encoded video object data E1 and E2 frame by frame, at decoding times determined by the time stamps Ts1 and Ts2, and output decoded data D1 and D2, respectively. In this case, the determination means 65 updates the number of frames to-be-decoded Fn according to the information DTout of the set display time Tout from the buffer 63, the scheduled display time DTr from the control means 66, and the information DF0a and DF0b if the number of frames to-be-decoded from the respective decoders 61a and 61b, and outputs the information DF1a and DF1b indicating the resulting updated number of frames to-be-decoded Fn, to the decoders 61a and 61b, respectively. The decoders 61a and 61b performs decoding according to the updated number of frames to-be-decoded Fn per unit time.

The decoded data D1 and D2 are input to the video data composition means 62, which generates composite data Cd corresponding to a desired scene according to a predetermined composition period Pcmp and outputs the composite data Cd to the buffer 63.

The image display means 64 reads composite data Bd from the buffer 63 according to the scheduled display time information DTr and the set display time information DTout as reproduced data Rd, and displays the desired scene based on the reproduced data Rd.

Operation of the determination means 65 will be described in detail.

Figure 9:
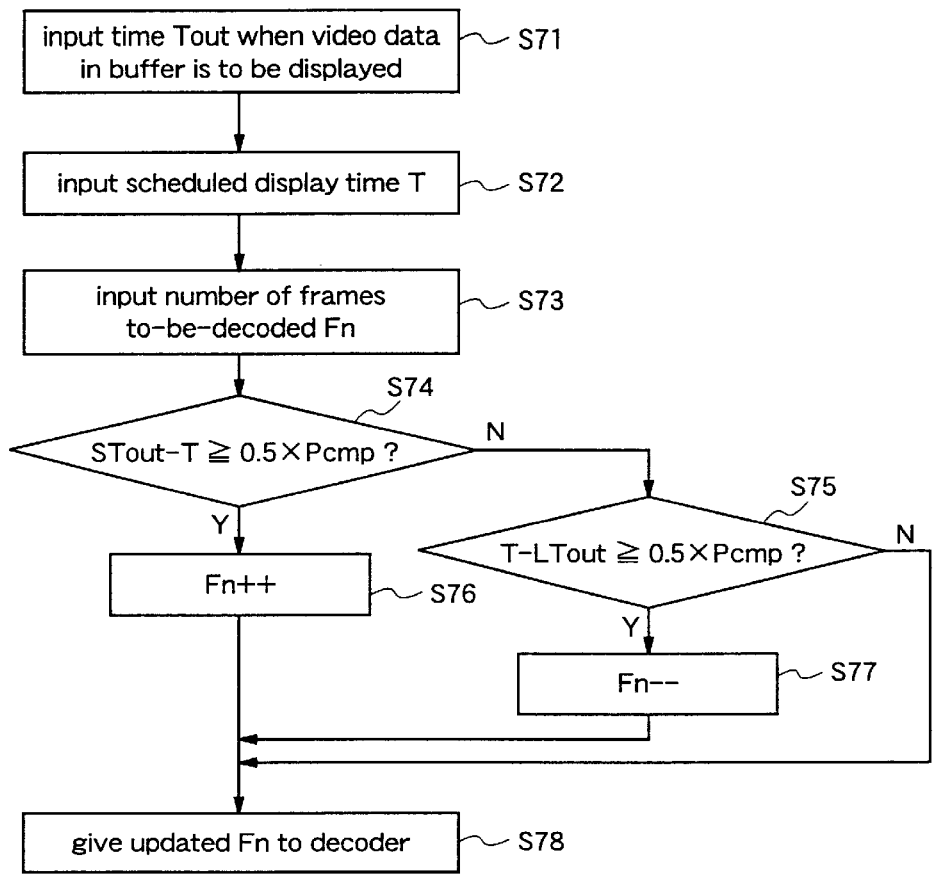
FIG. 9 is a flowchart showing processing performed by the video data composition period determination means included in the image output apparatus of the second embodiment.

FIG. 9 is a flowchart for explaining operation of the determination means 65. Operation of the determination means 65 is performed along with flowchart showing in FIG. 9.

Initially, the information DTout indicating the set display time Tout stored in the buffer 63 is input to determination means 65 (Step S71). The information DTr indicating the scheduled display time T from the control means 66 is input to the determination means 65 (Step S72). The information DF0a and DF0b indicating the number of frames to-be-decoded Fn from the decoders 61a and 61b are input to the determination means 65 (Step S73).

Then, the difference between the smallest (STout) of the set display time Tout supplied by the buffer 13 and the scheduled display time T, i.e., the index value, is compared to the value obtained by multiplying the video data composition period Pcmp by 0.5 (Step S74).

That is, it is decided whether or not the following expression (D) is satisfied.

$$STout - T \geq 0.5 \times Pcmp \tag{D}$$

When the expression (D) is satisfied, the determination means 65 increases the number of frames to-be-decoded by one (Step S76).

On the other hand, when the expression (D) is not satisfied, the value obtained by subtracting the largest (LTout) of the set display time Tout supplied by the buffer 13 from the scheduled display time T. i.e., the index value, is compared to "0.5×Pcmp" (Step S75).

Specifically, it is decided whether or not the following expression (E) is satisfied.

$$T - LTout \geq 0.5 \times Pcmp \tag{E}$$

When the expression (E) is satisfied, the determination means 15 reduces the number of frames to-be-decoded Fn by one (Step S77).

On the other hand, when the expression (E) is not satisfied, the number of frames to-be-decoded indicated by the information DF0a and DF0b from the decoders 61a and 61b are not changed.

The information indicating the number of frames to-be-decoded Fn obtained through Steps S74–S77 is output to the decoders 61a and 61b as the information DF1a and DF1b indicating the updated number of frames, to the decoders 61a and 61b (step S78).

The decoders 61a and 61b decode the encoded video object data according to most-recent number of frames to-be-decoded Pcmp so updated.

A description will be explain a method for dropping frames to-be decoded by using the decoders 61a and 61b. In this method, according to the type of encoding of the frame, that is, according to information about whether the encoded frame is the B frame, the P frame, or the I frame, frames to-be-dropped are set.

First, the B frame is dropped. If necessary, then the P frame is dropped. Since the I frame is used as a reference frame for encoding another frame to-be-encoded, it is least desirable to drop the I frame. But, if all the P frames are dropped, and dropping is still necessary, the I frame is dropped.

The respective decoders 61a and 61b decodecoded video object data (decoding time obtained from the time stamp= actual decoding time) or encoded video object data (decoding time obtained from time stamp before and closest to actual decoding time).

Figure 10:
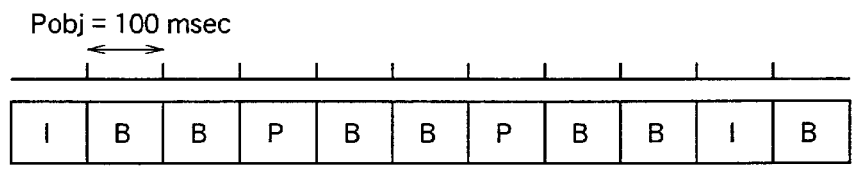
FIGS. 10(a) and 10(b) are diagrams showing relationship between timing when encoded video object data is input to a decoder and timing when encoded video object data is decoded by the decoder.
Figure 10:
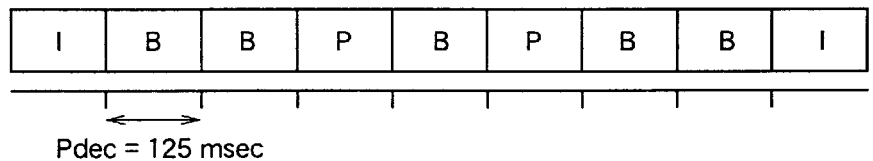

As shown in FIG. 10, assuming that the number of frames of encoded video object data per unit time is 10 frames per second, and two B frames are placed between each I frame and each P frame, the period during which the encoded video object data is input to the decoder is 100 msec, and the encoded video object data is input.sequentially to the decoder as shown in FIG. 10(a). In FIGS. 10(a) and 10(b), "I", "P" and "B" denote the I frame, the P frame, and the B frame, respectively.

Assuming that the updated number of frames to-be-decoded Fn per unit time is 8 frames per second, the decoder decodes respective frames with a decoding period Pdec of encoded video object of 125 msec, and in the order shown in FIG. 10(b). In this case, therefore, the 5th and 11th frames shown in FIG. 10(a) input to the decoder are dropped.

Thus, in accordance with the second embodiment, according to a result of comparison between the set display time Tout when the composite data Cd stored in the buffer 63 is to be displayed and the scheduled display time T determined by the processing ability of the apparatus, the number of frames to-be-decoded per unit time performed by the decoder is determined. Therefore, display is performed according to the processing ability of the video data composition means 65 and the image display means 64.

While in the second embodiment, in step S74 or S76 performed by the determination means 65, the difference between the smallest set display time STout and the scheduled display time T or the difference between the scheduled display time T and the largest set display time LTout is compared to the threshold (composition period Pcm×0.5), the threshold is not limited to this, and may be an arbitrary constant.

As described above, the threshold is set to (composition period Pcmp×0.5). This is because a larger threshold causes great difference between the reproduced time of audio data and the reproduced time of the video data although synchronization between reproducing time of audio data and reproducing time of video data, which makes viewers displeased with the reproduced image.

Embodiment 3

Figure 11:
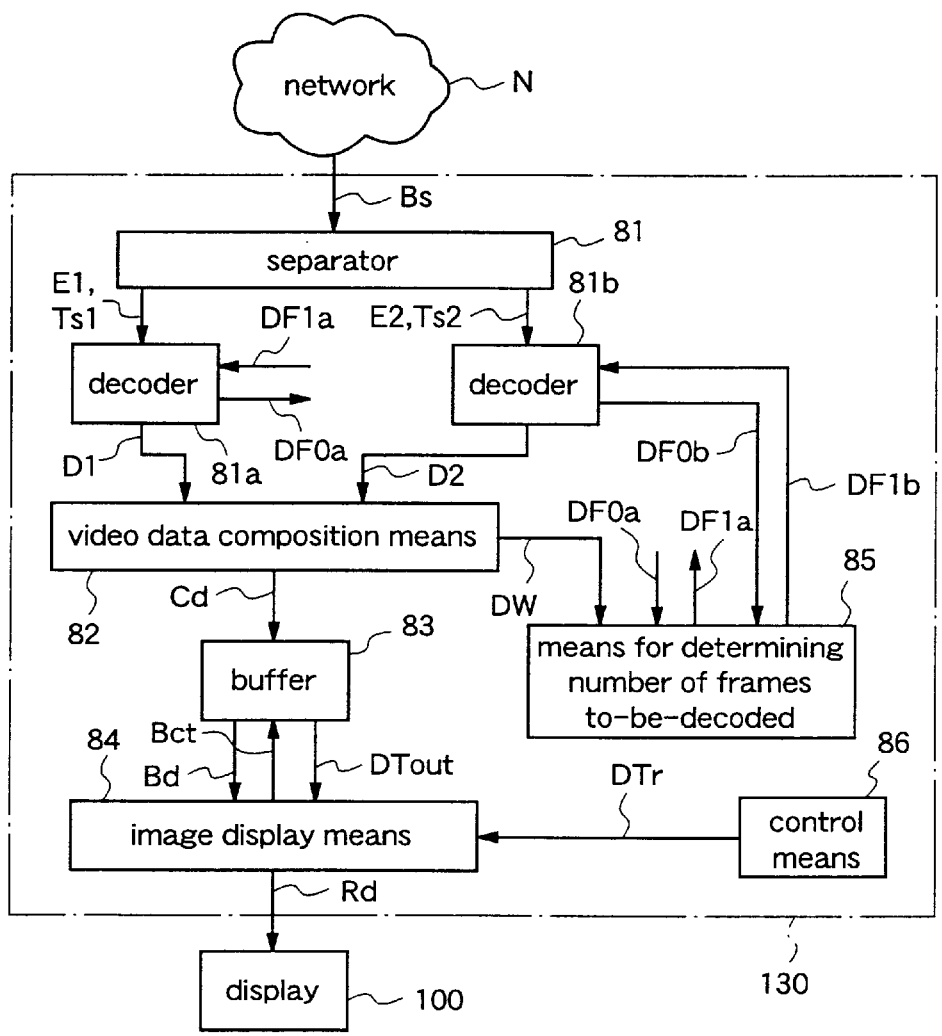
FIG. 11 is a block diagram showing a structure of an image output apparatus according to a third embodiment of the present invention.

FIG. 11 is a block diagram for explaining an image output apparatus according to a third embodiment of the present invention.

An image output apparatus 130 of the third embodiment is, like the image output apparatus of the second embodiment, adapted to control decoding of encoded video object data corresponding to first and second objects according to its processing ability. Unlike the image output apparatus of the second embodiment in which the number of video frames to-be-decoded by the decoder per unit time is changed according to a result of comparison between the set display time Tout and the scheduled display time T of each frame, the image output apparatus of the third embodiment is adapted to change it according to waiting time before composite data is written to from video data composition means to a buffer.

The image output apparatus 130 includes, like the conventional image output apparatus 160 shown in FIG. 18, a separator 81 for selecting packets of the first and second objects from a multiplexed bit stream Bs having a data structure shown in FIG. 16(a) which has been received through a transmission line on a network N, and extracting encoded video object data E1 an a time stamp Ts1 and encoded video object data E2 and a time stamp Ts2 of the respective objects.

The image output apparatus 130 further includes a first decoder 81a for decoding the encoded video object data E1 according to the time stamp Ts1 and outputting decoded data D1 of the first object, a second decoder 81b for decoding the encoded video object data E2 according to the time stamp Ts2 and outputting decoded data D2 of the second object, video data composition unit 82 for compositing these decoded data according to a predetermined composition period Pcmp and outputting composite data Cd corresponding to a desired scene, and a buffer 83 for storing composite data Cd output at a predetermined timing from the video data composition means 82.

The construction of the buffer 83 is identical to that of the buffer 62 of the second embodiment. The first and second decoders 81a and 81b output information DF0a and DF0b of the number of frames indicating the number Fn of frames to-be-decoded per unit time, and update the number of video frames to-be-decoded per unit time according to updated information DF1a and DF1b, respectively. The video data composition means 82 is adapted to output information DW indicating timing at which the composite data Cd is written to the buffer 13.

The image output apparatus 130 still further includes image display means 84 for reading data Bd stored in the buffer 83 as reproduced data Rd and outputting the data Bd to the display 100, means (determination means) for determining the number of frames to-be-decoded Fn per unit time according to the writing timing information DW, and outputting the updated information DF1a and DF1b indicating the determined number of frames to-be-decoded to the decoders 81a and 81b, respectively, and control means 86 for outputting the information DTr indicating the scheduled display time T according to the image display period determined by processing ability of the image out apparatus 130. The constructions of the image display means 84 and the control means 86 are identical to those of the first embodiment.

Subsequently, operation will be described.

When the bit stream Bs including packets which contain encoded video object data corresponding to the first and second objects is input to the image output apparatus 130 through the transmission line on the network N, the separator 81 selects the packets of the first and second objects and outputs the encoded video object data E1 and the time stamp Ts1, and the encoded video object data E2 and the time stamp Ts2, to the first and second decoders 11a and 11b, respectively.

The decoders 81a and 81b decode the encoded video object data E1 and E2 frame by frame at decoding times determined by the time stamps Ts1 and Ts2, and output decoded data D1 and D2. The determination means 85 updates the number of frames to-be-decoded according to the information DW indicating timing when the composite data Cd is written from the video data composition means 82 to the buffer 83, and outputs the information DF1a and DF1b indicating the updated number of frames to-be-decoded to the decoders 81a and 81b, respectively. The decoders 81a and 81b performs decoding according to the updated number of frames to-be-decoded Fn per unit time.

When the decoded data D1 and D2 are input to the video data composition means 82, the composition means 82 generates composite data Cd corresponding to a desired scene according to a predetermined composition period Pcmp and outputs the composite data Cd to the buffer 83.

The image display means 84 reads composite data Bd from the buffer 83 as reproduced data Rd from the buffer 83 according to the scheduled display time information DTr and the set display time information DTout, to the display 100, which displays the desired scene based on the reproduced data Rd.

Figure 12:
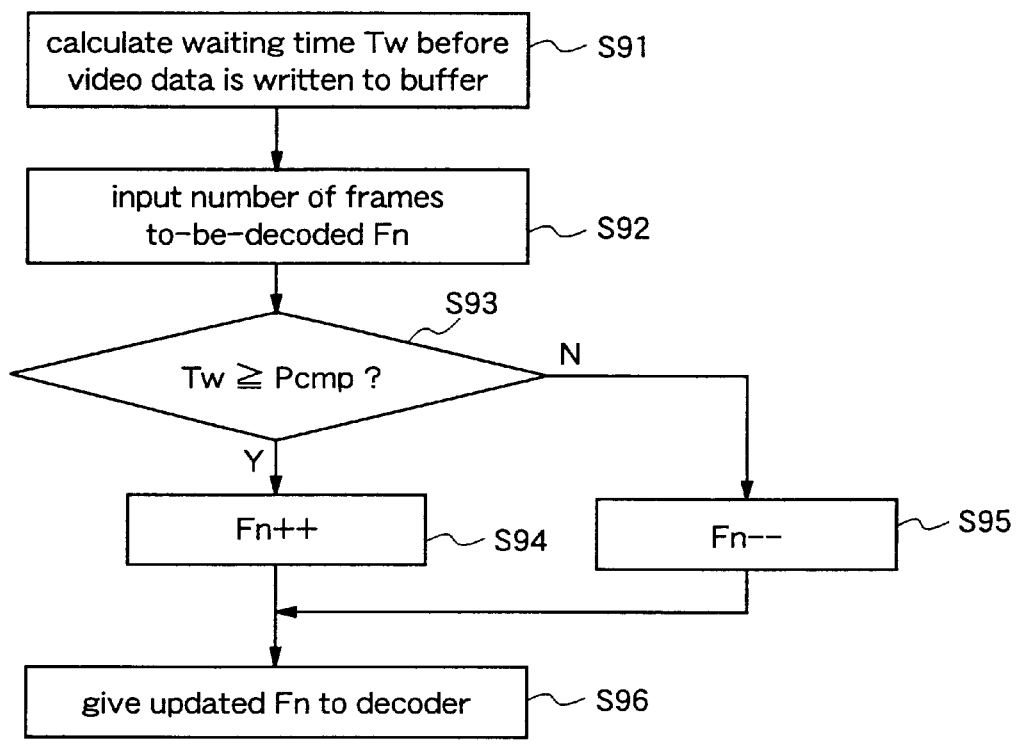
FIG. 12 is a flowchart showing flow of processing performed by means for determining the number of frames to-be-decoded included in the image output apparatus of the third embodiment.

FIG. 12 is a flowchart for explaining operation of the determination means 85.

Initially, the determination means 85 generates waiting time Tw before the composite data Cd is written to the buffer 83, according to the timing information DW (Step S91). Then, the decoders 81a and 81b output the information DF0a and DF0b to the determination means 85 (Step S82).

The writing waiting time Tw is compared to the value obtained by multiplying the video data composition period Pcmp by 0.5 (Step S93).

Specifically, it is decided whether or not the following expression (F) is satisfied.

$$Tw \geq Pcmp \tag{F}$$

When the expression (F) is satisfied, the determination means 85 increases the number of frames to-be-decoded by one (Step S94), or otherwise, it reduces the number of frames Fn by one (Step S95).

The information indicating the number of frames Fn indicating the number of frames to-be-decoded obtained through Steps S93–S95, i.e., the information DF1a and DF1b of the updated number of frames, are input to the decoders 81a and 81b, respectively (Step S96).

The decoders 81a and 81b decode the encoded video object data E1 and E2 according to the (most recent) number of frames Fn so updated. The decoders 81a and 81b respectively drop frames and decode the encoded video object data, like the decoders 61a and 61b of the second embodiment.

In accordance with the third embodiment, since the number of frames to-be-decoded by the decoder is determined according to the waiting time before the composite data composited by the video data composition means is written to the buffer, the image output apparatus is capable of displaying the image depending upon the processing ability of the video data composition means, whereby the buffer 83 will not overflow or underflow.

While in the third embodiment, in Step S93 performed by the determination means 85, the composition period Pcmp is used as the threshold compared to the waiting time before the composite data is written from the video data composition means to the buffer, the threshold is not limited to this, and arbitrary numbers may be used.

The reason why the composition period is used as the threshold in this embodiment is as follows. When the waiting time Tw is smaller than the composition period Pcmp, processing by the video data composition means and the image display means require time, and thereby the buffer might overflow, or otherwise, time required from processing by the video data composition means and the image display means is shorter than time required for decoding, and thereby the buffer might underflow.

Embodiment 4

Figure 13:
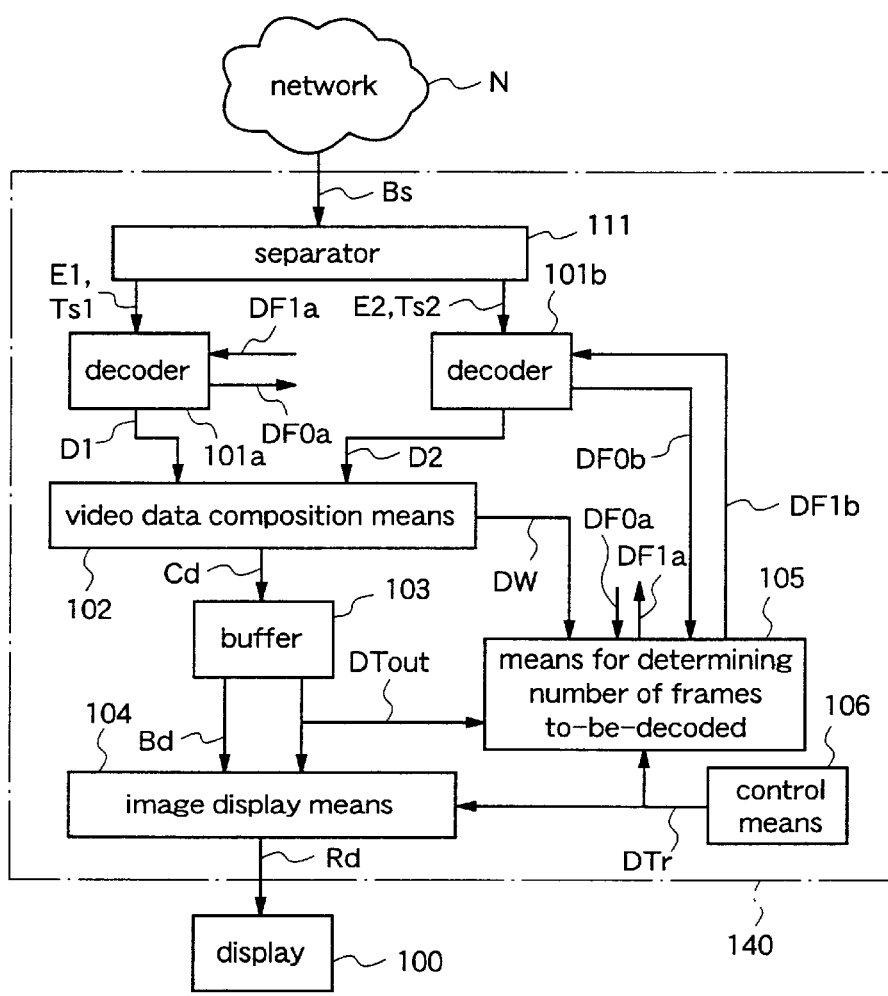
FIG. 13 is a block diagram showing a structure of an image output apparatus according to a fourth embodiment of the present invention.

FIG. 13 is a block diagram for explaining an image output apparatus according to a fourth embodiment of the present invention.

In an image output apparatus 140 of the fourth embodiment, the means for determining the number of frames to-be-decoded 65 of the second embodiment, which changes the number of frames to-be-decoded Fn by the decoder per unit time according to a result of comparison between the set display time Tout and the scheduled display time T of each frame, has been replaced by means (determination means) for determining the number of frames to-be-decoded 105, which changes the number of frames to-be-decoded Fn by the decoder per unit time according to a result of comparison between the set display time Tout and the scheduled display time of each frame, and waiting time before the composite data is written from the video data composition means to the buffer.

A separator 111, decoders 101a and 101b, video data composition means 102, a buffer 103, image display means 104, and control means of the image output apparatus 140 are identical to the separator 81, the decoders 81a and 81b, the video data composition means 82, the buffer 83, the image display means 84, and the control means of the third embodiment.

Subsequently, operation will be described.

Operation of the image output apparatus 140 is identical to operation of the image output apparatus 130 of the third embodiment except operation of the determination means 105, which will be discussed below.

Figure 14:
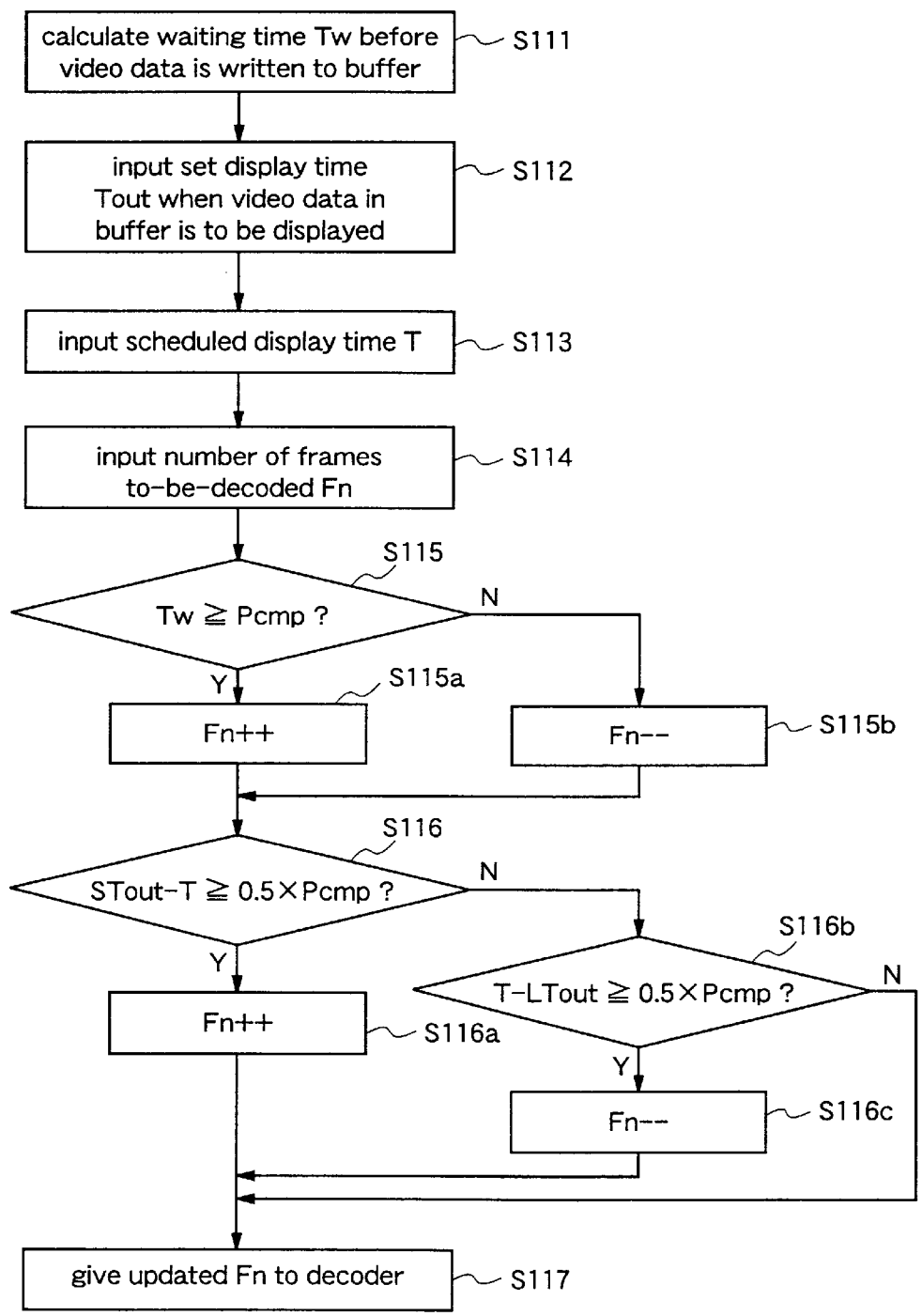
FIG. 14 is a diagram showing flow of processing performed by means for determining the number of frames to-be-decoded included in the image output apparatus of the fourth embodiment.

FIG. 14 is a flowchart for explaining operation of the determination means 105.

The determination means 105 generates the waiting time Tw before the composite data is written to the buffer 103, according to the timing information DW when the video data composition means 102 outputs the composite data Cd to the buffer 103 (Step S111).

The information DTout indicating the set display time Tout (time when each composite data Cd in the buffer is to be displayed) stored in the buffer 103 is input to the determination means 65 (Step S112). The information DTr indicating the scheduled display time T from the control means 106 is input to the determination means 105 (Step S113). The information DF0a and DF0b indicating the number of frames to-be-decoded Fn from the decoders 101a and 101b are input to the determination means 105 (Step S114).

The determination means 105 compares the writing waiting time Tw to (0.5×Pcmp) (Step S115).

Specifically, it is decided whether or not the following expression (F) is satisfied.

$$Tw \geq Pcmp \tag{F}$$

When the expression (F) is satisfied, the determination means 115 increases the number of frames to-be-decoded Fn by one (Step S115a).

On the other hand, when the expression (F) is not satisfied, the determination means 105 reduces the number of frames to-be-decoded Fn by one (Step S115b).

Then, the difference between the smallest (STout) of the set display time Tout supplied by the buffer 103 and the scheduled display time T, i.e., the index value, is compared to the value obtained by multiplying the video data composition period Pcmp by 0.5 (Step S116).

That is, it is decided whether or not the following expression (D) is satisfied.

$$STout - T \geq 0.5 \times Pcmp \tag{D}$$

When the expression (D) is satisfied, the determination means 105 increases the number of frames to-be-decoded by one (Step S116a). On the other hand, when the expression (D) is not satisfied, the value obtained by subtracting the largest (LTout) of the set display time Tout supplied by the buffer 103 from the scheduled display time T. i.e., the index value, is compared to "0.5×Pcmp" (Step S116b).

Specifically, it is decided whether or not the following expression (E) is satisfied.

$$T-\text{LTout} \geq 0.5 \times \text{Pcmp} \quad (E)$$

When the expression (E) is satisfied, the determination means 105 reduces the number of frames to-be-decoded Fn by one (Step S116c). On the other hand, when the expression (E) is not satisfied, the number of frames to-be-decoded Fn indicated by the information DF0a and DF0b from the decoders 101a and 101b is not updated.

Then, information indicating the number of frames to-be-decoded Fn resulting from Steps 115, S115a–S115c, S116, S116a–S116c, i.e., information DF1a and DF1b of the updated number of frames, are output to the decoders 101a and 101b, respectively (Step S117).

The decoders 101a and 101b decode the encoded video object data according to the (most recent) number of frames Fn so updated. The decoders 101a and 101b respectively drop frames to-be-decoded and decode the encoded video object data, like the decoders 61a and 61b of the second embodiment.

In accordance with the fourth embodiment, since the number of frames to-be-decoded Fn by the respective decoders 101a and 101b per unit time is determined according to the waiting time Tw before the composite data Cd is written to the buffer 103, and comparison between the set display time Tout when the composite data Cd stored in the buffer 103 is to be displayed and the scheduled display time T determined by processing ability of the apparatus, the image output apparatus is capable of displaying the image depending upon the processing ability of the video data composition means 102 and the image display means 104, with no overflow or underflow occurring in the buffer 103.

While in the fourth embodiment, in Step S105 performed by the determination means 105, the composition period Pcmp is used as the threshold compared to the waiting time Tw before the composite data is written from the video data composition means to the buffer, the threshold is not limited to this, and arbitrary numbers may be used. The reason why the position period Pcmp is used as the threshold is the same in the third and fourth embodiments.

While in the fourth embodiment the difference between the smallest set display time STout and the scheduled display time T or the difference between the scheduled display time T and the largest set display time LTout is compared to the threshold (0.5×Pcmp), the threshold may be an arbitrary constant. The reason why the threshold is (0.5×Pcmp) is the same in the second and fourth embodiments.

While in the second, third, and fourth embodiments, the numbers of frames to-be-decoded Fn of respective encoded video data are the same, these number may differ from each other. In this case, the means for determining then umber of frames to-be-decoded is provided for each of the encoded video object data, for determining the number of frames to-be-decoded Fn for each encoded object data.

While in the second, third, and fourth embodiments, the buffer contains composite data of 4 frames, the construction of the buffer is not limited to this. The buffer may store composite data of more frames.

While in the second, third, and fourth embodiments, the image output apparatus includes decoders for the first and second objects, and the video data composition means composites decoded data corresponding to the first and second objects, the construction of the image output apparatus is not limited to this. For instance, the image output apparatus may include decoders for three or more objects, and output composite data obtained by compositing these decoded data.

While in the first to fourth embodiments, the image outputs includes decoders provided for the respective objects composing the scene, it may include one decoder for decoding coded video object data corresponding to the respective objects by time sharing. Further, the image output apparatus may include decoders fewer than the objects composing the scene, for sharing decoding of the coded video object data. For instance, decoding of coded video object data corresponding to 5 objects maybe performed by 2 decoders. In this case, one decoder decodes coded video object data corresponding to two objects and the other decoder decodes coded object data corresponding to 3 objects.

While in the second, third, and fourth embodiments the image output apparatus is constituted by hardware, the apparatus may be constituted by software rather than hardware.

For instance, functions of the decoders, the video data composition means, the image display means, the means for determining the number of frames to-be-decoded, and the control means, may be implemented in a computer system by using a software program for making a CPU execute these functions.

In this case, the same effects of the first embodiment is achieved. The software program can be stored in a storage medium such as a floppy disc or an optical disc, IC card, an ROM cassette.

Hereinafter, a description will be made to explain an independent computer system for implementing processing of the image output apparatus of each of the above embodiments by software.

Figure 15:
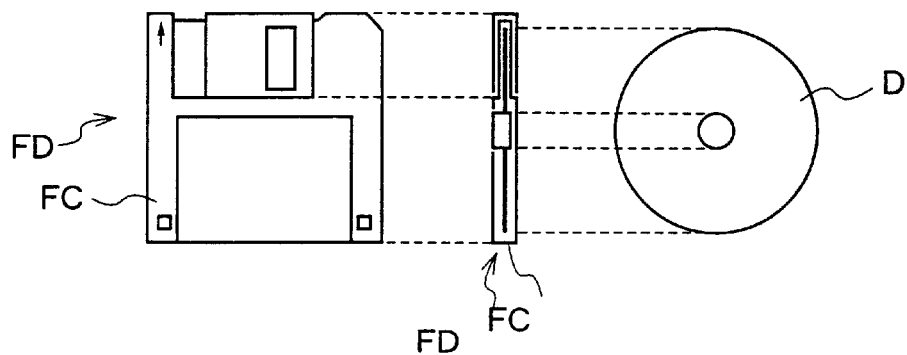
FIGS. 15(a)–15(b) are diagrams for explaining data storage medium which contains a program which makes a computer system perform encoding and decoding of each of the above embodiments and FIG. 15(c) is a diagram for explaining the computer system.
Figure 15:
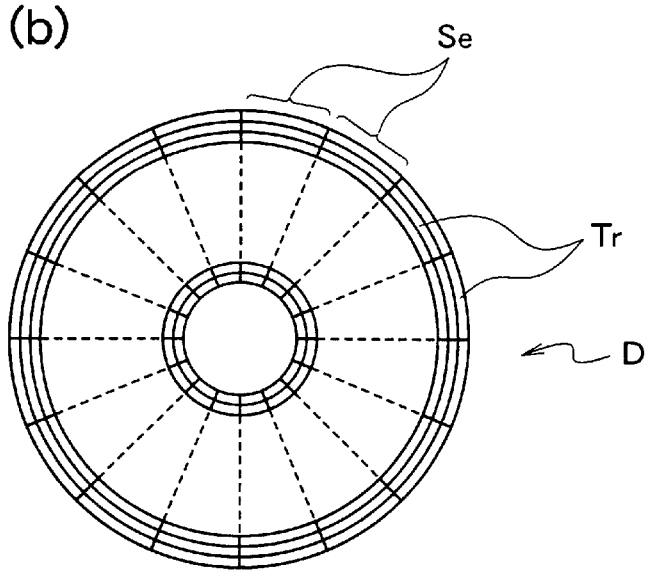
Figure 15:
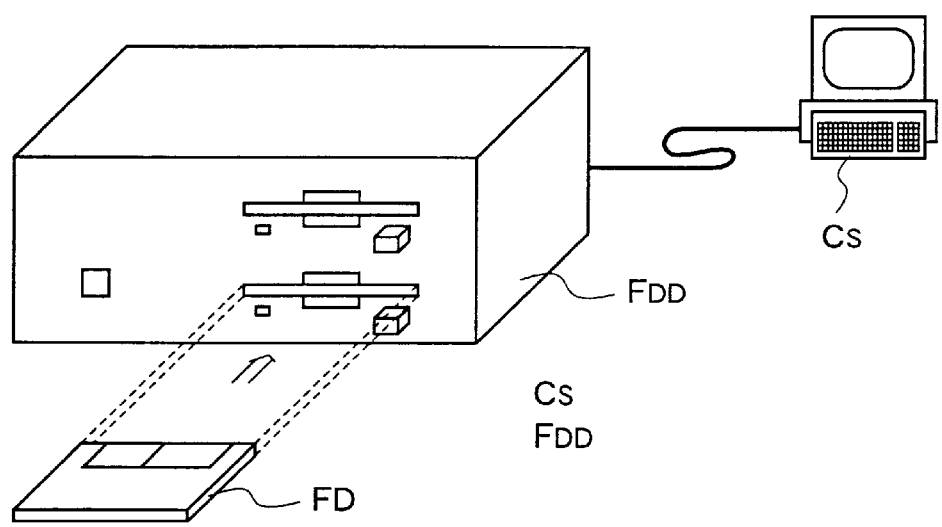

FIGS. 15(a)–15(c) are diagrams for explaining the case where the encoding process of the first embodiment is executed by a computer system, using a floppy disk which contains the image encoding program.

FIG. 15(a) shows a front view of a floppy disk FD, a cross-sectional view thereof, and a floppy disk body D. FIG. 15(b) shows an example of a physical format of the floppy disk body D.

The floppy disk FD has the configuration in which a floppy disk case FC contains the floppy disk body D. On the surface of the floppy disk body D, a plurality of tracks Tr are formed concentrically from the outer circumference of the disk toward the inner circumference. Each track Tr is divided into 16 sectors (Se) in the angular direction. Therefore, in the floppy disk FD having the above-mentioned program, data of the program is stored in the assigned sectors on the floppy disk body D.

FIG. 15(c) illustrates the construction for storing the program in the floppy disk FD and performing the image processing using the program stored in the floppy disk FD.

To be specific, when the program is stored in the floppy disk FD, data of the program is written in the floppy disk FD from the computer system Cs through the floppy disk drive FDD. When the above-described audio encoding apparatus is constructed in the computer system Cs by the program recorded in the floppy disk FD, the program is read from the floppy disk FD by the floppy disk drive FDD and then loaded to the computer system Cs.

While in the above description the floppy disk is employed as the data storage medium, an optical disk may be employed to perform an audio encoding process by software like the floppy disc. Further, the data storage medium is not restricted to the floppy disc and the optical disc. Any medium may be employed as long as it can contain the program, for example, an IC card, ROM cassette, etc. In this case, also, the audio encoding process by software can be performed in a like manner as the case of using the floppy disk.

Embodiment 5

Figure 19:
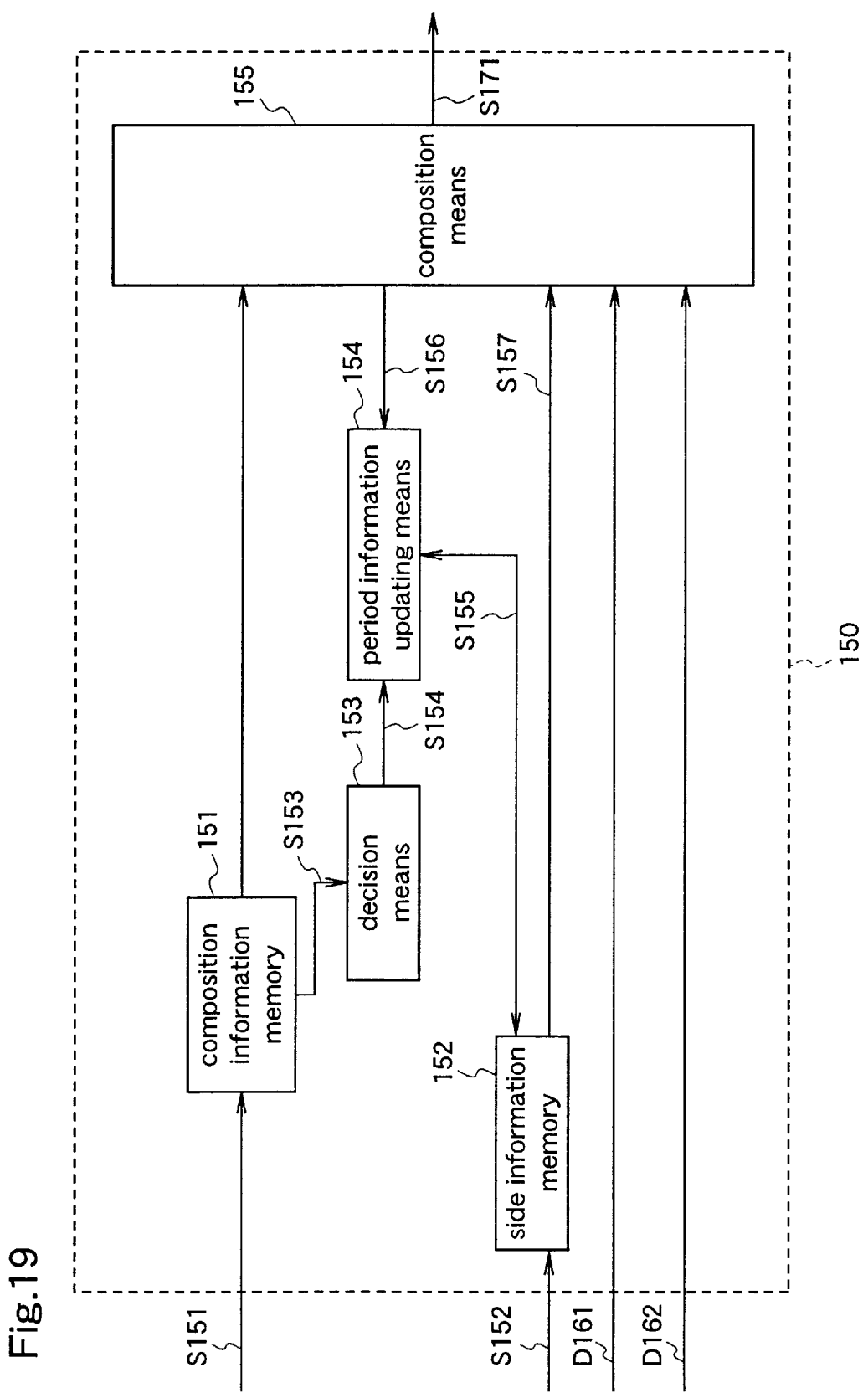
FIG. 19 is a block diagram for explaining an video object data composition apparatus according to a fifth embodiment of the present invention.

FIG. 19 is a block diagram for explaining an object composition apparatus according to a fifth embodiment of the present invention.

An object composition apparatus 150 of the fifth embodiment is adapted to receive video object data (object data) corresponding to a plurality of objects composing a scene, program information including composition information S151 used for compositing these object data and side information S152 relating to respective objects, as auxiliary information, and output video data S171 corresponding to a composite image composed of these objects to a display unit (not shown) or a storage medium (not shown).

The composition information S151 is scene description data represented as a scene description language according to MPEG4 (see FIG. 28). The side information S152 is an object descriptors (see FIG. 29) according to MPEG4. For convenience, suppose that the plurality of objects are first and second video object data D161 and D162.

The object composition apparatus 150 includes a composition information memory 151 for storing the composition information S151, a side information memory 152 for storing the side information S152, and decision means 153 for deciding whether or not object data of each object needs to be repeatedly reproduced according to the composition information stored in the composition information memory 151 and outputting a control signal S154. The side information memory 152 is used for storing updated frame updating period information S155 of each object as well as the side information S152.

The object composition apparatus 150 includes composition means 155 for compositing the first and second video object data D161 and D162 according to the composition information S151 in the composition information memory 151 and outputting composite video data S171. In the composition means 155, a frame updating period determined in advance by its data processing ability is used as a frame updating period of the composite image. Note that a frame updating period indicated by updating period information S157 in the side information memory 152 may be used as the frame updating period of the composite image.

The object composition apparatus 150 still further includes period information updating means 154 for updating a frame updating period of a target object on which decision is made by the decision means 153 by using frame updating period information (T_obj) S155 of the target object in the side information memory 152 and frame updating period information (T_cmp) S156 of the composite image from the composition means, according to a control signal S154 output from the decision means 153. In the object composition means 150, an object frame updating period so updated by the period information updating means 154 is stored in the side information memory 152.

Subsequently, operation will be described.

Turning to FIG. 19, the object composition apparatus 150 is supplied with the composition information S151, the side information S152, and the first and second object data D161 and D162, through the storage medium or the transmission medium, and the like. These information, a part or all of which may be multiplexed, or they may be input separately.

The composition information S151 is stored in the composition information memory 151. The side information S152 is stored in the side information memory 152. The first and second object data D161 and D162 are input to the composition means 155.

The composition information S151 is the scene description data shown in FIG. 28, and includes LOOP flags each indicating whether or not a corresponding object needs to be repeatedly reproduced. The LOOP flag of the first object data (OD_ID=10) D161 is "TRUE", indicating that this object is repeatedly reproduced. The LOOP flag of the second object (OD_ID=20) D162 is "FALSE", indicating that this object is normally reproduced rather than repeatedly reproduced. The side information is object descriptors shown in FIGS. 29(a) and 29(b), and includes description of CU duration times indicating the frame updating periods of respective objects. The frame.updating period of the first object (OD_ID=10) is 100 msec (see FIG. 29(a)) and the frame updating period of the second object (OD_ID=20) is 80 msec (see FIG. 29(b)).

The decision means 153 analyzes the LOOP flag S153 included in the composition information S151 stored in the composition information memory 151 to decide whether or not the target object needs to be repeatedly reproduced. When decided that the target object needs to be repeatedly reproduced, the control signal S154 is output to the period information updating means 154. As can be seen from the composition information (scene description data) shown in FIG. 28, the first object needs to be repeatedly reproduced, and therefore the decision means 153 outputs the control signal S154 to the period information updating means 154. On the other hand, the second object need not be repeatedly reproduced, and therefore the decision means 153 does not output the control signal S154 for this object.

Figure 20:
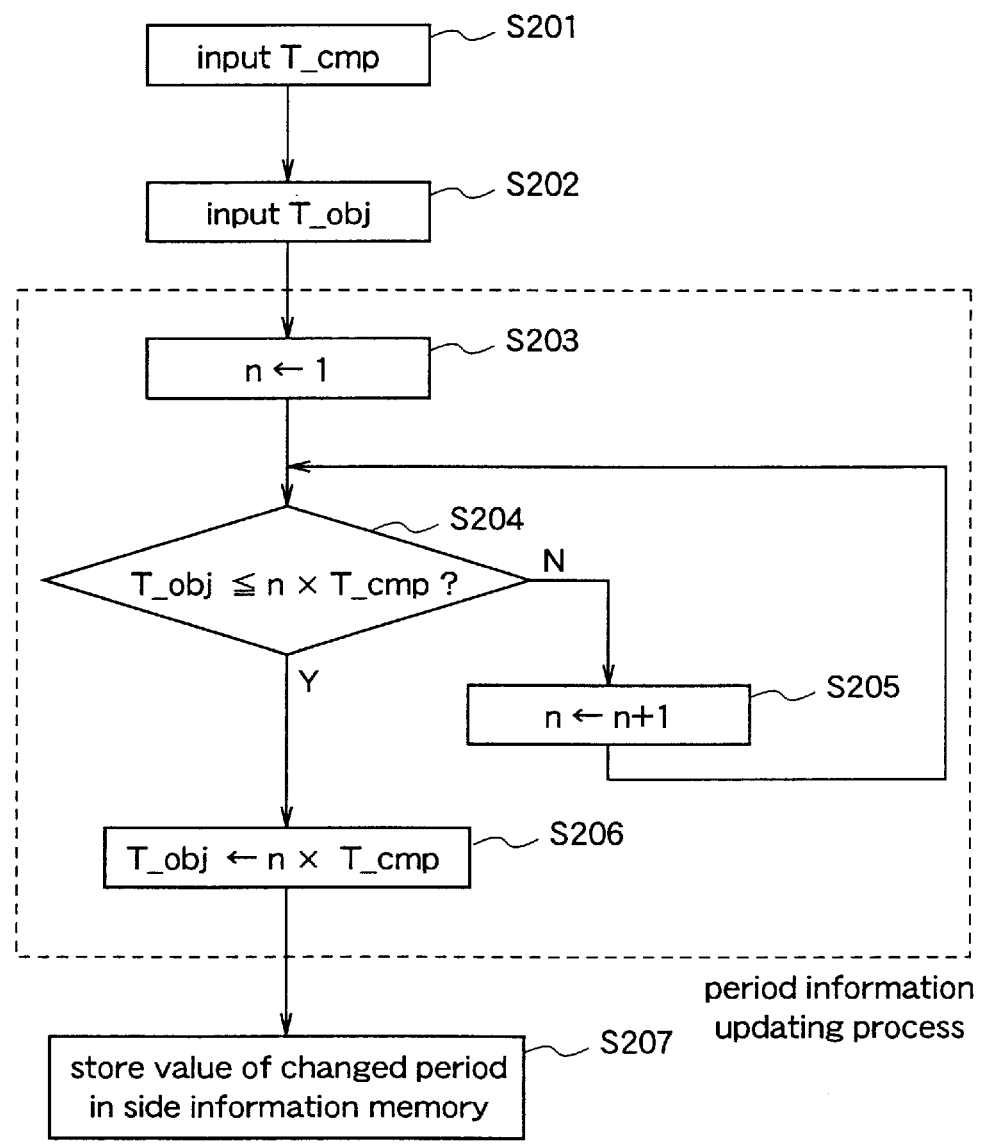
FIG. 20 is a diagram showing flow of processing performed by period information updating means included in the apparatus of the fifth embodiment.

The period information updating means 154, only when the decision means 153 outputs the control signal S154 thereto, updates the frame updating period of the corresponding object (see FIG. 20). Therefore, for the first object, the frame updating period is updated, whereas for the second object, the frame updating period is not updated.

Hereinafter, the period updating process performed by the period information updating means 154 will be explained along flow in FIG. 20.

Initially, the composition means 155 outputs the frame updating period (T_cmp) S156 of the composite image to the period information updating means 154 (Step S210). Then, the side information memory 152 outputs the frame updating period (T_obj) S155 of the target object to the period information updating means 154 (Step S202).

In the following Steps S203 through S206, the period information updating means 154 updates the frame updating period of the target object according to the frame updating period (T_cmp) of the composite image and the frame updating period of the target object (T_obj).

In this processing, as the frame updating period of the target object, the smallest value of integer multiples of the frame updating period of the composite image, which is not smaller than the frame updating period (T_obj) of the target object, is selected.

An initial value of a variable "n" is set to "1" (Step S203). Then, the value of the frame updating period (T_obj) of the object is compared to a value obtained by multiplying (the frame updating period (T_cmp) of the composite image) by n (Step S204). When the latter is not smaller than the former, the value of the period (T_obj) is changed into (the period (T_cmp)×n) (Step S206). On the other hand, when the latter is smaller than the former, "1" is added to the value of the variable "n" (Step S205). Then, comparison is made in Step S204.

When the "n" is the initial value "1", comparison is made between the period (T_obj) and the period (T_cmp), and when the period (T_cmp) is not smaller than the period (T_obj), the period (T_obj) is changed into the period (T_cmp). On the other hand, when the period (T_cmp) is smaller than the period (T_obj), n Step S205 and the following Step S204, comparison is made between the period (T_obj) and (the period (T_cmp)×2).

The processing in Steps S204 and S205, is repeated until (the period (T_cmp)×n) becomes the period (T_obj) or more.

The value of the period (T_obj) is changed into (the period (T_cmp)×n) (Step S206). The value of the changed period (T_obj) is stored in the side information memory 152 (Step S207). Thereby, the period updating process by the period information updating means 104 is ended.

A description will be made to explain the period updating process by the period information updating means 154 when the period (T_cmp) is 150 msec and the period (T_obj) is 100 msec (see FIG. 21).

In this case, "150 msec" is input to the period information updating means 154 as the frame updating period (T_cmp) of the composite image in Step S201, and 100 msec is input thereto as the frame updating period (T_obj) in Step S202.

When the variable n is set to "1", the value "150" of the period (T_cmp) is larger than the value "100" of the period (T_obj). Therefore, according to a comparison result in Step S204, the value of the period (T_obj) is changed into the value "150" obtained by (the value of the period (T_cmp)× 1)), which is stored in the side information memory 152. FIG. 21 shows the initial value "100 msec" of the frame updating period (T_obj) of the object and a processing result "150 msec" as a updated value.

A description will be made to explain the period updating process by the period information updating means 154 when the period (T_cmp) is 75 msec and the period (T_obj) is 100 msec (see FIG. 22).

In this case, "75 msec" is input to the period information updating means 154 as the frame updating period (T_cmp) of the composite image in Step S201, and 100 msec is input thereto as the frame updating period of the object (T_obj) in Step S202.

When the variable n is set to "1", the value "75" of the period (T_cmp) is smaller than the value "100" of the period (T_obj). The value of the variable "n" is incremented to "2" (Step S205).

When the variable n is set to "2", the value of (the composition period (T_cmp)×2), i.e., "150 (=75×2)" is larger than the value "100" of the period (T_obj), and therefore, the value of the period (T_obj) is changed into the (period (T_cmp))×2) "150", which is stored in the side information memory 152. FIG. 22 shows the initial value "100 msec" of the frame updating period (T_obj) of the object and a processing result "150 msec" as a updated value.

When the period information updating means 154 updates the periods of the respective objects, the composition means 155 obtains reproduced data corresponding to a composite image (frame updating period=150 msec) as data of the composite image composed of the plurality of object data.

Figure 31:
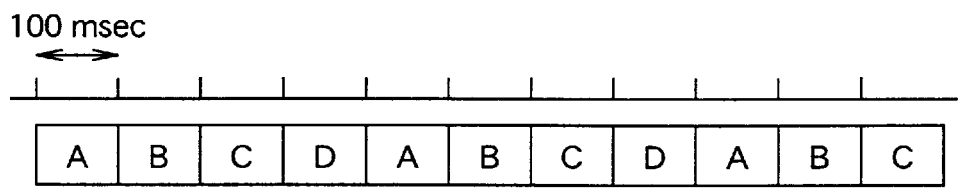
FIG. 31 is a diagram for explaining the problem with a composition process according to a frame updating period of a composite image in a conventional object composition apparatus.
Figure 31:
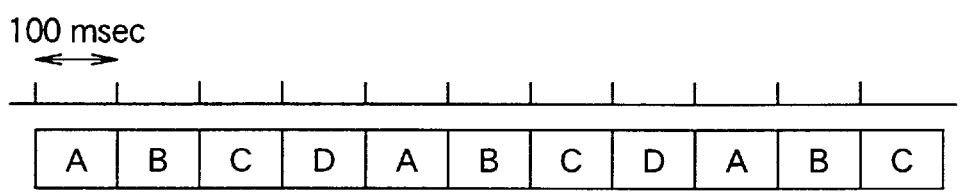
Figure 31:
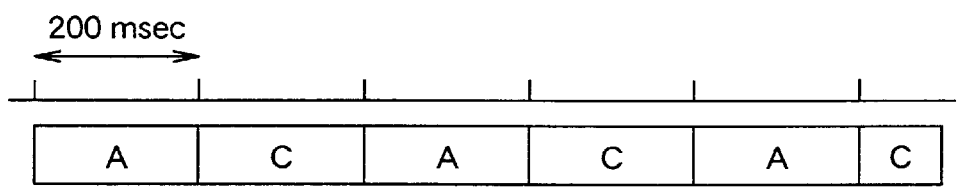
Figure 31:
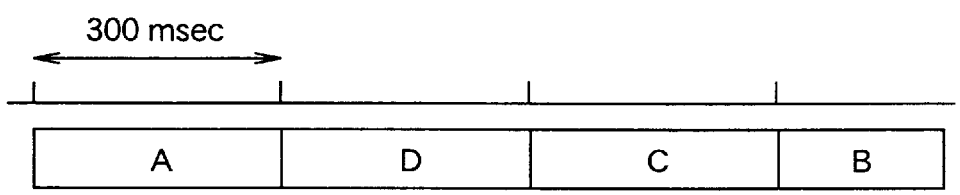
Figure 31:
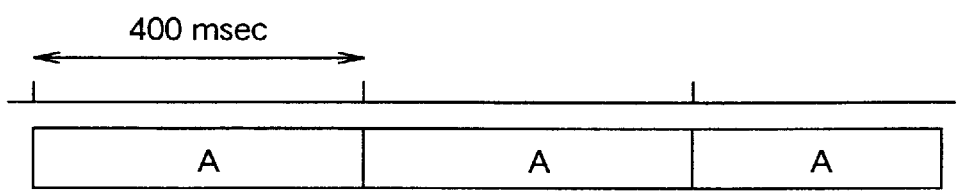

When the target object on which decision is to be made by the decision means needs to be repeatedly reproduced like the first object, the frame updating period of the target object is updated according to the period of the integer multiple of the frame updating period of the object composition apparatus. Hence, frame skipping of the target object shown in FIG. 31 will not occur and the composite image is made smoother and viewers feels less displeased with it. On the other hand, when the target object need not be repeatedly reproduced, like the second object, the control signal S154 is not output from the decision means 153. Hence, for this target object, the frame updating process is performed according to the frame updating period of the composite image. Thereby, the image is displayed while maintaining synchronization between the video data and the audio object data, although frame skipping shown in FIG. 31 occurs.

Thus, in accordance with the fifth embodiment, the object composition apparatus includes the decision means 153 for deciding whether or not the target object needs to be repeatedly reproduced according to the composition information stored in the composition memory 151, thereby changing the value of the frame updating period of the object corresponding to the object data which needs to be repeatedly reproduced into the integer multiple of the frame updating period of the composite image which is not smaller than the frame updating period of this object. Thereby, for the object corresponding to the object data which needs to be repeatedly reproduced, frame skipping is inhibited, thereby allowing display of the image moving smoothly, while for the object corresponding to the object data which need not be repeatedly reproduced, this is displayed in synchronization with the frame updating period of another object. This enables appropriate composition process for any of the objects.

Embodiment 6

Figure 23:
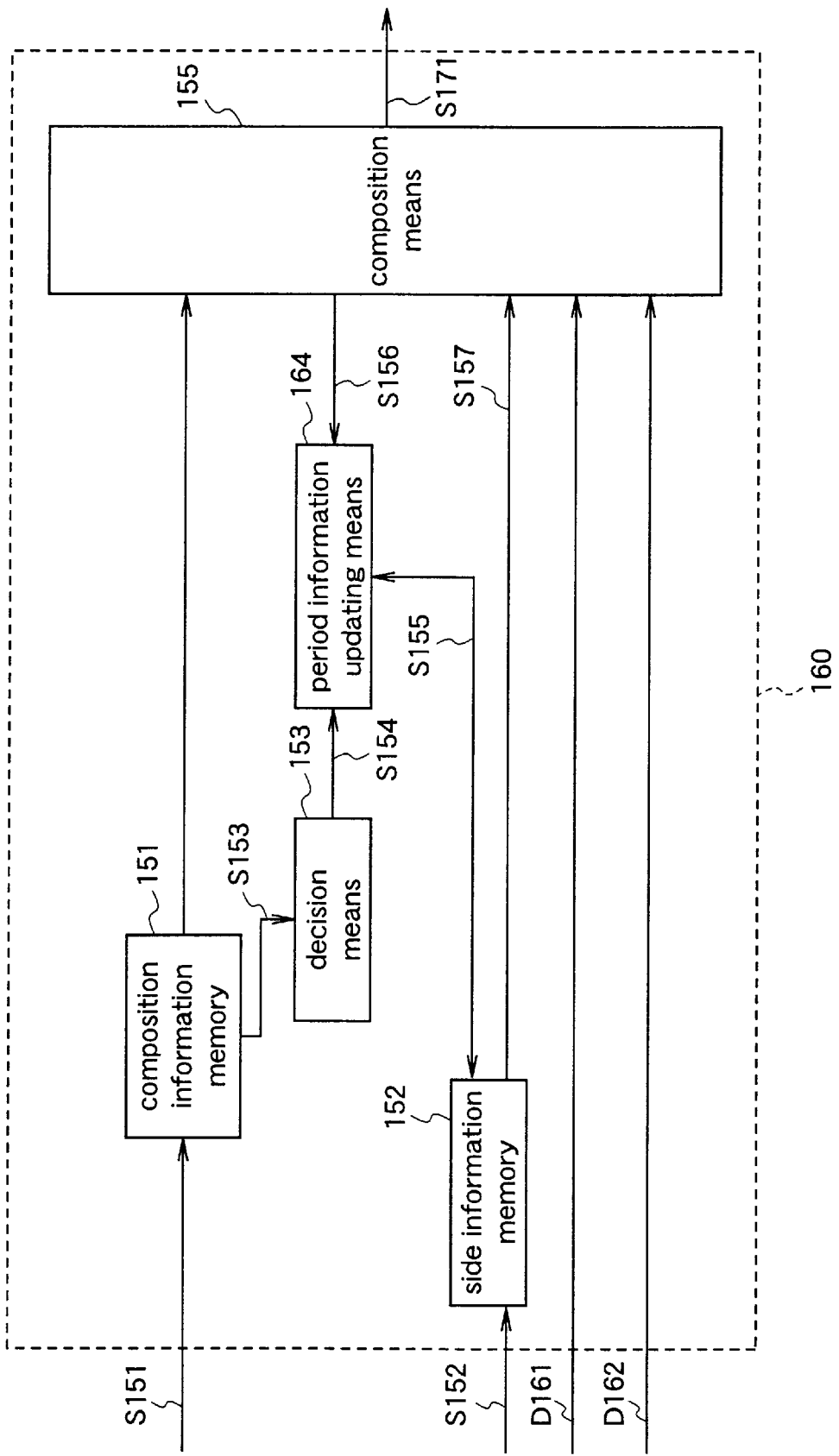
FIG. 23 is a block diagram for explaining a video data composition apparatus according to a sixth embodiment of the present invention.

FIG. 23 is block diagram for explaining an object composition apparatus according to a sixth embodiment of the present invention.

In an object composition apparatus 160 of the sixth embodiment, the period information updating means 154 included in the object composition apparatus of the fifth embodiment is replaced by period information updating means 164 for performing a period updating process different from that of the period information updating means 154. The other components of the object composition apparatus 160 are identical to those of the object composition apparatus 150 of the fifth embodiment.

The period information updating means 164 is used for making comparison between the smallest (first candidate value) of integer multiples of the frame updating period (T_cmp), which is not smaller than a frame updating period (T_obj) of a target object on which decision is to be made and the largest (second candidate value) of the integer multiples, which is smaller than the frame updating period (T_obj) of the target object, and changing the frame updating period (T_obj) of the target object into one of the first and second candidate values which is closer to the period (T_obj).

Subsequently, operation will be described.

In the object composition apparatus 160, like the fifth embodiment, the composition information S151 is stored in the composition information memory 151 and the side information S152 is stored in the side information memory 152. The decision means 153 decides whether or not the object data of the target object needs to be repeatedly reproduced.

When the decision means 153 decides that the object data of the target object needs to be repeatedly reproduced, the period information updating means 164 changes the frame updating period of the target object.

Figure 24:
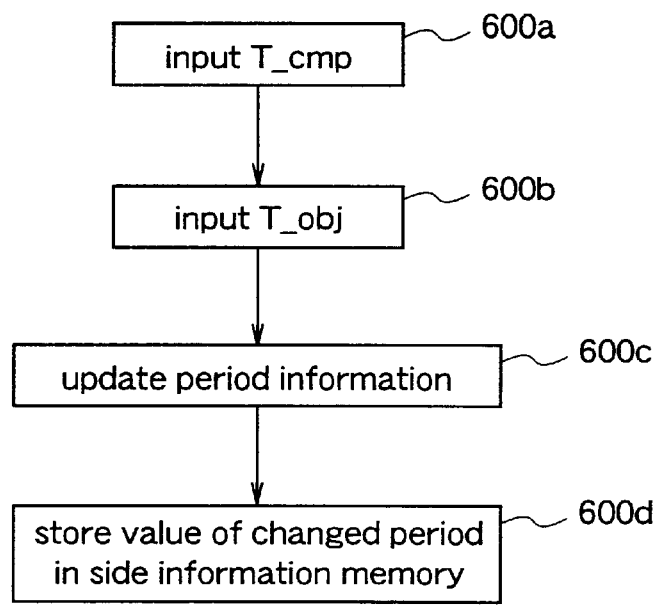
FIG. 24(a) shows flow of processing performed by period information updating means included in the object composition apparatus of the sixth embodiment and FIG. 24(b) shows an example of updating of period information.

FIG. 24(a) shows flow of processing performed by the period information updating means 164. The frame updating period (T_cmp) of the composite image is input to the period information updating means 164 (Step S600a). The frame updating period (T_obj) of the target object is input to the period information updating means 164 (Step S600b). The processing in Steps S600a and S600b are identical to processing in Steps S201 and S202 of the first embodiment.

The period information updating means 164 changes the frame updating period (T_obj) of the target object according to the frame updating period (T_cmp) of the composite image and the frame updating period (T_obj) of the target object (Step S600c). Then, the changed frame updating period (T_obj) of the target object is stored in the side information memory 152 (Step S600d).

Thereafter, the composition means 155 composites respective object data according to the frame updating period stored in the side information memory 152, like the fifth embodiment. For the object of the object data which need not be repeatedly reproduced, like the fifth embodiment, the corresponding frame updating period is not updated, and composited in the same manner as in the conventional object composition apparatus.

Hereinafter, the period information updating process in Step 600c will be described in detail.

In the period information updating process of the fifth embodiment, the smallest value of the integer multiples of the frame updating period (T_cmp) of the composite image, which is not smaller than the frame updating period (T_obj) of the target object, is found as a replacement period, into which the frame updating period (T_obj) of the target object is changed.

On the other hand, in the period information updating process of the sixth embodiment, the smallest value (first candidate value) of integer multiples of the frame updating period (T_cmp) of the composite image, which is not smaller than a frame updating period (T_obj) of a target object and the largest value (second candidate value) of the integer multiples, which is smaller than the frame updating period (T_obj) of the target object, are found and the frame updating period (T_obj) of the target object is changed into one of the first and second candidate values which is closer to the period (T_obj).

Figure 25:
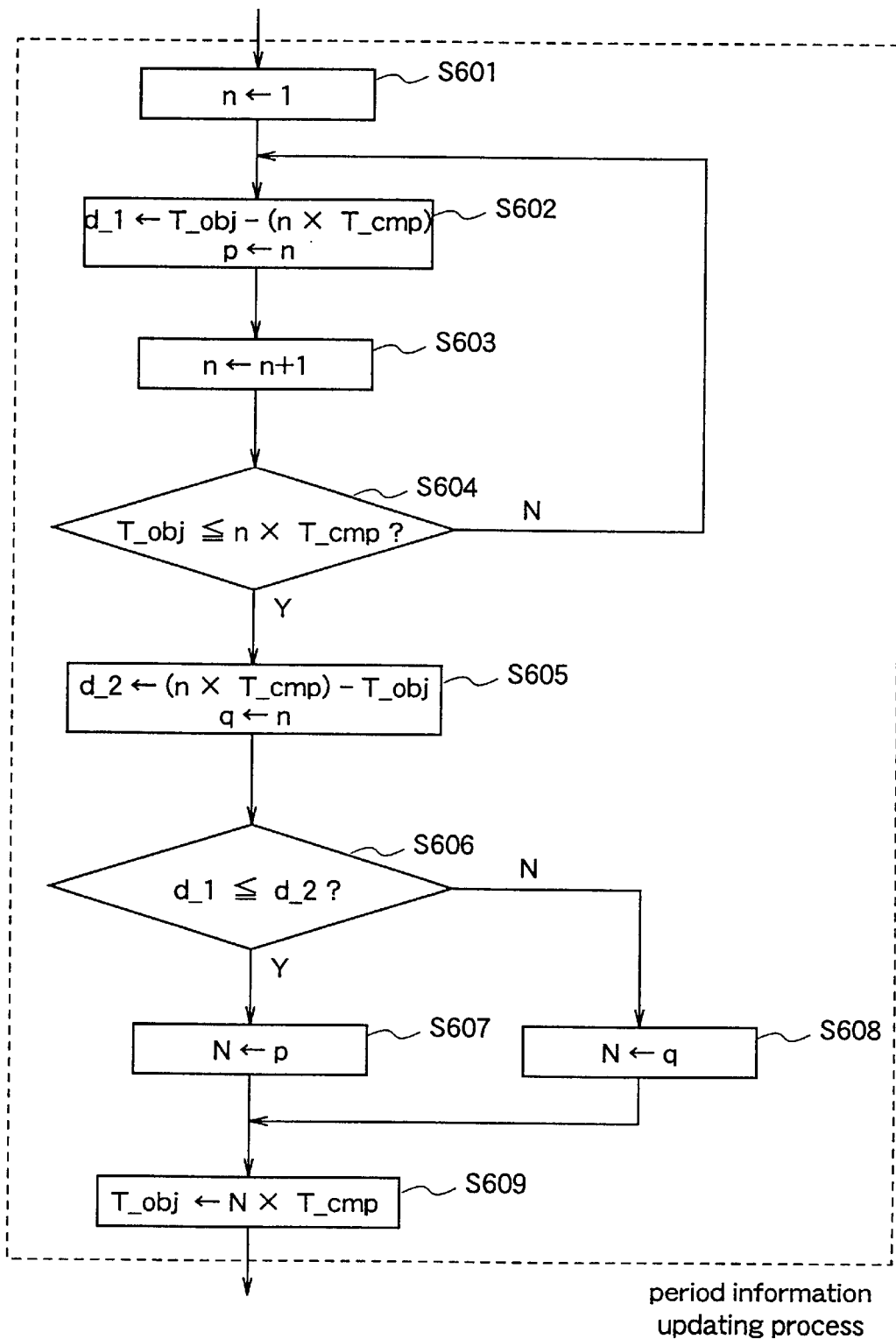
FIG. 25 is a diagram showing flow of detailed processing of updating of period information performed by the apparatus of the sixth embodiment.

FIG. 25 shows a flow of this period information updating process.

Initially, in the period information updating means 164, the value of the variable n is initialized and set to "1" (Step S601). Then, the value of (the fame updating period (T_cmp)×n) is subtracted from the frame updating period (T_obj) of the target object, to obtain a first subtraction result (d_1) (Step S602). At this time, as a value of a variable p, the value of the variable n is set.

The value of the variable n is incremented by one (Step S603), and then it is decided whether or not the period (T_cmp)×n is not smaller than the value of the period (T_obj) (Step S604).

When decided that (T_cmp)×n is smaller than the value of the period (T_obj) in Step S604, processing in Steps S602–S604 are performed again.

When decided that (T_cmp)×n is not smaller than the value of the period (T_obj) in Step S604, the value of the fame updating period (T_obj) is subtracted from (the period (T_cmp)×n), to obtain a second subtraction result (d_2) (Step S605). At this time, as a value of a variable q, the value of the variable n is set.

The first subtraction result (d_1) is compared to the second subtraction result (D_2) (Step S606). When the second subtraction result (d_2) is not smaller than the first subtraction result (d_1), the value of a variable N is set to the variable p (Step S607). On the other hand, when the second subtraction result (d_2) is smaller than the first subtraction result (d_1) the value of the variable N is set to the variable q (Step S608).

Following Step S607 or S608, the frame updating period (T_obj) of the target object is changed in to (the frame updating period (T_cmp)×N) of the composite image by using the variable N obtained in Step S607 or Step S608 (Step S609).

A description will be made to explain the period updating process performed by the period information updating means 164 when the period (T_cmp) is 75 msec and the initial value of the period (T_obj is 100 msec (see FIG. 24(b)).

In this case, 75 msec is input to the period information updating means 164 as the frame updating period (T_cmp) of the composite image in Step S600a, and 100 msec is input thereto as the frame updating period (T_obj) of the object in Step S600b. Then, the period information updating means 164 updates the frame updating period (T_obj) of the object according to these values in Step S600c.

The variable n is set to "1" in Step S601 and (the value "75" of the period (T_cmp)×1) is subtracted from the value "100" of the period (T_obj), to obtain the value "25" of the first subtraction result (d_1). At this time, the value of the variable p is the value "1" of n.

In Step S603, the value of the variable n is incremented from "1" to "2". In Step S604, the value "100" of the period (T_obj) is compared to (the value "75" of the period (T_cmp)×2=150). Since the value of the period (Tcmp)×2 is larger than the period (T_obj), the value "100" of the period (T_obj) is subtracted from the value "150" of (the period (T_cmp)×2), to obtain the value "50" as the subtraction result (d_2). At this time, the value of the variable q is set to the value "2" of the variable n.

In Step S606, the first subtraction result (d_1) is compared to the second subtraction result (d_2). In thei case, when the value "50" of the second subtraction result (d_2) is larger than the value "25" of the first subtraction result (d_1), and therefore in Step S607, the value of the variable N is set to "1" of the variable q.

In Step S609, the value of the period (T_obj) is set to the value "75" of (the period (T_cmp)×1). FIG. 24(b) shows that an updating result of the period (T_obj) is a processing result "75 msec".

Figure 26:
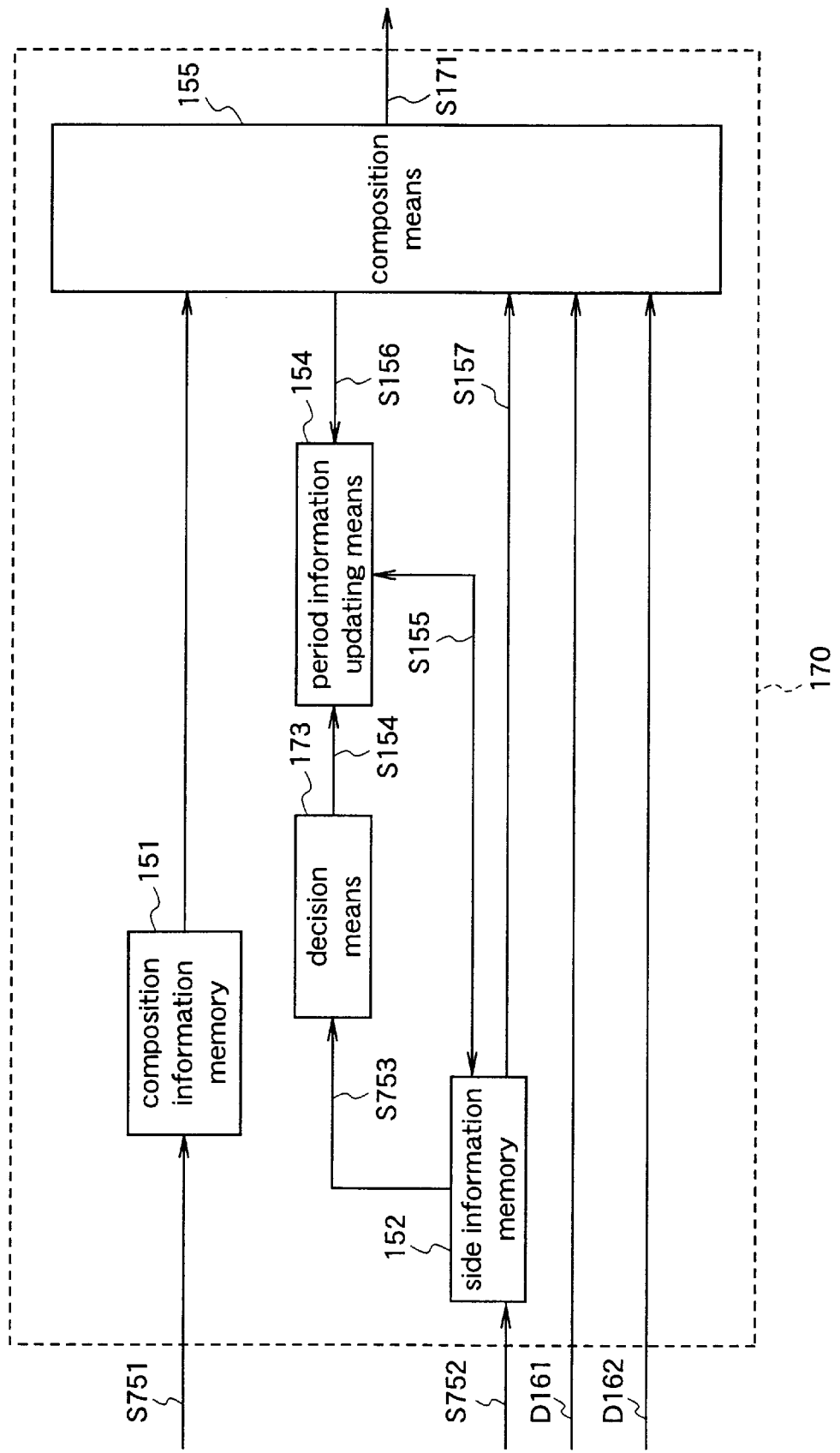
FIG. 26 is a block diagram for explaining an object composition apparatus according to a seventh embodiment of the present invention.
Figure 30:
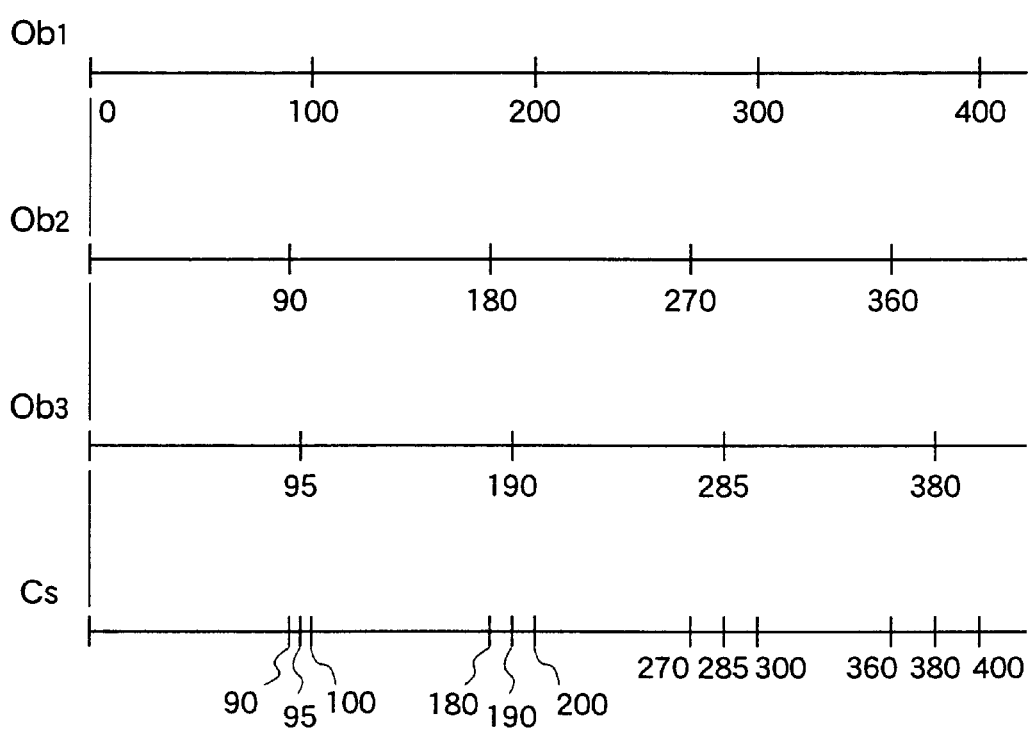
FIG. 30 is a diagram for explaining the problem with a composition process according to frame updating periods of respective objects in a conventional object composition apparatus.

Comparing the period information updating process of the sixth embodiment shown in FIG. 26 to the period information updating process of the fifth embodiment shown in FIG. 22, when the initial values of the frame updating process of the target object are the same, "150" is obtained as the value of the frame updating period (T_obj) in the fifth embodiment, while "75" is obtained as the value of the frame updating period in the sixth embodiment. This comparison shows that a variation of the period before and after updating of the frame updating period of the target object can be suppressed in the sixth embodiment.

To be specific, in the fifth embodiment, the value of the period (T_obj) changes from "100 msec" to "150 msec"

before and after the period updating process, and a variation is "50 msec". On the other hand, in the sixth embodiment, the value of the period (T_obj) changes from "100 msec" to "75 msec" before and after the period updating process, and a variation is "25 msec".

Thus, in accordance with sixth embodiment, the object composition apparatus includes the decision means 153 for deciding whether or not the object data of the target object needs to be repeatedly reproduced, for changing the value of the frame updating period of the object corresponding to the object data to be repeatedly reproduced into the value of the integer multiple of the frame updating period of the composite image, which is closest to the frame updating period of the object. Therefore, like the fifth embodiment, for the object corresponding to the object data which needs to be repeatedly reproduced, frame skipping is inhibited, while for the object corresponding to the object data which need not be repeatedly reproduced, this is displayed in synchronization with the frame updating period of another object. In addition, the variation before and after updating of the frame updating period of the object corresponding to the object data to be repeatedly reproduced can be suppressed.

While in the fifth and sixth embodiments, the object composition apparatus is adapted to composite video data corresponding to two objects, it may composite video data corresponding to three or more objects. Also in this case, the period information is updated in the same manner as in this embodiment.

While in the fifth and sixth embodiments it is decided whether or not the frame updating period of the target object is updated according to the corresponding LOOP flag described in the composition information (scene description data), this may be performed according to another flag.

For instance, the auxiliary information (program information) in the object coding scheme according to MPEG4 may include a flag indicating whether or not the frame updating period of each object can be updated, and according to this flag, it is decided whether or not the frame updating period of the corresponding object is changed.

While in the fifth and sixth embodiments the composition information (scene description data) include information (LOOP flag) relating to display of each object and it is decided whether or not the frame updating period of the target object is updated according to the LOOP flag obtained from the composition information, this information (LOOP flag) may be described in the side information. In this case, it is decided whether or not the period information is updated according to the LOOP flag obtained from the side information.

Embodiment 7

FIG. 26 is a block diagram for explaining an object composition apparatus according to a seventh embodiment of the present invention.

An object composition apparatus 170 of the seventh embodiment differs from the object composition apparatus 150 according to the fifth embodiment in that it is decided whether or not the frame updating period of the target object is updated according to the information (LOOP flag) relating to display of each object which is described in the side information.

In the object composition apparatus 170 of the seventh embodiment, the decision means 153 of the object composition apparatus 150 of the fifth embodiment is replaced by decision means 173 for obtaining the information (LOOP flag) relating to display of each object from the side information memory 152, deciding whether or not the frame updating period of the target object needs to be updated, and outputting a decision result to period information updating means 154 as a control signal S154. The other components of the object composition apparatus 170 is identical to the object composition apparatus 150 of the fifth embodiment.

In the object composition apparatus of the seventh embodiment, the decision means 173 decides whether or not the object data of the target object needs to be repeatedly reproduced according to the side information S752 stored in the side information memory 152, and the value of the frame updating period of the object corresponding to the object data to be repeatedly reproduced into the value of the integer multiple of the frame updating period of the composite image which is not smaller than the frame updating period of the object.

Thereby, for the object corresponding to the object data which needs to be repeatedly reproduced, frame skipping is inhibited, thereby allowing display of the image moving smoothly, while for the object corresponding to the object data which need not be repeatedly reproduced, this is displayed in synchronization with the frame updating period of another object. This enables appropriate composition process for any of the objects.

While in the fifth to seventh embodiments the CU duration time is described in the side information, as information (period updating information) indicating the frame updating period of each object, this is illustrative. What is needed is that this period updating information is stored in the program information. For instance, this may be stored in the composition information (scene description information).

While in the fifth to seventh embodiments the scene composition data represented as the scene description language standardized according to MPEG4 shown in FIG. 28, is input as the composition information, the composition information is not limited to this.

By way of example, the composition information may be described by MHEG (Multimedia Hypermedia Expert Group), VRML, HTML (Hyper Text Mark-up language), SMILL (Synchronized Multimedia Integration language), and the like.

While in the fifth to seventh embodiments the composition information the composition information is stored in the composition information memory as text data having a format of the scene description language, the composition information maybe input or stored as binary-bit data. Further, this binary data may be structured so that the decision means or the composition means analyzes it easily.

While in the fifth to seventh embodiment the image output apparatus is constituted by hardware, the apparatus may be constituted by software rather than hardware.

For instance, an object composition program for implementing the composition process for the object data performed by the object composition apparatus of any of the fifth to seventh embodiments is stored in a storage medium, and the object composition program is executed by the computer system shown in FIG. 15(c), whereby the object composition apparatus of any of the fifth to seventh embodiments is realized.

The object composition program can be stored in a floppy disc shown in FIG. 15(a), or another storage media, such as an optical disc, IC card, an ROM cassette, a magnetic tape, and the like.

What is claim is:

1. An image output apparatus which receives encoded video object data with display time set in each frame as a display process unit, which is obtained by encoding video object data respectively corresponding to individual objects composing a predetermined image, and decodes and composites the encoded video object data, to output reproduced data used for displaying the predetermined image, said apparatus comprising:

decoders for decoding the encoded video object data corresponding to respective objects and outputting a plurality of decoded data;

video data composition means for compositing the plurality of decoded data to generate composite data corresponding to a frame, frame by frame;

a buffer for storing the composite data of a predetermined number of frames;

image display means for selecting composite data corresponding to a specified frame according to a result of comparison between set display time of respective composite data stored in said buffer and scheduled display time determined by display process ability, and outputting the selected composite data as the reproduced data; and means for determining a video data composition period, which determines a composition period of a composition process according to the result of comparison between the set display time and the scheduled display time and outputs composition period information, wherein said video data composition means perform the composition process according to the composition period indicated by the composition period information.

2. An image output apparatus which receives encoded video object data with display time set in each frame as a display process unit, which is obtained by encoding video object data respectively corresponding to individual objects composing a predetermined image, and decodes and composites the encoded video object data, to output reproduced data used for displaying the predetermined image, said apparatus comprising:

decoders for decoding the encoded video object data corresponding to respective objects and outputting a plurality of decoded data;

video data composition means for compositing the plurality of decoded data to generate composite data corresponding to a frame, frame by frame;

a buffer for storing the composite data of a predetermined number of frames;

image display means which selects composite data corresponding to a specified frame according to a result of comparison between set display time of respective composite data stored in said buffer and scheduled display time determined by display process ability, and outputs the selected composite data as the reproduced data; and means for determining a number of frames to-be-decoded, which determines the number of frames of the respective objects which are to be decoded by said decoders per unit time, according to the result of comparison between the set display time and the scheduled display time, and outputs information indicating the number of frames to-be-decoded of the respective objects, wherein said decoders respectively perform decoding such that decoding amount of the respective objects per unit time corresponds to the number of frames per unit time according to the information indicating the number of frames to-be-decoded.

3. The image output apparatus of claim 2, wherein said decoders, when changing the number of frames to-be-decoded per unit time according to the information indicating the number of frames to-be-decoded of the respective objects, determine frames to be decoded and frames to be dropped which are not decoded, according to types of encoding processes performed for the encoded video object data.

4. An image output apparatus which receives encoded video object data with display time set in each frame as a display process unit, which is obtained by encoding video object data respectively corresponding to individual objects composing a predetermined image, and decodes and composites the encoded video object data, to output reproduced data used for displaying the predetermined image, said apparatus comprising:

decoders for decoding the encoded video object data corresponding to respective objects and outputting a plurality of decoded data;

video data composition means for compositing the plurality of decoded data to generate composite data corresponding to a frame, frame by frame;

a buffer for storing the composite data of a predetermined number of frames;

image display means which selects composite data corresponding to a specified frame according to a result of comparison between set display time of respective composite data stored in said buffer and scheduled display time determined by display process ability, and outputs the selected composite data as the reproduced data; and means for determining a number of frames to-be-decoded, which determines the number of frames of respective objects which are to be decoded by said decoders per unit time, according to waiting time before said video data composition means writes the composite data to said buffer, and outputs information indicating the number of frames to-be-decoded of the respective objects, wherein said decoders respectively perform decoding such that decoding amount of the respective objects per unit time corresponds to the number of frames per unit time according to the information indicating the number of frames to-be-decoded.

5. The image output apparatus of claim 4, wherein said decoders, when changing the number of frames to-be-decoded per unit time according to the information indicating the number of frames to-be-decoded of the respective objects, determine frames to be decoded and frames to be dropped which are not decoded, according to types of encoding processes performed for the encoded video object data.

6. An image output apparatus which receives encoded video object data with display time set in each frame as a display process unit, which is obtained by encoding video object data respectively corresponding to individual objects composing a predetermined image, and decodes and composites the encoded video object data, to output reproduced data used for displaying the predetermined image, said apparatus comprising:

decoders for decoding the encoded video object data corresponding to respective objects and outputting a plurality of decoded data;

video data composition means for compositing the plurality of decoded data to generate composite data corresponding to a frame, frame by frame;

a buffer for storing the composite data of a predetermined number of frames;

image display means which selects composite data corresponding to a specified frame according to a result of comparison between set display time of respective composite data stored in said buffer and scheduled display time determined by display process ability, and outputs the selected composite data as the reproduced data; and means for determining a number of frames to-be-decoded, which determines the number of frames of the respective objects which are to be decoded by said decoders per unit time, according to the result of comparison between the set display time and the scheduled display time, and waiting time before said video data composition means writes the composite data to said buffer, and outputs information indicating the number of frames to-be-decoded of the respective objects, wherein said decoders respectively perform decoding such that decoding amount of the respective objects per unit time corresponds to the number of frames per unit time according to the information indicating the number of frames to-be-decoded.

7. The image output apparatus of claim 6, wherein said decoders, when changing the number of frames to-be-decoded per unit time according to the information indicating the number of frames to-be-decoded of the respective objects, determine frames to be decoded and frames to be dropped which are not decoded, according to types of encoding processes performed for the encoded video object data.

8. An image reproduction method which decodes and composites encoded video object data with display time set in each frame as a display process unit, which is obtained by encoding video object data respectively corresponding to individual objects composing a predetermined image, to output reproduced data used for displaying the predetermined image, said method comprising:

a video data composition step for compositing decoded data obtained by decoding the encoded video object data corresponding to respective objects to generate composite data corresponding to a frame, frame by frame;

a buffering step for storing the composite data of a predetermined number of frames in a buffer;

a reproduced data output step for selecting composite data corresponding to a specified frame according to a result of comparison between set display time of respective composite data stored in said buffer and scheduled display time determined by display process ability, and outputting the selected composite data as the reproduced data; and a video data composition period determination step for determining a composition period of a composition process according to the result of comparison between the set display time and the scheduled display time and outputting composition period information, wherein in said video data composition step, the composition process is performed according to the composition period indicated by the composition period information.

9. An image reproduction method which decodes and composites encoded video object data with display time set in each frame as a display process unit, which is obtained by encoding video object data corresponding to individual objects composing a predetermined image, to output reproduced data used for displaying the predetermined image, said method comprising:

a decoding step for decoding the encoded video object data corresponding to respective objects and outputting decoded data corresponding to the respective objects;

a composition step for compositing the decoded data corresponding to the respective objects to generate composite data and storing the composite data of a predetermined number of frames in a buffer;

a reproduced data output step for selecting composite data corresponding to a specified frame according to a result of comparison between set display time of the composite data of respective frames stored in said buffer and scheduled display time determined by display process ability, and outputting the selected composite data as the reproduced data; and a determination step for determining a number of frames to-be-decoded, which determines the number of frames of the respective objects which are to be decoded by said decoders per unit time, according to the result of comparison between the set display time and the scheduled display time, and outputs information indicating the number of frames to-be-decoded of the respective objects, wherein in said decoding step, the encoded video object data is decoded such that decoding amount of the respective objects per unit time corresponds to the number of frames per unit time according to the information indicating the number of frames to-be-decoded.

10. An image reproduction method which decodes and composites encoded video object data with display time set in each frame as a display process unit, which is obtained by encoding video object data respectively corresponding to individual objects composing a predetermined image, to output reproduced data used for displaying the predetermined image, said method comprising:

a decoding step for decoding the encoded video object data corresponding to respective objects and outputting decoded data corresponding to the respective objects;

a composition step for compositing the decoded data corresponding to the respective objects to generate composite data and storing the composite data of a predetermined number of frames in a buffer;

a reproduced data output step for selecting composite data corresponding to a specified frame according to a result of comparison between set display time of the composite data of respective frames stored in said buffer and scheduled display time determined by display process ability, and outputting the selected composite data as the reproduced data; and a determination step for determining a number of frames to-be-decoded, which determines the number of frames of respective objects which are to be decoded by said decoders per unit time, according to waiting time before the composite data is written to said buffer, and outputs information indicating the number of frames to-be-decoded of the respective objects, wherein in said decoding step, the encoded video object data is decoded such that decoding amount of the respective objects per unit time corresponds to the number of frames per unit time according to the information indicating the number of frames to-be-decoded.

11. An image reproduction method which decodes and composites encoded video object data with display time set in each frame as a display process unit, which is obtained by encoding video object data corresponding to individual objects composing a predetermined image, to output reproduced data used for displaying the predetermined image, said method comprising:

a decoding step for decoding the encoded video object data corresponding to respective objects and outputting a plurality of decoded data corresponding to the respective objects;

a composition step for compositing the plurality of decoded data to generate composite data and storing the composite data of a predetermined number of frames in a buffer;

a reproduced data output step for selecting composite data corresponding to a specified frame according to a result of comparison between set display time of the composite data of respective frames stored in said buffer and scheduled display time determined by display process ability, and outputting the selected composite data as the reproduced data; and a determination step for determining a number of frames to-be-decoded, which determines the number of frames of respective objects which are to be decoded by said decoders per unit time, according to the result of comparison between the set display time and the scheduled display time, and waiting time before the composite data is written to said buffer, and outputs information indicating the number of frames to-be-decoded of the respective objects, wherein in said decoding step, the encoded video object data is decoded such that decoding amount of the respective objects per unit time corresponds to the number of frames per unit time according to the information indicating the number of frames to-be-decoded.

12. A data storage medium for storing a program which makes a computer perform processing of video data, said program being an image reproduction program for making the computer reproduce data according to an image reproduction method of claim 8.

13. A data storage medium for storing a program which makes a computer perform processing of video data, said program being an image reproduction program for making the computer reproduce data according to an image reproduction method of claim 9.

14. A data storage medium for storing a program which makes a computer perform processing of video data, said program being an image reproduction program for making the computer reproduce data according to an image reproduction method of claim 10.

15. A data storage medium for storing a program which makes a computer perform processing of video data, said program being an image reproduction program for making the computer reproduce data according to an image reproduction method of claim 11.

16. An image output apparatus which receives a plurality of video object data respectively corresponding to a plurality of objects composing a predetermined image, composites the plurality of video object data and outputs reproduced data used for displaying the predetermined image, said apparatus comprising:

object composition means for compositing the plurality of video object data with reference to object period information indicating periods according to which frames of respective objects are updated and composite image period information indicating a period according to which a frame of a composite image is updated; and period information changing means for changing one of the object period information and the composite image period information so that a corresponding frame updating period has a value according to a control signal, wherein said composition means composites the plurality of video object data with reference to changed period information which has replaced corresponding period information before change.

17. An image reproduction method which receives a plurality of video object data respectively corresponding to a plurality of objects composing a predetermined image, composites the plurality of video object data and outputs reproduced data used for displaying the-predetermined image, said method comprising:

a composition period determination step for determining a period according to which the plurality of video object data is composited, with reference to object period information indicating periods according to which frames of respective objects are updated and composite image period information indicating a period according to which a frame of a composite image is updated; and a period information changing step for changing one of the object period information and the composite image period information so that a corresponding frame updating period has a value according to a control signal, wherein in said composition period determination step, changed period information which has replaced corresponding period information before change, is referred to.

18. A data storage medium for storing a program which makes a computer perform processing of video data, said program being an image reproduction program for making the computer reproduce data according to an image reproduction method of claim 17.

19. An object composition apparatus for compositing video object data respectively corresponding to individual objects composing a predetermined image according to auxiliary information associated with the predetermined image; said apparatus comprising:

program information storage means for storing program information as the auxiliary information, including object period information of respective objects indicating periods according to which frames of the respective objects are updated and display method information indicating methods for displaying the video object data;

decision means for deciding a method of displaying the video object data object by object, according to the program information stored in said program information storage means and outputting a decision signal indicating a decision result;

period information updating means which receives the decision signal and performs an information updating process in which object period information of a target object included in said program information on which decision has been made is changed according to the decision result; and composition means for compositing the video object data corresponding to the respective objects periodically by using the program information which has been subjected to the information updating process.

20. The object composition apparatus of claim 19, wherein said program information includes composition information used for compositing the video object data corresponding to the individual objects to reproduce the predetermined image, said display method information being included in said composition information, said program information storage means includes a composition information memory for storing said composition information included in said program information, and said decision means receives said composition information stored in said composition information memory and decides the method for displaying the video object data object by object, according to said display method information included in said composition information.

21. The object composition apparatus of claim 19, wherein said program information includes side information associated with the individual objects, said display method information being included in said side information, said program information storage means includes a side information memory for storing said side information of the respective objects included in said program information, and said decision means receives said side information stored in said side information memory and decides the method for displaying the video object data object by object, according to said display method information included in said side information.

22. The object composition apparatus of claim 19, wherein said display method information of each object which is included in said program information is a flag indicating whether or not video object data corresponding to a frame of a corresponding object-needs to be repeatedly reproduced.

23. The object composition apparatus of claim 19, wherein said display method information of each object which is included in said program information is a flag indicating whether or not object period information of a corresponding object can be changed.

24. The object composition apparatus of claim 19, wherein said period information updating means updates the object period information of the target object such that a value of the frame updating period of the target object becomes an integer multiple of a composition period of said composition means for compositing the video object data.

25. The object composition apparatus of claim 24, wherein said period information updating means updates the object period information of the target object such that the value of the frame updating period of the target object becomes a value of (the composition period×1), when the value of the object period information is not larger than the value of the composition period.

26. The object composition apparatus of claim 24, wherein said period information updating means updates the object period information of the target object such that the value of the frame updating period of the target object becomes a smallest value of integer multiples of the value of the composition period, which is not smaller than the value of the object period information, when the value of the object period information is larger than the value of the composition period.

27. The object composition apparatus of claim 24, wherein said period information updating means, when the value of the object period information is larger than the value of the composition period, calculates a first candidate value as a largest value of integer multiples of the value of the composition period, which is not larger than the value of the object period information and a second candidate value as a smallest value of the integer multiples of the composition period, which is not smaller than the value of the object period information, and updates the object period information of the target object such that the frame updating period of the target object has one of the first and second candidate values which is closer to the value of the object period information.

28. An object composition method for compositing video object data respectively corresponding to individual objects composing a predetermined image according to auxiliary information associated with the predetermined image; said method comprising:

a decision step for deciding a method of displaying video object data object by object, according to program information as the auxiliary information, including object period information of respective objects indicating periods according to which frames of the respective objects are updated and display method information indicating methods for displaying the video object data;

a period information updating step in which object period information of a target object included in said program information on which decision has been made is changed according to a decision result; and a composition step for compositing the video object data corresponding to the respective objects periodically by using the program information which has been changed in said period information updating step.

29. The object composition method of claim 28, wherein said display method information of each object which is included in said program information is a flag indicating whether or not video object data corresponding to a frame of a corresponding object needs to be repeatedly reproduced.

30. The object composition method of claim 28, wherein said display method information of each object which is included in said program information is a flag indicating whether or not object period information of a corresponding object can be changed.

31. The object composition method of claim 28, wherein in said period information updating step, the object period information of the target object is updated such that a value of the frame updating period of the target object becomes an integer multiple of a composition period of composition means for compositing the video object data.

32. The object composition method of claim 31, wherein in said period information updating step, the object period information of the target object is updated such that the value of the frame updating period of the target object becomes a value of (the composition period ×1), when the value of the object period information is not larger than the value of the composition period.

33. The object composition method of claim 31, wherein in said period information updating step, the object period information of the target object is updated such that the value of the frame updating period of the target object becomes a smallest value of integer multiples of the composition period, which is not smaller than the value of the object period information, when the value of the object period information is larger than the value of the composition period.

34. The object composition method of claim 31, wherein in said period information updating step, when the value of the object period information is larger than the value of the composition period, a first candidate value as a largest value of integer multiples of the composition period which is not larger than the value of the object period information and a second candidate value as a smallest value of the integer multiples of the composition period, which is not smaller than the value of the object period information are calculated and the object period information is updated such that the frame updating period of the target object has one of the first and second candidate values which is closer to the value of the object period information.

35. A data storage medium for storing a program which makes a computer perform an object composition process for compositing video object data respectively corresponding to individual objects composing a predetermined image, according to auxiliary information associated with the predetermined image, said program comprising:

a decision step for deciding a method of displaying video object data object by object, according to program information as the auxiliary information, including object period information of respective objects indicating periods according to which frames of the respective objects are updated and display method information indicating methods for displaying the video object data;

a period information updating step in which object period information of a target-object included in said program information on which decision has been made is changed according to a decision result; and a composition step for compositing the video object data corresponding to the respective objects periodically by using the program information which has been changed in said period information updating step.

* * * * *

UNITED STATES PATENT AND TRADEMARK OFFICE
CERTIFICATE OF CORRECTION

PATENT NO. : 6,539,054 B1
DATED : March 25, 2003
INVENTOR(S) : Yoshinori Matsui et al.

It is certified that error appears in the above-identified patent and that said Letters Patent is hereby corrected as shown below:

Title page,
Item [56], U.S. PATENT DOCUMENTS, please change
"5,638,433 A  *  6/1997 Bubien, Jr ...... 379/130" to
-- 5,638,433 A  *  6/1997 Bubien, Jr et al. ...... 379/130 --;

Column 52,
Line 12, please change "the-predetermined" to -- the predetermined --;

Column 53,
Line 29, please change "object-needs" to -- object needs --;

Column 55,
Line 14, please change "information are" to -- information, are --;

Column 56,
Line 12, please change "target-object" to -- target object --.

Signed and Sealed this

Seventh Day of October, 2003

JAMES E. ROGAN
*Director of the United States Patent and Trademark Office*